US008300974B2

(12) United States Patent
Kubo et al.

(10) Patent No.: US 8,300,974 B2
(45) Date of Patent: Oct. 30, 2012

(54) IMAGE PROCESSING DEVICE, IMAGE DISPLAY DEVICE, AND IMAGE PROCESSING METHOD THEREFOR

(75) Inventors: Toshiaki Kubo, Tokyo (JP); Satoshi Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 636 days.

(21) Appl. No.: 12/268,282

(22) Filed: Nov. 10, 2008

(65) Prior Publication Data

US 2009/0141998 A1    Jun. 4, 2009

(30) Foreign Application Priority Data

Nov. 12, 2007  (JP) ................................ 2007-293262
Sep. 16, 2008  (JP) ................................ 2008-236398

(51) Int. Cl.
*G06K 9/40* (2006.01)

(52) U.S. Cl. .......................................................... 382/264

(58) Field of Classification Search ........... 382/264–275
See application file for complete search history.

(56) References Cited

U.S. PATENT DOCUMENTS

| | | | |
|---|---|---|---|
| 5,999,658 A | 12/1999 | Shimazu et al. | |
| 6,895,124 B1* | 5/2005 | Kira et al. ..................... | 382/260 |
| 7,127,122 B2 | 10/2006 | Ogata et al. | |
| 2003/0156761 A1* | 8/2003 | Ogata et al. .................... | 382/251 |
| 2005/0152614 A1* | 7/2005 | Daly et al. .................... | 382/268 |
| 2006/0028541 A1 | 2/2006 | Haraguchi | |
| 2006/0098892 A1* | 5/2006 | Sugeno et al. ................. | 382/265 |
| 2006/0197993 A1 | 9/2006 | Yamanaka et al. | |
| 2006/0251335 A1* | 11/2006 | Sugimoto ...................... | 382/275 |
| 2007/0071355 A1* | 3/2007 | Imai ............................... | 382/266 |
| 2007/0188525 A1* | 8/2007 | Yamanaka et al. ............. | 345/690 |
| 2008/0019600 A1* | 1/2008 | Takita et al. .................. | 382/254 |
| 2008/0175510 A1* | 7/2008 | Matsushita .................... | 382/260 |
| 2009/0016633 A1* | 1/2009 | Miyasaka ...................... | 382/255 |
| 2009/0141998 A1* | 6/2009 | Kubo et al. ..................... | 382/264 |
| 2010/0260432 A1* | 10/2010 | Shimizu et al. ............... | 382/255 |

FOREIGN PATENT DOCUMENTS

| | | |
|---|---|---|
| JP | H02-190980 | 7/1990 |
| JP | 5-304474 A | 11/1993 |
| JP | 10-84481 A | 3/1998 |
| JP | 2003-8935 | 1/2003 |
| JP | 2006-50358 | 2/2006 |
| JP | 2007-181189 A | 7/2007 |
| WO | WO-2007/063771 A1 | 6/2007 |

OTHER PUBLICATIONS

"Nonlinear Digital Signal Processing" Asakura Publishing Co., Ltd., pp. 72-74, Authors: Takao Hinamoto (Editor), Mitsuji Muneyasu and Akira Taguchi, Date of Publication: Mar. 20, 1999.

* cited by examiner

*Primary Examiner* — Jingge Wu
(74) *Attorney, Agent, or Firm* — Birch, Stewart, Kolasch & Birch, LLP

(57) ABSTRACT

It is an object to provide an image processing device, an image display device, and an image processing method therefor that are capable of curbing generation of a pseudo edge in a digital image.
The image processing device and the image display device are provided including a threshold-value control unit 29 that obtains a threshold value depending on a tone in image data; a smoothing filter unit 60 that applies a smoothing process to a predetermined tone in the image data while preserving, depending on the threshold value, a predetermined edge in the image data; and an output unit that outputs image data having been processed by the smoothing filter unit 60.

12 Claims, 39 Drawing Sheets

| PIXEL POSITION k | l2 | l1 | c | r1 |
|---|---|---|---|---|
| DATA DM(k) | 4Y | 4Y | 4Y | 4Y+4 |
| DIFFERENCE DATA ED(k) | 0 | 0 | 0 | 4 |
| THRESHOLD-VALUE DATA TH(k) | 4 | 4 | 4 | 4 |
| DETERMINATION DATA EE(k) | 1 | 1 | 1 | 1 |
| f{ED(k)} | 0 | 0 | 0 | 4 |
| EM | 1 | | | |

Fig. 16

| PIXEL POSITION k | l2 | l1 | c | r1 |
|---|---|---|---|---|
| DATA DM(k) | 4Y | 4Y | 4Y | 4Y+8 |
| DIFFERENCE DATA ED(k) | 0 | 0 | 0 | 8 |
| THRESHOLD-VALUE DATA TH(k) | 4 | 4 | 4 | 4 |
| DETERMINATION DATA EE(k) | 1 | 1 | 1 | 0 |
| f{ED(k)} | 0 | 0 | 0 | 0 |
| EM | 0 | | | |

Fig. 18

| PIXEL POSITION k | l2 | l1 | c | r1 |
|---|---|---|---|---|
| DATA DM(k) | 4Z | 4Z | 4Z | 4Z+8 |
| DIFFERENCE DATA ED(k) | 0 | 0 | 0 | 8 |
| THRESHOLD-VALUE DATA TH(k) | 8 | 8 | 8 | 8 |
| DETERMINATION DATA EE(k) | 1 | 1 | 1 | 1 |
| f{ED(k)} | 0 | 0 | 0 | 8 |
| EM | 2 | | | |

| PIXEL POSITION k | l2 | l1 | c | r1 |
|---|---|---|---|---|
| DATA DM(k) | 4Z | 4Z | 4Z | 4Z+16 |
| DIFFERENCE DATA ED(k) | 0 | 0 | 0 | 16 |
| THRESHOLD-VALUE DATA TH(k) | 8 | 8 | 8 | 8 |
| DETERMINATION DATA EE(k) | 1 | 1 | 1 | 0 |
| f{ED(k)} | 0 | 0 | 0 | 0 |
| EM | 0 | | | |

Fig. 38

| PIXEL POSITION k | l2 | l1 | c | r1 |
|---|---|---|---|---|
| DATA DM(k) | 4Z | 4Z | 4Z | 4Z+8 |
| DIFFERENCE DATA ED(k) | 0 | 0 | 0 | 8 |
| THRESHOLD-VALUE DATA TH(k) | 8 | 8 | 8 | 8 |
| DETERMINATION DATA EE(k) | 1 | 1 | 1 | 1 |
| f{ED(k)} | 0 | 0 | 0 | 8 |
| EM | 2 | | | |

Fig. 40

| PIXEL POSITION k | l2 | l1 | c | r1 |
|---|---|---|---|---|
| DATA DM(k) | 4Y | 4Y | 4Y | 4Y+8 |
| DIFFERENCE DATA ED(k) | 0 | 0 | 0 | 8 |
| THRESHOLD-VALUE DATA TH(k) | 4 | 4 | 4 | 4 |
| DETERMINATION DATA EE(k) | 1 | 1 | 1 | 0 |
| f{ED(k)} | 0 | 0 | 0 | 0 |
| EM | 0 | | | |

IMAGE PROCESSING DEVICE, IMAGE DISPLAY DEVICE, AND IMAGE PROCESSING METHOD THEREFOR

BACKGROUND OF THE INVENTION

1. Field of the Invention

The present invention relates to image processing devices, image display devices, and image processing methods, that interpolate tones of digital image data, in particular, to curb a generation of a pseudo contour in the digital image.

2. Description of the Related Art

In recent years, display devices such as televisions and monitors have been made brighter. Making the devices brighter increases the amount of luminance change per tone, causing gradual tone changes to become noticeable. Displaying devises with high resolution in tone, such as a 10-bit liquid-crystal-display panel, have been developed; however, because images are distributed in 8 bits in digital broadcasting and the like, an effective number of tones remains in that expressed by 8 bits, despite the 10-bit tone resolution of the display device. Therefore, at least three image levels are lacked, then in an image—a sunset, a sea and the like whose tone changes gradually, the image level changes stepwise across its neighboring areas, which look like pseudo contours.

When performing a smoothing process (such as a simple averaging) of image data that includes pseudo contours caused by lack of image levels, there arises a problem in that the image becomes blurred. For example, in a method of interpolating tone as set forth in Japanese Patent Application Publication No. H10-84481 (Patent Document 1) defined as a "tone jump" is a phenomenon in which the image level changes stepwise across neighboring areas so that at lease one image level is lacking. In technologies disclosed in Patent Document 1, in order to eliminate the tone jump without performing a smoothing process, a target area where tone is to be interpolated is extracted by identifying a first and a second image levels between which a tone jump exists, and the target area is portioned into N+1 segments, so that N intermediate image levels are assigned sequentially to interpolate tones of the target area.

However, in the techniques disclosed in the Patent Document 1, tones are interpolated based on data in narrow areas, causing a problem in that pseudo contours produced from gradual changes cannot be eliminated.

SUMMARY OF THE INVENTION

An object of the present invention is to provide an image processing device, an image display device, and an image processing method therefor that are capable of curbing generation of a pseudo contour in a digital image.

Thus, according to the present invention, provided are the image processing device and the image display device including a threshold-value control unit that obtains a threshold value depending on a tone in the image data; a smoothing filter unit that applies a smoothing process to a predetermined tone in the image data while preserving, depending on the threshold value, a predetermined edge in the image data; and an output unit that outputs image data having been processed by the smoothing filter unit.

Moreover, according to the present invention, provided is an image processing method including the steps of: extending the number of bits in the image data so as to extend a tone in the image data; obtaining a threshold value depending on a tone in the image data; and applying a smoothing process to a predetermined tone in the image data while preserving, depending on the threshold value, a predetermined edge in the image data.

BRIEF DESCRIPTION OF THE DRAWINGS

FIG. 16 is a table of data that an image display device according to Embodiment 1 produces when tone changes steeply;

FIG. 18 is a table of data that an image display device according to Embodiment 1 produces when an analog image signal with a gradual tone change, that jumps by transformation, is inputted;

FIG. 38 is a table of data that an image display device according to Embodiment 2 produces when an analog image signal with a gradual tone change, that jumps by transformation, is inputted;

FIG. 40 is a table of data that an image display device according to Embodiment 2 produces when an analog image signal with a steep tone change, that jumps by transformation, is inputted;

DETAILED DESCRIPTION OF THE PREFERRED EMBODIMENTS

Embodiments of image processing devices, image display devices, image processing methods therefor, and image displaying methods therefor according to the present invention will be explained in detail below, based on drawings. In addition, the present invention is not limited to the embodiments.

Embodiment 1

Figure 1:
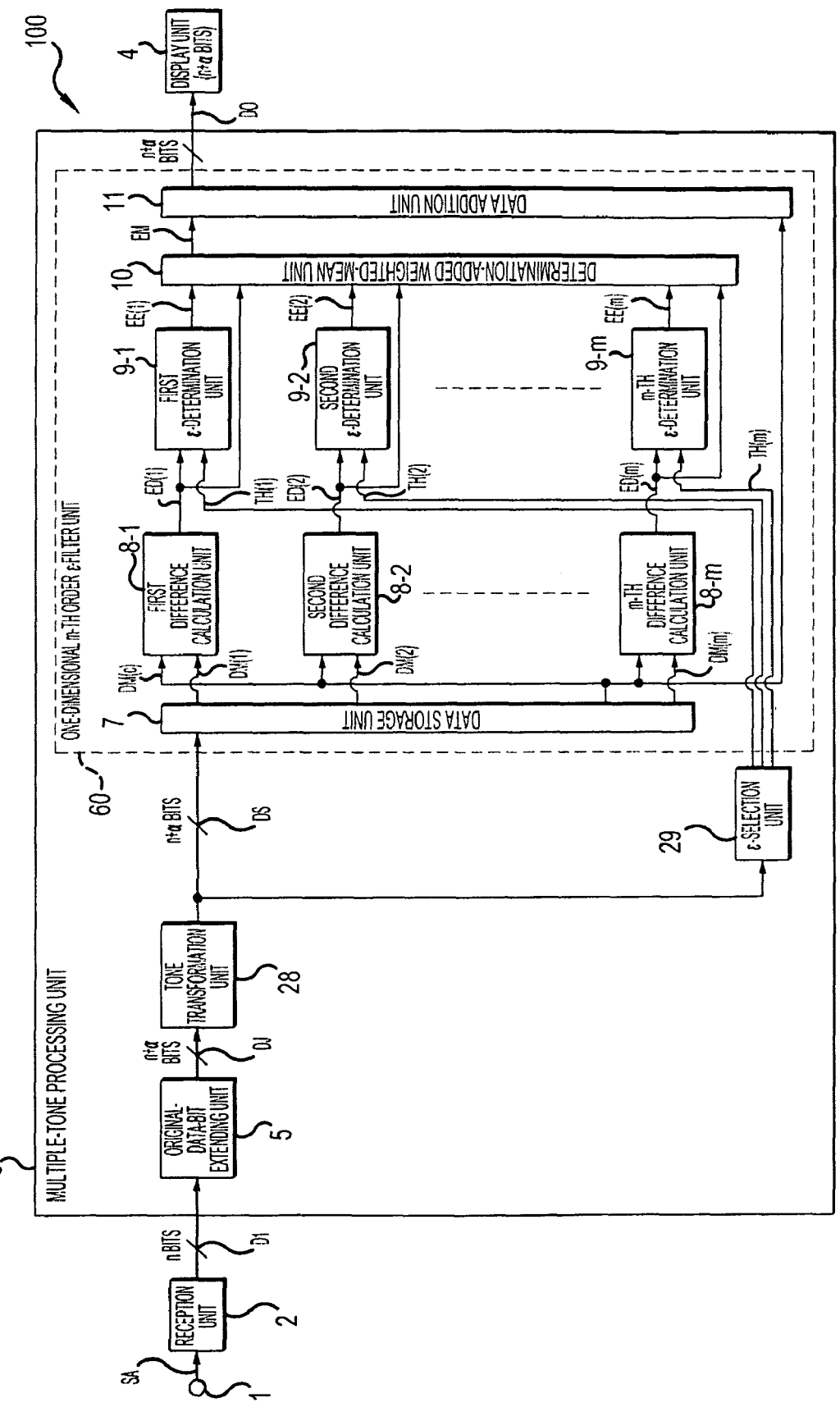
FIG. 1 is a view illustrating a configuration of an image display device of Embodiment 1 according to the present invention.

FIG. 1 is a view illustrating a configuration of an image display device (including an image processing device) of Embodiment 1 according to the present invention. An image display device 100 according to Embodiment 1 smoothes tones (interpolated tone) increased by bit extension using an epsilon filter (non-linear digital filter), and increases an effective number of tones to display an image. The image display device 100 can be applied to a liquid-crystal-display television, a plasma television and the like.

The image display device 100 is provided with an input terminal 1, a reception unit 2, a multiple-tone processing unit 3, and a display unit 4. Among the components, the reception device 2 and the multiple-tone processing unit 3 compose an image processing device (device that increases an effective number of tones).

In this embodiment, explanations will be made assuming that the reception unit 2 is, as an example, an A/D converter that converts analog image signals to digital image data. For reference sake, a tuner may be placed in the reception unit 2, a composite signal may be demodulated into luminance and chromaticity signals inside the reception unit 2, and then the signals may be transformed to digital image data. In addition, the reception unit 2 may function as a digital interface unit that receives digital data from an input terminal 1 and outputs n(natural number)-bit image data DI.

Into the input terminal 1, an analog image signal SA is inputted to be outputted to the reception unit 2. The reception unit 2 converts the analog image signal SA to n-bit image data DI to output into a multiple-tone processing unit 3.

The multiple-tone processing unit 3 includes an original-data-bit-extending unit 5, a tone transformation unit 28, an ε-selection unit 29 as a threshold-value control unit, and a one-dimensional m-th order ε-filter unit 60 as a smoothing filter unit, so that the n-bit image data DI is transformed to n+α bits (multiple-tone) to be outputted onto the display unit 4. Here, both m and α are natural numbers.

The original-data hit-extending unit 5 is placed upstream of the one-dimensional m-th order ε-filter unit 60. The original-data-bit-extending unit 5 outputs to a tone transformation unit 28 n+α bit image data DJ to which the n-bit image data DI is extended by a bits. The tone transformation unit 28 performs tone transformation, such as gamma transformation and contrast correction, of the image data DJ to output into an ε-selection unit 29 and the one-dimensional m-th order ε-filter unit 60 image data having been transformed in tone, as image data DS (n+α bits).

Each of image data (the image data DS, the image data DI, the image data DJ, image data DO described later) that are inputted/outputted within the image display device 100 is data expressing values of pixels arranged in a matrix form.

In the image data DS, the position of each pixel is expressed as coordinate (i, j) (both i and j are natural numbers), taking an origin (0, 0) for the top left corner of its image; a horizontal coordinate i increases by one when the coordinates moves to the next right column, and a vertical coordinate j increases by one when the coordinates moves to the next downward row. Each of the image data is a series of data arranged in a plurality of lines. In the series of data, rows are sorted in a top-to-bottom order and pixels are sorted, within each row, in a left-to-right order.

In synchronization with a pixel clock provided from a control unit not shown in the figures, performed are the transformation operation in the reception unit 2 from an analog image signal SA to image data DI, a transfer operation of the image data DI from the reception unit 2 to the original-data bit-extending unit 5, the bit extension operation (extension of the number of bits) in the original-data bit-extending unit 5, a transfer operation of the image data DJ from the original-data bit-extending unit 5 to the tone transformation unit 28, a transfer operation of image data DS from the tone transformation unit 28 to the data storage unit 7, and the like. In addition, operations of other parts in the multiple-tone processing unit 3 described below are performed similarly in synchronization with the pixel clock provided by the control unit.

The ϵ-selection unit 29 has a table of threshold values being set up for each tone, so that the unit selects, depending on inputted image data DS (tones DS), a threshold value (any one of threshold level data TH(1) through TH(m)) from the table (information corresponding to threshold values) and output it to the one-dimensional m-th order ϵ-filter unit 60. The threshold value mentioned above is a value to be compared with difference data ED described later.

The one-dimensional m-th order ϵ-filter unit 60 is used as an edge-preserving smoothing filter (epsilon filter or ϵ-filter) in that on the basis of pixel data arranged in one-dimensional direction from a given pixel to be processed (i.e., a reference pixel when smoothing tones) the filter smoothes data to process small amplitude components as noises, while preserving steep changes (edges). The one-dimensional m-th order ϵ-filter unit 60 performs process to eliminate tone jumps and increase an effective number of tones, by smoothing tones extended by the original-data bit-extending unit 5.

The one-dimensional m-th order ϵ-filter unit 60 includes a data storage unit 7, a first difference calculation unit 8-1 through an m-th difference calculation unit 8-$m$, a first ϵ-determination unit 9-1 through an m-th ϵ-determination unit 9-$m$, a determination-added weighted average unit 10, and a data addition unit 11.

The data storage unit 7 stores the image data DS from the tone transformation unit 28 and outputs image data DM(1) through DM(m), into the first difference calculation unit 8-1 through the m-th difference calculation unit 8-$m$, respectively. Furthermore, the data storage unit 7 outputs image data DM(c) into the first difference calculation unit 8-1 through the m-th difference calculation unit 8-$m$ and the data addition unit 11.

The image data DM(c) is image data when a given pixel is determined as a pixel c. The image data DM(1) through DM(m) are those of pixels that are each apart from the given pixel c, rightward or leftward, by predetermined pixel counts (coordinates). For example, in a case of m=5, assuming that image data DM(3) is the image data DM(c) image data DM(1) is that of a pixel that positions 2 pixels before (leftward) from the given pixel c, image data DM(2) is that of a pixel that positions one pixel before (leftward) from the given pixel c, image data DM(4) is that of a pixel that positions a pixel after (rightward) from the given pixel c, and image data DM(5) is that of a pixel that positions 2 pixels after (rightward) from the given pixel c.

The first difference calculation unit 8-1 through the m-th difference calculation unit 8-$m$ calculate as difference data ED(1) through ED(m) (difference values), the differences between the image data DM(1) through DM(m) and the image data DM(c), respectively. The first difference calculation unit 8-1 through the m-th difference calculation unit 8-$m$ each output the difference data ED(1) through ED(m) into the first ϵ-determination unit 9-1 through the m-th ϵ-determination unit 9-$m$.

The first ϵ-determination unit 9-1 through the m-th ϵ-determination unit 9-$m$ determine whether or not the difference data ED(1) through ED(m) from the first difference calculation unit 8-1 through the m-th difference calculation unit 8-$m$ are larger than the threshold level data TH(1) through TH(m) from the ϵ-selection unit 29, and output into the determination-added weighted average unit 10 the determined results as determination data EE(1) through EE(m).

The determination-added weighted average unit 10 performs, based on the determination data EE(1) through EE(m), a weighted average process of the difference data ED(1) through ED(m), and outputs into the data addition unit 11 the result of its process as a weighted average value EM (average data). The data addition unit 11 adds the image data DS (image data DM(c)) to the weighted average value EM.

About the image data DS, the processes described above are preformed taking sequentially each pixel thereof as a given pixel, so that the processed image data (n+α bit data) is outputted as image data DO from the data addition unit 11 in the one-dimensional m-th order ϵ-filter unit 60 to the display unit 4. The display unit 4 is a displaying means such as a liquid crystal monitor to display n+α bit image data DO.

Here, the epsilon filter that the one-dimensional m-th order ϵ-filter unit 60 includes will be explained. The epsilon filter is explained, for example, in Non-Patent Document 1 (Takao HINAMOTO (Editor), Mitsuji MUNEYASU and Akira TAGUCHI (Authors), "Nonlinear Digital Signal Processing," Mar. 20, 1999, page 106-107, Asakura Publishing Co., Ltd., Tokyo).

A one-dimensional processing by the epsilon filter is expressed by a formula (1). In the formula (1), x(i) is a tone of inputted image data, and y(i) is a tone of image data to be outputted, $a_k$ is a coefficient with k expressing a relative pixel position from a given pixel, and ϵ is a threshold value.

$$y(i) = x(i) + \sum_{k=-m/2+1}^{m/2} a_k f\{x(i-k) - x(i)\} \quad (1)$$

$$f(u) = \begin{cases} u & (u \leq \varepsilon) \\ 0 & (u > \varepsilon) \end{cases}$$

Figure 2:
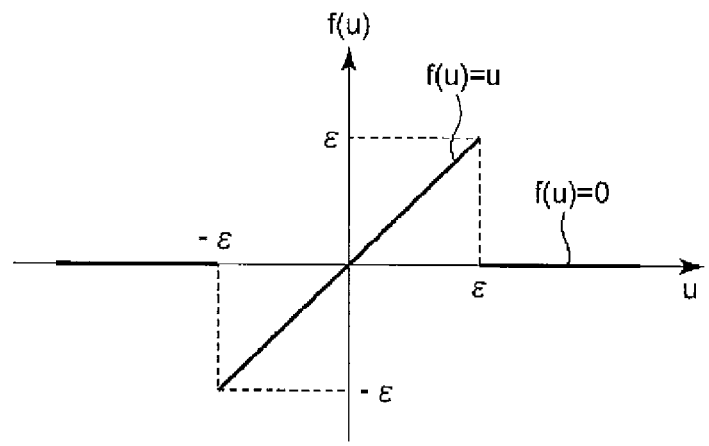
FIG. 2 shows the graph of a function f(u) expressed as a formula (1)

FIG. 2 shows the graph of the function f(u) expressed in the formula (1). When the absolute value of u is smaller than or equal to the threshold value ϵ, f(u)=u; then, when the absolute value of U is larger than the threshold value ϵ, f(u)=0. In the formula (1), x(i−k)−x(i) is supplied as u to the epsilon filter. When a tone x(i) of a pixel position i and a tone x(i−k) of a pixel position i−k, being in the vicinity of the pixel position i, make a small difference x(i−k)−x(i), f(u)=f {x(i−k)−x(i)} is almost linear. Assuming that the summation of the coefficients $a_k$ is one, the formula (1) is re-written as a formula (2), thus the epsilon filter becomes a weighted-mean filter.

$$y(i) = \sum_{k=-m/2+1}^{m/2} a_k x(i-k) \quad (2)$$

The formula (1) can also be re-written as a formula (3).

$$y(i) = \sum_{k=-m/2+1}^{m/2} a_k [x(i) + f\{x(i-k) - x(i)\}] \quad (3)$$

$$= \sum_{k=-m/2+1}^{m/2} a_k x'(i-k)$$

The formula (3) has been further re-written, when the non-linear function shown in FIG. 2 is applied to the f(u) and x' (i−k) is newly defined as a formula (4). In the formula (4), x' (i−k) becomes x(i−k) when the difference x(i−k)−x(i) is less than or equal to a threshold value ϵ; and x'(i−k) becomes x(i) when the difference x(i−k)−x(i) is larger than the threshold value ϵ.

$$x'(i-k) = \begin{cases} x(i-k): & |x(i-k)-x(i)| \leq \varepsilon \\ x(i): & |x(i-k)-x(i)| > \varepsilon \end{cases} \quad (4)$$

Figure 3:
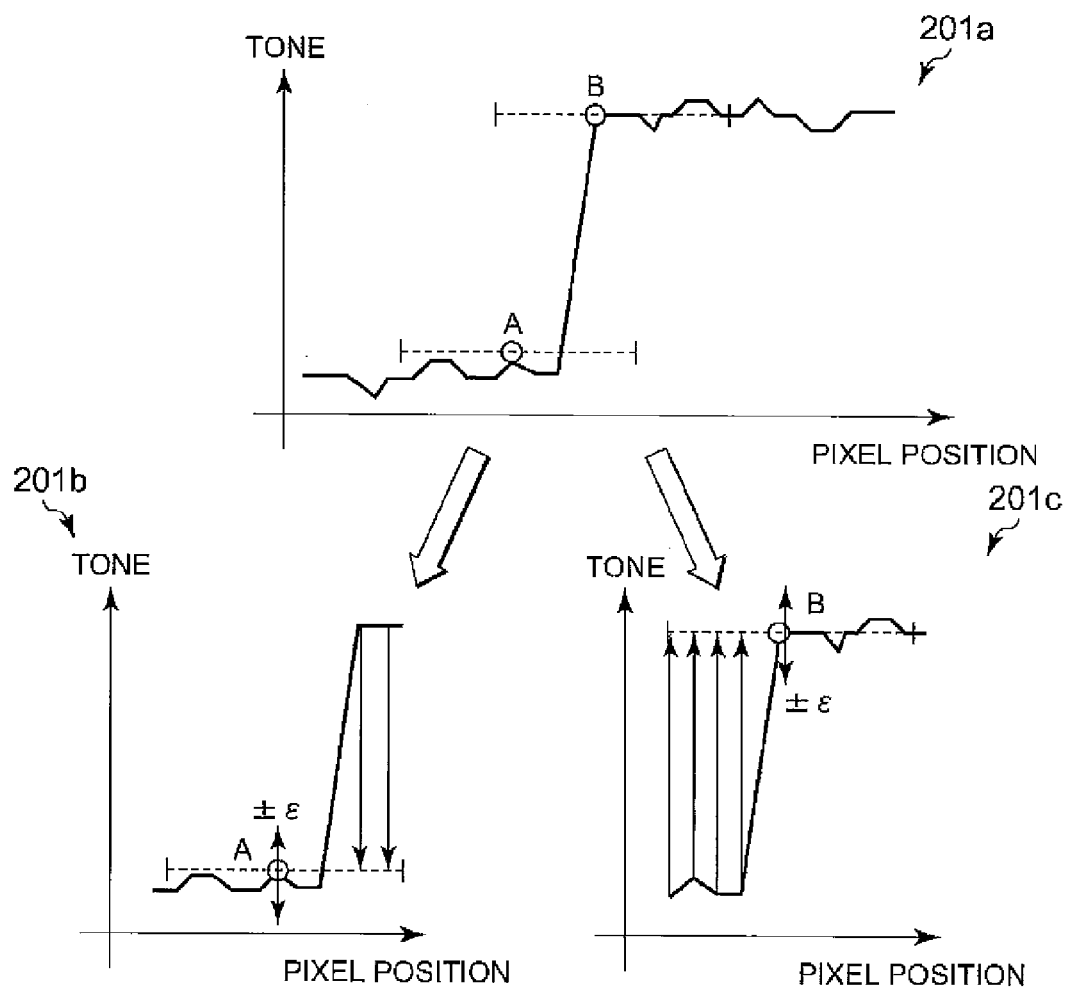
FIG. 3 are views for explaining an epsilon filter process.

FIG. 3 are views for explaining the epsilon filter process. FIG. 3 show a relationship between pixel positions and their tones (tone for each pixel position). A graph 201a shown in the upper half of FIG. 3 expresses an input signal to the epsilon filter. A graph 201b shown at the lower left of the FIG. 3 illustrates how the epsilon filter operates a given pixel (point A), and a graph 201c shown at the lower right of the FIG. 3 illustrates how the epsilon filter operates a given pixel (point B). In each of the graphs 201a through 201c, the horizontal axis is for expressing a pixel position i and the vertical axis is for expressing a tone of an input x(i).

When processing a signal of the point A shown in the graph 201a, an epsilon filter using a function f(u) in FIG. 2 replaces, as shown in the graph 201b, with the tone of the point A all tones having differences larger than ±ϵ from the tone of the point A to obtain a weighted average value for the point. Therefore, tones are never affected by large amplitude signal components such as edges.

When processing a signal of the point B shown in the graph 201a, an epsilon filter using a function f(u) in FIG. 2 replaces, as shown in the graph 201c, with the tone of the point B all tones having differences larger than ±ϵ from the tone of the point B to obtain a weighted average value for the point.

That is to say, even when processing an edge portion such as the point B, an averaging process is performed for pixels having pixel values close to that of the edge as shown in the graph 201c, resulting in no deterioration in the edge. Therefore, the epsilon filter can eliminate small amplitude noises, preserving steep changes such as edges.

As described above, the epsilon filter takes as small amplitude noises tones added by bit extension (operating as small amplitude noises) to perform the epsilon filter process. That is to say, when extending from n bits to n+α bits, a threshold value ϵ of the epsilon filter is determined as $2^{\alpha}$ ($2^{\alpha}$). This enables the epsilon filter to increase an effective number of tones, preserving steep changes in an image such as contours. However, when a tone transformation such as the gamma transformation is performed between the bit extension process and the epsilon filter process, the magnitudes of the tones increased by bit extension are changed.

Thus, in this embodiment, the image display device 100 includes an ϵ-selection unit 29 (threshold-value control unit) for changing a threshold value ϵ depending on an inputted tone, and a one-dimensional m-th order ϵ-filter unit 60 having a threshold value controlled by the ϵ-selection unit 29 to change the threshold value depending on a tone. More specifically, the magnitude of edge preserved by the epsilon filter is changed depending on inputted tone. Details will be explained below.

Figure 4:
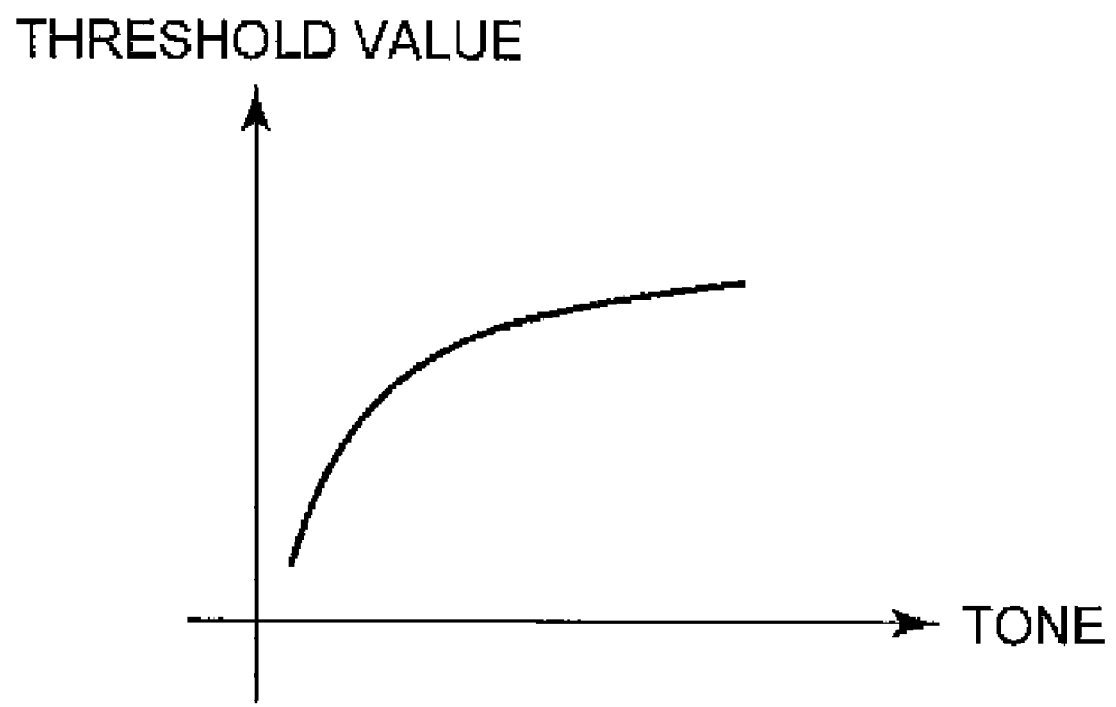
FIG. 4 is a diagram illustrating the relationship between tones and threshold values.

FIG. 4 is a view illustrating the relationship between tones and threshold values. In FIG. 4, a table which contains threshold values each corresponding to tones is illustrated as a graph. When the ϵ-selection unit 29 corresponding to a threshold-value control unit has a table giving a threshold value for each tone, the epsilon filter also preserves small edges in a small tone area but preserves only large edges in a large tone area.

By providing, as described above, an ϵ-selection unit 29 (threshold-value control unit) and a one-dimensional m-th order ϵ-filter unit 60 (edge-preserving smoothing filter) whose threshold value is controlled by the ϵ-selection unit 29, the device operates as a smoothing filter that changes edges to be preserved depending on tone of inputted image data. For example, if setting large threshold values for small tones in the threshold-value control unit, an area with small tones can be smoothed more than other areas.

Figure 5:
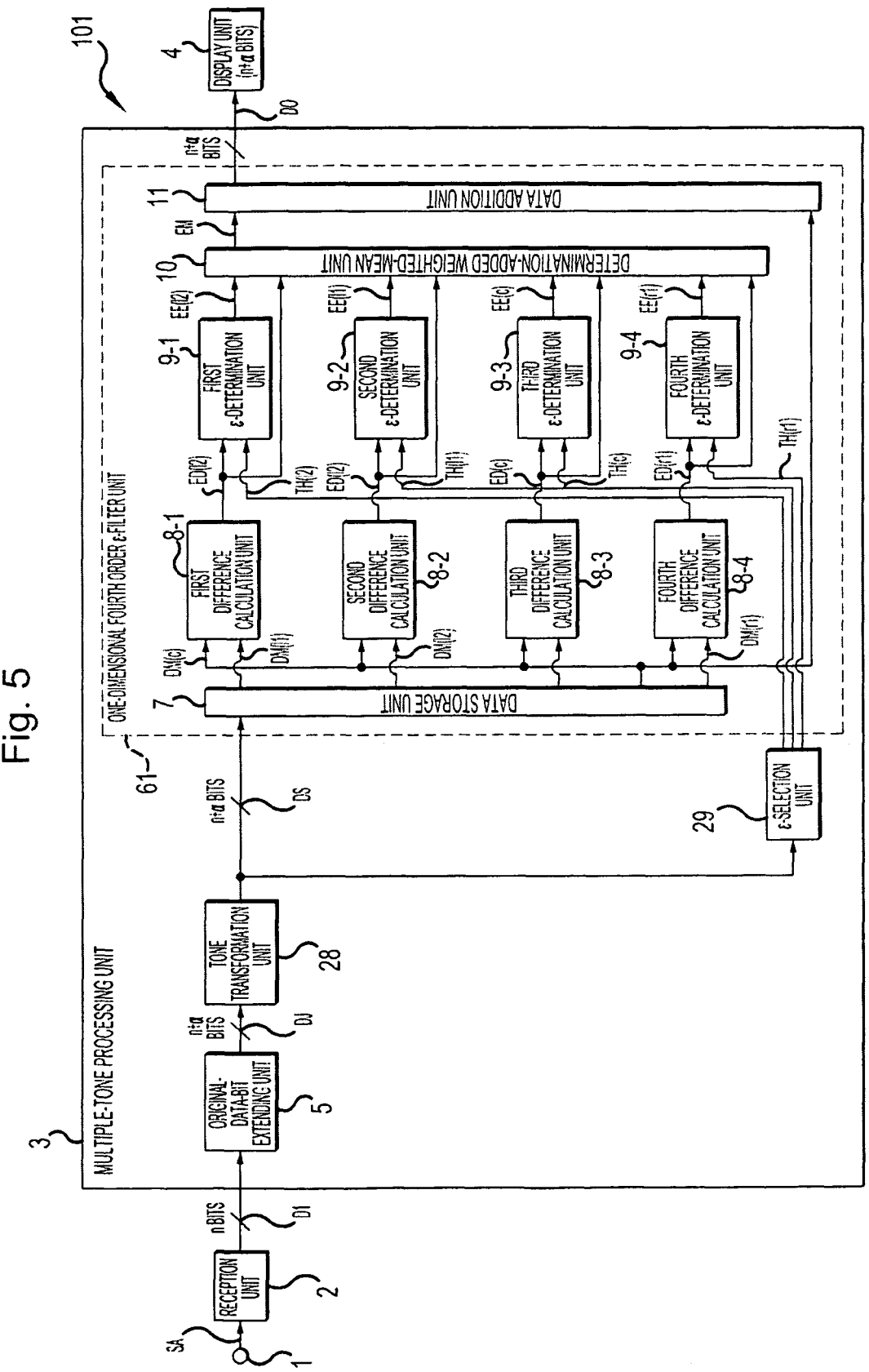
FIG. 5 is a view illustrating a configuration of an image display device of Embodiment 1 when m=4.

Hereinafter, as one example of a multiple-tone process, will be explained a case of α=2, where n-bit image data is processed to n+2 bit data by a multiple-tone process. FIG. 5 is a view illustrating a configuration of an image display device of Embodiment 1 when m=4. In addition, the same numerals are assigned to components in FIG. 5 that have the same functions as those of the components in the image display device 100 shown in FIG. 1 to omit the same explanations.

An image display device 101 includes, in place of the one-dimensional m-th order ϵ-filter unit 60, a one-dimensional fourth-order ϵ-filter unit 61. The one-dimensional fourth-order ϵ-filter unit 61 is configured to include a first difference calculation unit 8-1 through a fourth difference calculation unit 8-4, and a first ϵ-determination unit 9-1 through a fourth ϵ-determination unit 9-4.

While in the image display device 100 shown in FIG. 1 the image data DM(1) through DM(m) are inputted into the first difference calculation unit 8-1 through the m-th difference calculation unit 8-m, in the image display device 101 shown in FIG. 5 image data DM(l2), DM(l1), DM(c), and DM(r1) are inputted into the first difference calculation unit 8-1 through the fourth difference calculation unit 8-4. Image data expressed as the image data DM(l2), DM(l1), DM(c), and DM(r1) are the same data as image data DM(1), DM(2), DM(3), and DM(4) of m=4, respectively.

The image data DM(c) is image data of a given pixel c, expressing a tone DM(c). The image data DM(l1) is image data of a pixel l1 which positions one pixel before (immediately left from) (the difference between horizontal coordinate values i is one) the given pixel c1 expressing a tones DM(l1). The image data DM(l2) is image data of a pixel l2 which positions two pixels before (the difference between horizontal coordinate values i is two) the given pixel c, expressing a tones DM(l2). The image data DM(r1) is image data of a pixel r1 which positions one pixel after (immediately right from) (the difference between horizontal coordinate values i is one) the given pixel c1 expressing a tones DM(r1).

Difference data ED(l2) through ED(r1) outputted from the first difference calculation unit 8-1 through the fourth difference calculation unit 8-4 and determination data EE(l2) through EE(r1) outputted from the first ϵ-determination unit 9-1 through the fourth ϵ-determination unit 9-4 are the same data as the difference data ED(1) through ED(4) and the determination data EE(1) through EE(4) of m=4, respectively. In addition, threshold level data TH(l2) through TH(r1) outputted by the ϵ-selection unit 29 are the same data as the threshold level data TH(1) through TH(4) of m=4.

Figure 6:
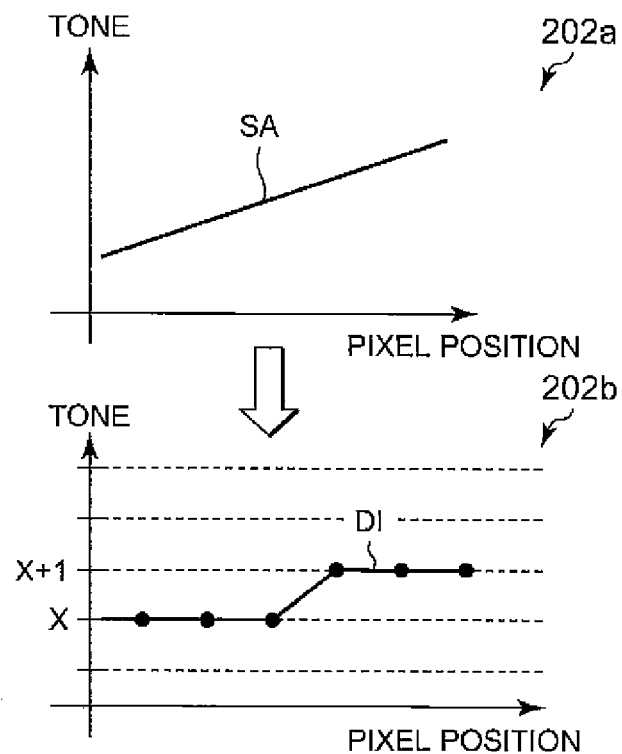
FIG. 6 are graphs for explaining an A/D conversion process performed by a reception unit.

FIG. 6 are graphs for explaining an A/D conversion process performed by a reception unit. In FIG. 6, the relationship between an analog signal SA and image data DI is shown. In each of graphs 202a and 202b shown in FIG. 6, the vertical axis represents tone and the horizontal axis represents pixel position i. The graph 202a shows tone of the analog image signal SA and the graph 202b shows tone of the digital image data DI.

In the image display device 101, the analog image signal SA shown by the graph 202a is inputted from the input terminal 1 into the reception unit 2. The reception unit 2 converts the analog image signal SA to n-bit image data DI shown in the graph 202b to output into a multiple-tone processing unit 3. Within the multiple-tone processing unit 3, the n-bit image data DI is inputted into the original-data bit-extending unit 5.

The image data signal SA (gradual tone signal) shown in the graph 202a gradually changes its tone, whereby quantization resolution for tone change is low (a small bit count), causing image data DI shown in the graph 202b to be transformed to two tones (x and x+1).

Figure 7:
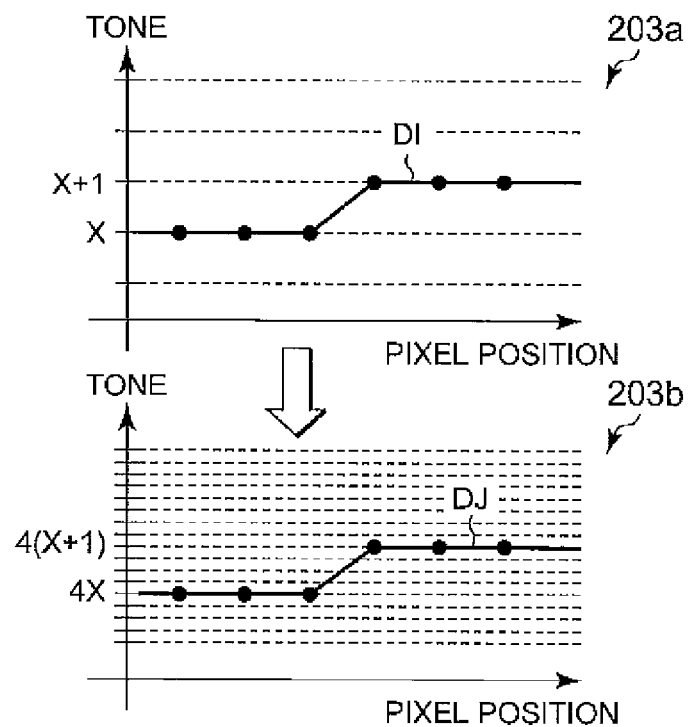
FIG. 7 are graphs for explaining a bit extension process performed by an original-data bit-extending unit.

FIG. 7 are graphs for explaining a bit extension process performed by an original-data bit-extending unit. FIG. 7 illustrate the relationship between image data DI and image data DJ. In each of graphs 203a and 203b shown in FIG. 7, the vertical axis represents tone and the horizontal axis represents pixel position i. The graph 203a shows tones of n bit long image data DI, and the graph 203b shows tones of n+2 bit long image data DJ.

The original-data bit-extending unit 5 extends by two bits the n bit image data DI as shown in the graph 203a, and then outputs into the one-dimensional fourth-order ε-filter unit 61 the n+2 bit mage data DJ as shown in the graph 203b. Because the n+2 bit mage data DJ as shown in the graph 203b has been extended by two bits, the tones of the image data DJ shown in the graph 203a have been transformed from tones of X to tones of 4X, and from tones of X+1 to tones of 4(X+1).

Figure 8:
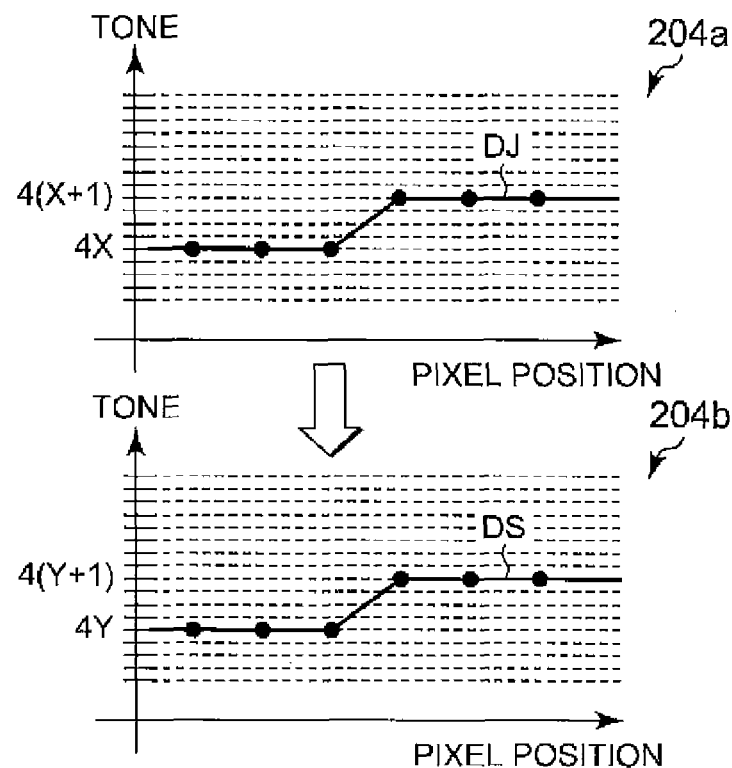
FIG. 8 are graphs for explaining a tone transformation process when tone changes gradually.

FIG. 8 are graphs for explaining a tone transformation process performed by a tone transformation unit. FIG. 8 illustrate the relationship between image data DJ and image data DS. In each of graphs 204a and 204b shown in FIG. 8, the vertical axis represents tone and the horizontal axis represents pixel position i. The graph 204a shows tones of n+2 bit image data DJ, and the graph 204b shows tones of image data DS, which is image data after the tone transformation. The tone transformation unit 28 performs various kinds of tone transformation such as a gamma transformation and a contrast correction. Here, the tone transformation unit 28 performs various kinds of tone transformation to transform tones of 4X to tones of 4Y, and tones of 4(X+1) to tones of 4(Y+1).

The ε-selection unit 29 (information corresponding to threshold values) has been set as follows: when the image data DS is close to 4Y, all the threshold level data TH(l2) through TH(r1) are outputted as "4"; and when the image data DS is close to 4(Y+1), all the threshold level data TH(l2) through TH(r1) are outputted as "8".

Figure 9:
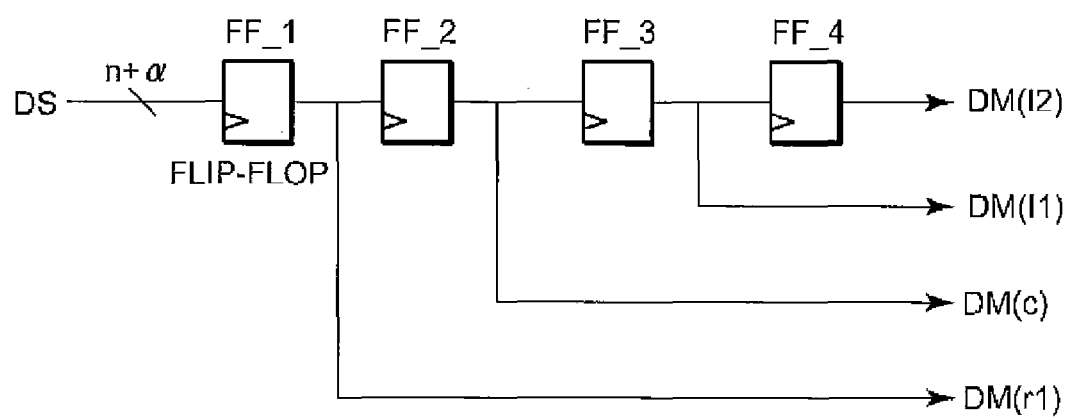
FIG. 9 is a view showing an example of a detailed configuration of a data storage unit.

The data storage unit 7 is configured, for example, as shown in FIG. 9. FIG. 9 is a view showing an example of a detailed configuration of the data storage unit. In the data storage unit 7, four cascaded flip-flops FF_1 through FF_4 are provided, so that the input image data DS is transferred, in synchronization with a pixel clock, to a first ε-determination unit 9-1 through a fourth ε-determination unit 9-4 by the four cascaded flip-flops FF_1 through FF_4. That is, in the data storage unit 7, image data DS is inputted into the flip-flop FF_1, the output of the flip-flop FF_1 is inputted into the flip-flop FF_2, the output of the flip-flop FF_2 is inputted into the flip-flop FF_3, and the output of the flip-flop FF_3 is inputted into the flip-flop FF_4 so that the flip-flops FF_1 through FF_4 each hold the image data DS.

AS a result, four pixel data successively inputted can be simultaneously held in the four flip-flops FF_1 through FF_4, and can be simultaneously outputted. More specifically, data held in the flip-flop FF_2 is outputted as data representing a tone DM(c) of a given pixel c, data held in the flip-flop FF_3 is outputted as data representing a tone DM(l1) of a pixel l1, data held in the flip-flop FF_4 is outputted as data representing a tone DM(l2) of a pixel l2, and data held in the flip-flop FF_1 is outputted as data representing a tone DM(r1) of a pixel r1.

Figures 10, 11:
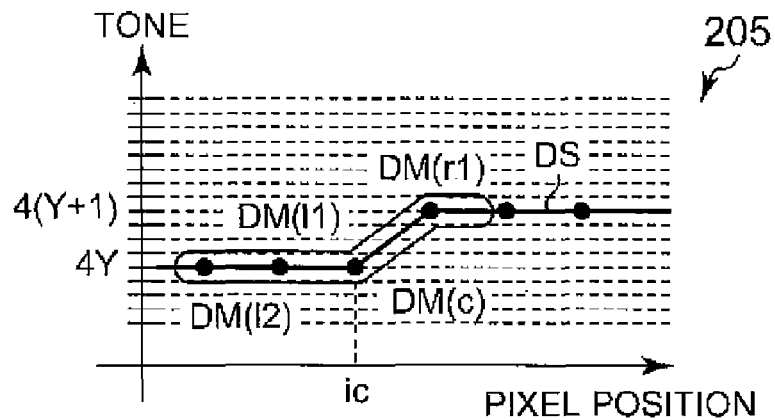
FIG. 10 is a graph for explaining image data tones that the data storage unit outputs.
FIG. 11 is a table of data that an image display device according to Embodiment 1 produces when tone changes gradually.

FIG. 10 is a graph for explaining tones of image data that the data storage unit outputs. FIG. 10 shows outputs from the data storage unit 7 when a pixel at a pixel position ic is taken as a given pixel. The vertical axis of a graph 205 shown in FIG. 10 represents tone of the image data DS inputted into the data storage unit 7 and the image data DM outputted from the data storage unit 7, and the horizontal axis thereof represents pixel position i.

In an example shown in FIG. 10, the data storage unit 7 outputs the tone DM(l2)=4Y, the tone DM(l1)=4Y, the tone DM(c)=4Y, and the tone DM(r1)=4Y+4, and then the data outputted from the data storage unit 7 are each supplied to the first difference calculation unit 8-1 through the fourth difference calculation unit 8-4. As described above, the data storage unit 7 outputs simultaneously image data DM(c) of a given pixel at a pixel position ic and image data DM(l2), DM(l1), and DM(r1) of pixels that position successively to and in the vicinity of the given pixel.

The first difference calculation unit 8-1 shown in FIG. 5 produces the difference data ED(l2) between the tone DM(l2) of the pixel l2 and the tone DM(c) of the given pixel c to output the difference into a first ε-determination unit 9-1 and a determination-added-weighted-average unit 10. The second difference calculation unit 8-2 produces the difference data ED(l1) between the tone DM(l1) of the pixel l1 and the tone DM(c) of the given pixel c to output the difference into a second ε-determination unit 9-2 and the determination-added-weighted-average unit 10. The third difference calculation unit 8-3 produces the difference data ED(c) between the tone DM(c) of the given c and the tone DM(c) of the given pixel c to output the difference into a third ε-determination unit 9-3 and the determination-added-weighted-average unit 10. The fourth difference calculation unit 8-4 produces the difference data ED(r1) between the tone DM(r1) of the pixel r1 and the tone DM(c) of the given pixel c to output the difference into a fourth ε-determination unit 9-4 and the determination-added-weighted-average unit 10.

As described above, the difference calculation units 8-1 through 8-4 calculates the differences between image data DM(c) of a given pixel and each of image data DM(l2), DM(c), DM(l1), and DM(r1) that position successively to and in the vicinity of the given pixel, and outputs difference data ED(l2), ED(l1), ED(c), and ED(r1) that represent the differences.

FIG. 11 is a table of data that an image display device according to Embodiment 1 produces when tone changes gradually. FIG. 11 shows, when the pixel at a pixel position ic shown in FIG. 10 is a given pixel P(c), a correspondence relationship among image data DM(k), difference data ED (k) based on the image data DM(k), determination data EE(k), f{ED(k)}, a weighted average value EM, and threshold level data TH(k).

In FIG. 11, the image data DM(k) is image data that the data storage unit 7 outputs, and the difference data ED(k) is calculated by the first difference calculation unit 8-1 through the fourth difference calculation unit 8-4 based on the image data DM (k). The determination data EE(k) is data (determination results) calculated by the ε-determination unit 9-1 through the fourth ε-determination unit 9-4, and the weighted average value EM is a datum that the determination-added weighted average unit 10 produces. In addition, the threshold level data TH is outputted by the ε-selection unit 29, and f{ED(k)} is a value that the determination-added weighted average unit 10 produces during its calculation.

The first difference calculation unit 8-1 outputs ED(l2)=DM(l2)−DM(c)=4Y−4Y=0; the second difference calculation unit 8-2 outputs ED(l1)=DM(l1)−DM(c)=4Y−4Y=0; the third difference calculation unit 8-3 outputs ED(c)=DM(c)−DM(c)=4Y−4Y=0; and the fourth difference calculation unit 8-4 outputs ED(r1)=DM(r1)−DM(c)=(4Y+4)−4Y=4.

The ε-selection unit 29 has been set to output as "4" all threshold level data TH(l2) through TH(r1) when the image data DS is close to 4Y. Therefore the threshold level data TH(l2)=4, the threshold level data TH(l1)=4, the threshold level data TH(c)=4, and the threshold level data TH(r1)=4 are inputted into the first ε-determination unit 9-1 through the fourth ε-determination unit 9-4, when the image data DS=4Y and the image data DS=4Y+4.

Each of the first ε-determination unit 9-1 through the fourth ε-determination unit 9-4 receives the difference data ED(k) and the threshold level data TH(k), and determines whether or not the difference data ED(k) is greater than the threshold level data TH(k).

Each of the first ε-determination unit 9-1 through the fourth ε-determination unit 9-4 outputs as determination data EE(k) shown in FIG. 11 into the determination-added weighted average unit 10 its determination result of whether or not the difference data ED(k) is greater than the threshold level data TH(k). That is, each of the first ε-determination unit 9-1 through the fourth ε-determination unit 9-4 outputs "0" as EE(k) when the difference data ED(k) is greater than the threshold level data TH(k), and outputs "1" as EE(k) when the difference data ED(k) is smaller than or equal to the threshold level data TH(k).

More specifically, the first ε-determination unit 9-1 generates "0" when the difference data ED(l2) is greater than the threshold level data TH(l2), and generates "1" when the difference data ED(l2) is smaller than or equal to the threshold level data TH(l2) (ε); the second ε-determination unit 9-2 generates "0" when the difference data ED(l1) is greater than the threshold level data TH(l1), and generates "1" when the difference data ED(l1) is smaller than or equal to the threshold level data TH(l1); the third ε-determination unit 9-3 generates "0" when the difference data ED(c) is greater than the threshold level data TH(c), and generates "1" when the difference data ED(c) is smaller than or equal to the threshold level data TH(c); and the fourth ε-determination unit 9-4 generates "0" when the difference data ED(r1) is greater than the threshold level data TH(r1), and generates "1" when the difference data ED(r1) is smaller than or equal to the threshold level data TH(r1).

As described above, the first ε-determination unit 9-1 through the fourth ε-determination unit 9-4 generate the determination data EE(l1) through EE(r1) based on the difference data ED(l1) through ED(r1) and the threshold level data TH(l1) through TH(r1). And then, the generated data EE(l1) through EE(r1) are supplied to the determination-added weighted average unit 10.

In the example shown in FIG. 11, "0" is inputted into the first ε-determination unit 9-1 through the third ε-determination unit 9-3 as the difference data ED(l2), ED(l1), and ED(c), respectively, and "4" is inputted into the fourth ε-determination unit 9-4 as the difference data ED(r1). And then, the difference data ED(l2) through ED(r1) are smaller than or equal to the threshold level data TH(l2) through TH(r1), respectively, so that the determination difference data EE(l2) through EE(r1) are all set as "1".

The determination-added weighted average unit 10 obtains, on the basis of the determination data EE(l2) through EE(r1), a weighted average of the difference data ED(l2) through ED(r1) to output the resultant weighted average value EM. In the determination-added weighted average unit 10, when the determination data EE(k) is "1" the difference data ED(k) is multiplied by a coefficient $a_k$ and then added, but when the determination data EE(k) is "0", the difference data is not added. In other words, the determination-added weighted average unit 10 performs calculations to obtain a weighted average of data produced from a function of the difference data ED(k), that is expressed in a predetermined formula (later described f{ED(k)}) and depends on the determination data EE(k).

Figure 12:
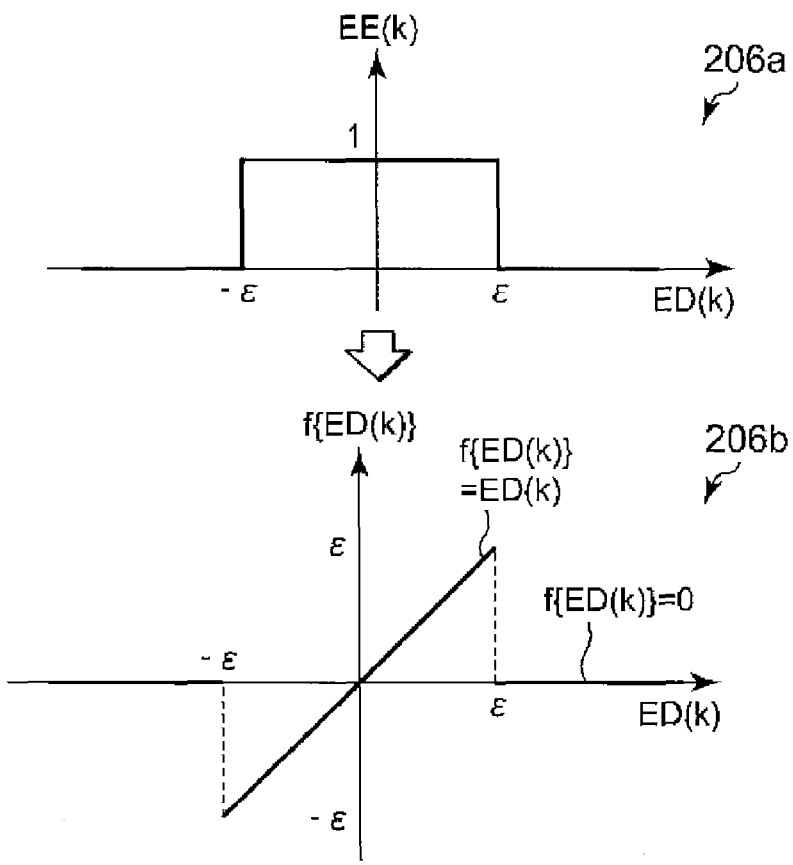
FIG. 12 are graphs for explaining a concept of a weighted average.

FIG. 12 are graphs for explaining a concept for obtaining a weighted average. A graph 206a shown in the upper side of FIG. 12 illustrates a relationship between the difference data ED(k) inputted into the first ε-determination unit 9-1 through the fourth ε-determination unit 9-4 and the determination data EE(k) to be outputted from the first ε-determination unit 9-1 through the fourth ε-determination unit 9-4.

A graph 206b shown in the lower side thereof illustrates a relationship between the difference data ED(k) inputted into the determination-added weighted average unit 10 and difference data f{ED(k)} outputted as a weighted average from the determination-added weighted average unit 10.

The first ε-determination unit 9-1 through the fourth ε-determination unit 9-4 generate the determination data EE(l1) through EE(r1) based on the difference data ED(l1) through ED(r1) and the threshold level data TH(l1) through TH(r1). And then, the generated determination data EE(l1) through EE(r1) are supplied to the determination-added weighted average unit 10.

As shown by the graph 206b, when the absolute value of the difference data ED(k) is smaller than or equal to a threshold value ε, f{ED(k)}=ED(k); and when the absolute value of the difference data ED(k) is larger than the threshold value ε, f{ED(k)}=0. As described above, the determination-added weighted average unit 10 obtains a weighted average from values f{ED(k)} given by the function illustrated as the graph 206b, using the difference data ED(l1) through ED(r1).

When coefficients $a_k$ (=$a_{l2}$, $a_{l1}$, $a_c$, $a_{r1}$) are all 0.25, because the determination data EE(l2) through EE(r1) in the example shown in FIG. 11 are all "1", the output (weighted average value EM) of the determination-added weighted average unit 10 is given by a formula (5) below.

$$EM = a_{12} \times ED(12) + a_{11} \times ED(11) + a_c \times ED(c) + a_{r1} \times ED(r1) \quad (5)$$
$$= (0.25 \times 0) + (0.25 \times 0) + (0.25 \times 0) + (0.25 \times 4)$$
$$= 1$$

In the image display device 101, the processes (the difference calculations and the ε-determinations) operate the image data DS supplied from the original-data bit-extending unit 5, taking sequentially each pixel as a given pixel, and then a calculation given by the formula (5) (calculation for a weighted average) is performed.

Figure 13:
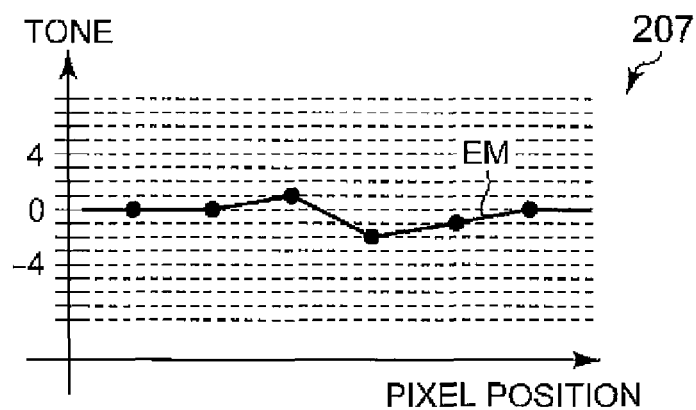
FIG. 13 is a graph of weighted averages on image data, that the data storage unit shown in FIG. 10 outputs.

FIG. 13 is a graph of weighted averages on image data, that the data storage unit shown in FIG. 10 outputs. FIG. 13 shows each weighted average EM corresponding to the image data DM (a weighted average EM with a pixel at pixel position i being taken as a given pixel). In a graph 207 shown in FIG. 13, the horizontal axis represents pixel positions i of the given pixels, and the vertical axis represents tones of the weighted average values EM. The determination-added weighted average unit 10 outputs the weighted average EM into a data addition unit 11.

Figure 14:
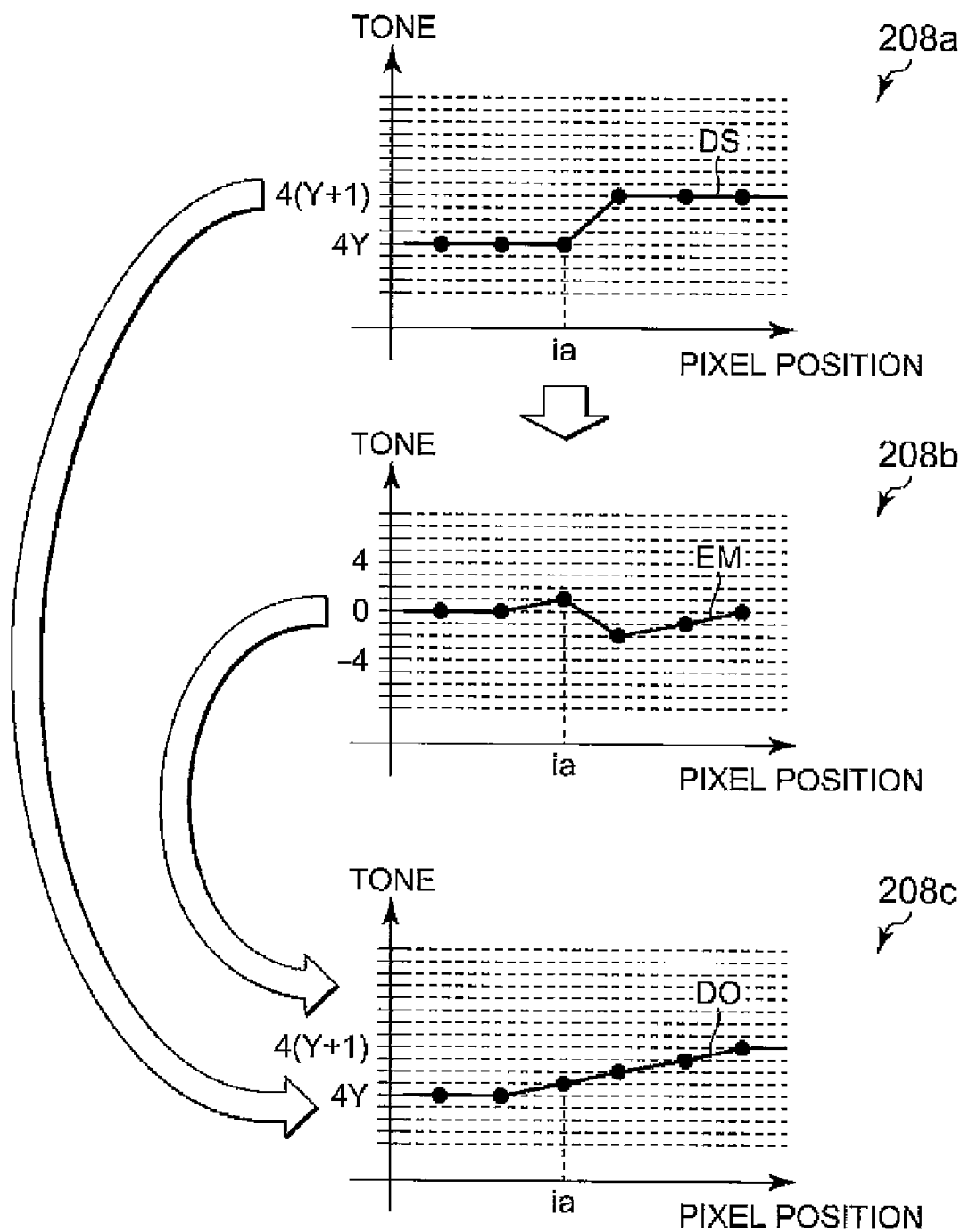
FIG. 14 are graphs for explaining a data addition process performed by a data addition unit.

FIG. 14 are graphs for explaining a data addition process performed by the data addition unit. In graphs 208a through 208c shown in FIG. 14, the horizontal axis represents pixel positions i, and the vertical axis represents tones. The graph 208a shows tones of the image data DS, the graph 208b shows tones of the weighted average values EM, and the graph 208c shows tones of the image data DO.

The data addition unit 11 adds the image data DS shown by the graph 208a with the weighted average value EM shown by the graph 208b to output the image data DO shown by the graph 208c. For example, at the pixel position $i_a$ shown in each of the graphs 208a through 208c, because $DS(i_a)=4Y$, $EM(i_a)=1$, then $DO(i_a)=DS(i_a)+EM(i_a)=4Y+1$.

As described above, in this embodiment, it is possible to increase an effective number of tones in an area whose tone changes gradually. In addition, when n-bit image is transformed into n+2 bit data, the image data DO changes gradually. And, when tones of the image data DS, whose bit length are extended from the image signal SA, jump from 4Y to 4Y+4 (by 4=22) as shown in the graph 208a, tones of the image data can be interpolated using tones of 4Y+1, 4Y+1, and 4Y+3, as shown by graph 208c.

Figure 15:
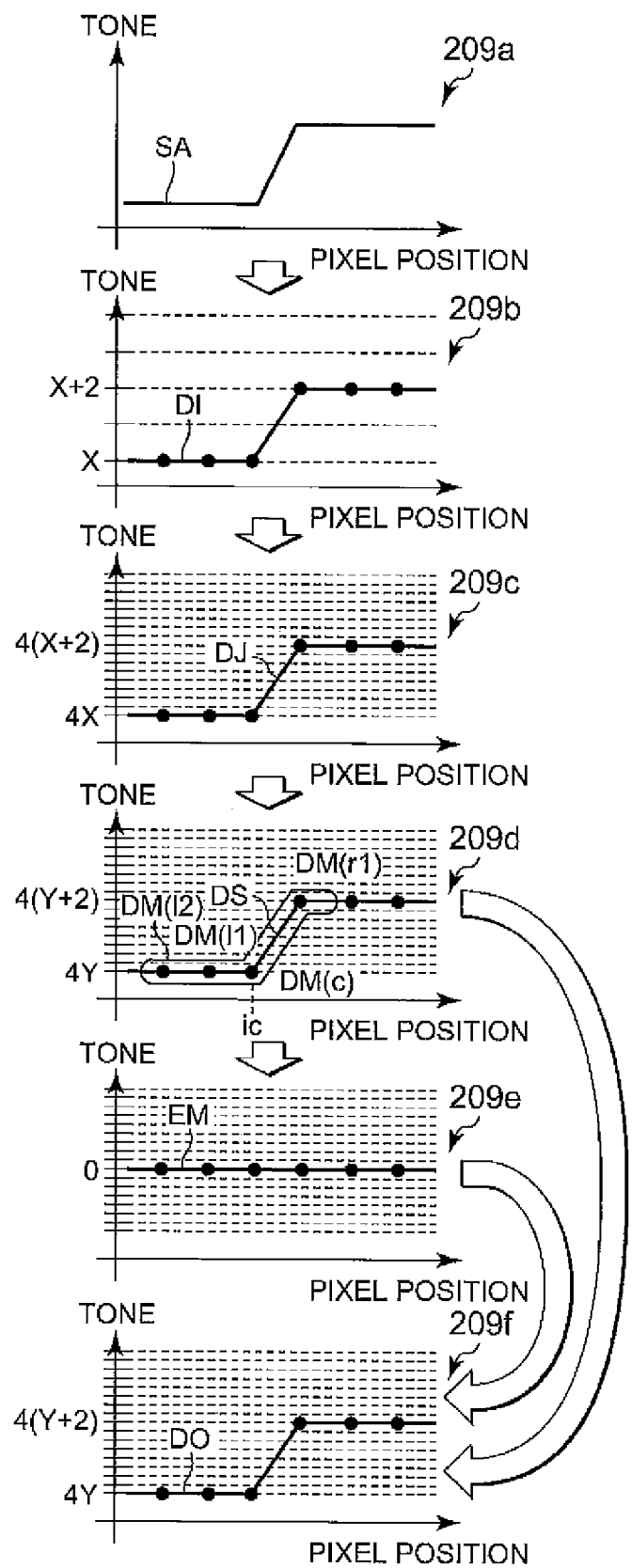
FIG. 15 are graphs for explaining operations when an analog image signal, whose tone value steeply changes, is inputted into an image display device according to Embodiment 1.

Next, operations will be explained in a case where an analog image signal SA is inputted so that its tone data changes large and steeply at the input portion of the epsilon filter. FIG. 15 are graphs for explaining operations when an analog image signal, whose tone value changes large and steeply, is inputted into the image display device according to Embodiment 1. In each of graphs 209a through 209f shown in FIG. 15, the horizontal axis represents pixel positions i, and the vertical axis represents tones.

The graph 209a shows tones of an analog image signal SA; the graph 209b shows n-bit tones of image data DI; and the graph 209c shows n+α bit image data DJ. The graph 209d shows tones of n+α bit image data DS and image data DM; the graph 209e shows tones of weighted average values EM; and the graph 209f shows n+α bit image data DO.

In the image display device 101, an analog image signal SA shown by the graph 202a is inputted from the input terminal 1 into the reception unit 2. The reception unit 2 converts the analog image signal SA to n-bit digital image data DI (n bits) (two tones (X and X+2)) shown in the graph 209b to output into the original-data bit-extending unit 5. The image data signal SA (steep tone signal) shown in the graph 209a changes its tone large and steeply, whereby quantization resolution for tone change is high (a large bit count), causing the image data DI shown in the graph 209b to be transformed to two tones (X and X+2).

The original-data bit-extending unit 5 transforms tones X of image data DI shown by the graph 209b to tones 4X and transforms tones X+2 to tones 4(X+2) to output such image data DJ as shown in the graph 209c into the tone transformation unit 28.

The tone transformation unit 28 performs tone transformation of the tones 4X to tones 4Y, and performs tone transformation of the tones 4(X+2) to tones 4(Y+2), then outputting image data DS shown in the graph 209d into the one-dimensional fourth-order ε-filter unit 61.

FIG. 16 is a table of data that an image display device according to Embodiment 1 produces when tone changes steeply. When taking as a given pixel P(c) the pixel at a pixel position ic shown in FIG. 209d, FIG. 16 shows a correspondence relationship among image data DM(k), difference data ED(k) produced based on the image data DM(k), determination data EE(k), f{ED(k)}, a weighted average value EM, and threshold level data TH(k).

The data storage unit 7 outputs DM(l2)=4Y, DM(l1)=4Y, DM(c)=4Y, and DM(r1)=4Y+8 into the first difference calculation unit 8-1 through the fourth difference calculation unit 8-4, respectively.

The first difference calculation unit 8-1 outputs ED(l2)=DM(l2)−DM(c)=4Y−4Y=0; the second difference calculation unit 8-2 outputs ED(l1)=DM(l1)−DM(c)=4Y−4Y=0; the third difference calculation unit 8-3 outputs ED(c)=DM(c)−DM(c)=4Y−4Y=0; and the fourth difference calculation unit 8-4 outputs ED(r1)=DM(r1)−DM(c)=(4Y+8)−4Y=8. Therefore, "0" is inputted into each of the first ε-determination unit 9-1 through the third ε-determination unit 9-3, and "8" is inputted into the fourth ε-determination unit 9-4.

The ε-selection unit 29 has been set to output as "4" all threshold level data TH(l2) through TH(r1) when the image data DS is close to 4Y. Therefore, the threshold level data TH(l2)=4, the threshold level data TH(l1)=4, the threshold level data TH(c)=4, and the threshold level data TH(r1) 4 are inputted into the first ε-determination unit 9-1 through the fourth ε-determination unit 9-4, when the image data DS=4Y and the image data DS=4Y+8.

The difference data ED(l2) through ED(c) are smaller than or equal to the threshold level data TH(l2) through TH(c), respectively, so that the determination difference data EE(l2) through EE(c) are all set as "1"; and the difference data ED(r1) is larger than the threshold level data TH(r1), so that the determination data EE(r1) is set as "0".

In the determination-added weighted average unit 10, when the determination data EE(k) is "1", the difference data ED(k) is multiplied by a coefficient $a_k$ and then added, but when the determination data EE(k) is "0", the difference data is not added. When coefficients $a_k$ (=$a_{l2}$, $a_{l1}$, $a_c$, $a_{r1}$) are all 0.25, the output (weighted average value EM) of the determination-added weighted average unit 10 is given by a formula (6) below, for the example shown in FIG. 16.

$$EM = a_{12} \times ED(12) + a_{11} \times ED(11) + a_c \times ED(c) \quad (6)$$
$$= (0.25 \times 0) + (0.25 \times 0) + (0.25 \times 0)$$
$$= 0.$$

In the image display device 101, the processes described above operate the image data DS supplied from the original-data bit-extending unit 5, taking sequentially each pixel as a given pixel, and then a calculation given by the formula (6) is performed.

The graph 209e shows tones of the weighted average values EM corresponding to the image data DM shown in the graph 209d (a weighted average EM with a pixel at pixel position i being taken as a given pixel). The determination-added weighted average unit 10 outputs the weighted average EM into the data addition unit 11. The data addition unit 11 adds the image data DS shown by the graph 209d with the weighted average value EM shown by the graph 209e to output the image data DO shown in a graph 209f.

As shown in the graph 209f, the image data DO changes steeply similarly to the input (analog image signal SA) or the mage data DI. As described above, the epsilon filter can preserve the sharpness in areas where tone changes large and steeply.

Next, explanations will be made about operations of the image display device 101 when an analog image signal SA is inputted into the device, in which the analog image signal gradually changes its tone similarly to that shown in graph 202a in FIG. 6 but produces a large tone jump by transformation in tone (hereinafter, the analog image signal is referred to as an analog image signal with a gradual tone change, that jumps by transformation).

Figure 17:
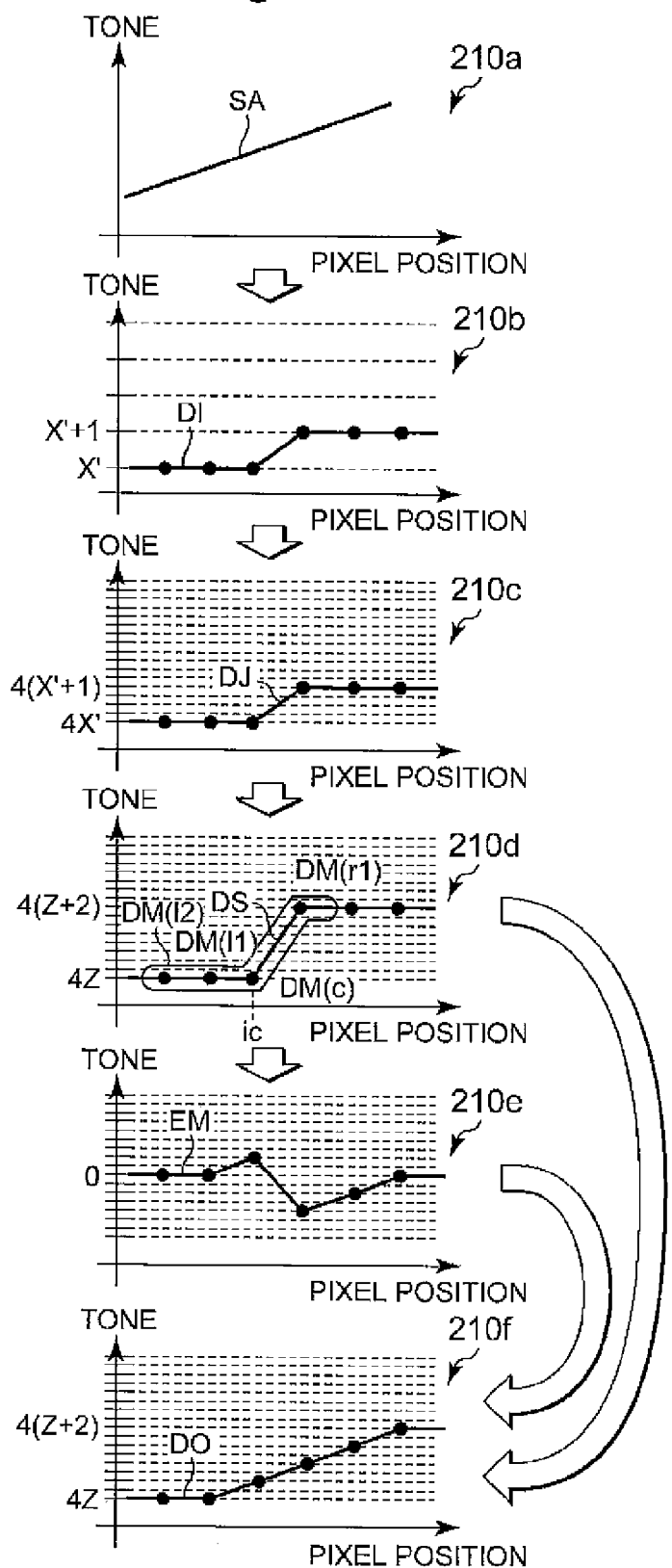
FIG. 17 are graphs for explaining operations when an analog image signal with a gradual tone change, that jumps by transformation, is inputted into an image display device according to Embodiment 1.

FIG. 17 are graphs for explaining operations when an analog image signal with a gradual tone change, that jumps by transformation, is inputted into the image display device according to Embodiment 1. In each of graphs 210a through 210f shown in FIG. 17, the horizontal axis represents pixel positions i, and the vertical axis represents tones.

The graph 210a shows tone of an analog image signal SA (an analog image signal with a gradual tone change, that jumps by transformation); the graph 210b shows n-bit tones of image data DI; and the graph 210c shows n+α bit image data DJ. The graph 201d shows tones of n+α bit image data DS and image data DM; the graph 210e shows tones of weighted average values EM; and the graph 210f shows n+α bit image data DO.

In the image display device 101, an analog image signal SA shown by the graph 210a is inputted from the input terminal 1 into the reception unit 2. The reception unit 2 converts the analog image signal SA to digital image data DI (n bits) (two tones (X' and X'+1)) shown in the graph 210b to output into the original-data bit-extending unit 5. The tone X' and the tone X'+1 are tones different from the tone X and the tone X+1, and they produce a large tone jump when transformed in tone.

The original-data bit-extending unit 5 transforms tones X' of the image data DI shown by the graph 210b to tones 4X' and transforms tones X'+1 to tones 4(X'+1) to output such image data DJ as shown in the graph 210c into the tone transformation unit 28. The tone transformation unit 28 performs tone transformation of the tones 4X' to tones 4Z and performs tone transformation of the tones 4(X'+1) to tones 4(Z+2), then outputting image data DS (image data DS having an increased tone jump) shown in the graph 210d into the one-dimensional fourth-order ε-filter unit 61.

FIG. 18 is a table of data that the image display device according to Embodiment 1 produces when an analog image signal with a gradual tone change, that jumps by transformation, is inputted. When taking as a given pixel P(c) the pixel at a pixel position ic shown in FIG. 210d, FIG. 18 shows a correspondence relationship among image data DM(k), difference data ED(k) produced based on the image data DM(k), determination data EE(k), f{ED(k)}, a weighted average value EM, and threshold value data TH(k).

The data storage unit 7 outputs DM(l2)=4Z, DM(l1)=4Z, DM(c)=4Z, and DM(r1)=4Y+8 into the first difference calculation unit 8-1 through the fourth difference calculation unit 8-4, respectively.

The first difference calculation unit 8-1 outputs ED(l2)=DM(l2)−DM(c)=4Z−4Z=0; the second difference calculation unit 8-2 outputs ED(l1)=DM(l1)−DM(c)=4Z−4Z=0; the third difference calculation unit 8-3 outputs ED(c)=DM(c)−DM(c)=4Z−4Z=0; and the fourth difference calculation unit 8-4 outputs ED(r1)=DM(r1)−DM(c)=(4Z+8)−4Z=8. Therefore, "0" is inputted into each of the first ε-determination unit 9-1 through the third ε-determination unit 9-3, and "8" is inputted into the fourth ε-determination unit 9-4.

The ε-selection unit 29 has been set to output as "8" all threshold level data TH(l2) through TH(r1) when the image data DS is close to 4Z.

Therefore, the threshold level data TH(l2)=8, the threshold level data TH(l1)=8, the threshold level data TH(c)=8, and the threshold level data TH(r1)=8 are inputted into the first ε-determination unit 9-1 through the fourth ε-determination unit 9-4, when the image data DS=4Z and the image data DS=4Z+8.

The difference data ED(l2) through ED(r1) are smaller than or equal to the threshold level data TH(l2) through TH(r1), respectively, so that the determination difference data EE(l2) through EE(r1) are all set as "1".

In the determination-added weighted average unit 10, when the determination data EE(k) is "1", the difference data ED(k) is multiplied by a coefficient $a_k$ and then added, but when the determination data EE(k) is "0", the difference data is not added. When coefficients $a_k$ (=$a_{l2}$, $a_{l1}$, $a_c$, $a_{r1}$) are all 0.25, the output (weighted average value EM) of the determination-added weighted average unit 10 is given by a formula (7) below, for the example shown in FIG. 18.

$$EM = a_{l2} \times ED(l2) + a_{l1} \times ED(l1) + a_c \times ED(c) + a_{r1} \times ED(r1) \quad (7)$$
$$= (0.25 \times 0) + (0.25 \times 0) + (0.25 \times 0) + (0.25 \times 8)$$
$$= 2$$

In the image display device 101, the processes described above operate the image data DS supplied from the original-data bit-extending unit 5, taking sequentially each pixel as a given pixel, and then a calculation given by the formula (7) is performed.

The graph 210e shows tones of the weighted average values EM corresponding to the image data DM shown in the graph 210d (a weighted average EM with a pixel at pixel position i being taken as a given pixel). The determination-added weighted average unit 10 outputs the weighted average EM into the data addition unit 11. The data addition unit 11 adds the image data DS shown by the graph 210d with the weighted average value EM shown by the graph 210e to output the image data DO shown by the graph 210f. As described above, in this embodiment, the ε-selection unit 29 is provided to output threshold values according to image data transformed in tone from the image data DS; therefore, the epsilon filter is capable of increasing the effective number of tones for an area where tone changes gradually even when tone jump develops through tone transformation.

Next, explanations will be made about operations of the image display device 101 when an analog image signal SA is inputted into the device 101, in which the signal's tone changes large and steeply similarly to that shown in graph 209a in FIG. 15 but produces a large tone jump by transformation in tone (hereinafter, the analog image signal is referred to as an analog image signal with a steep tone change, that jumps by transformation).

Figure 19:
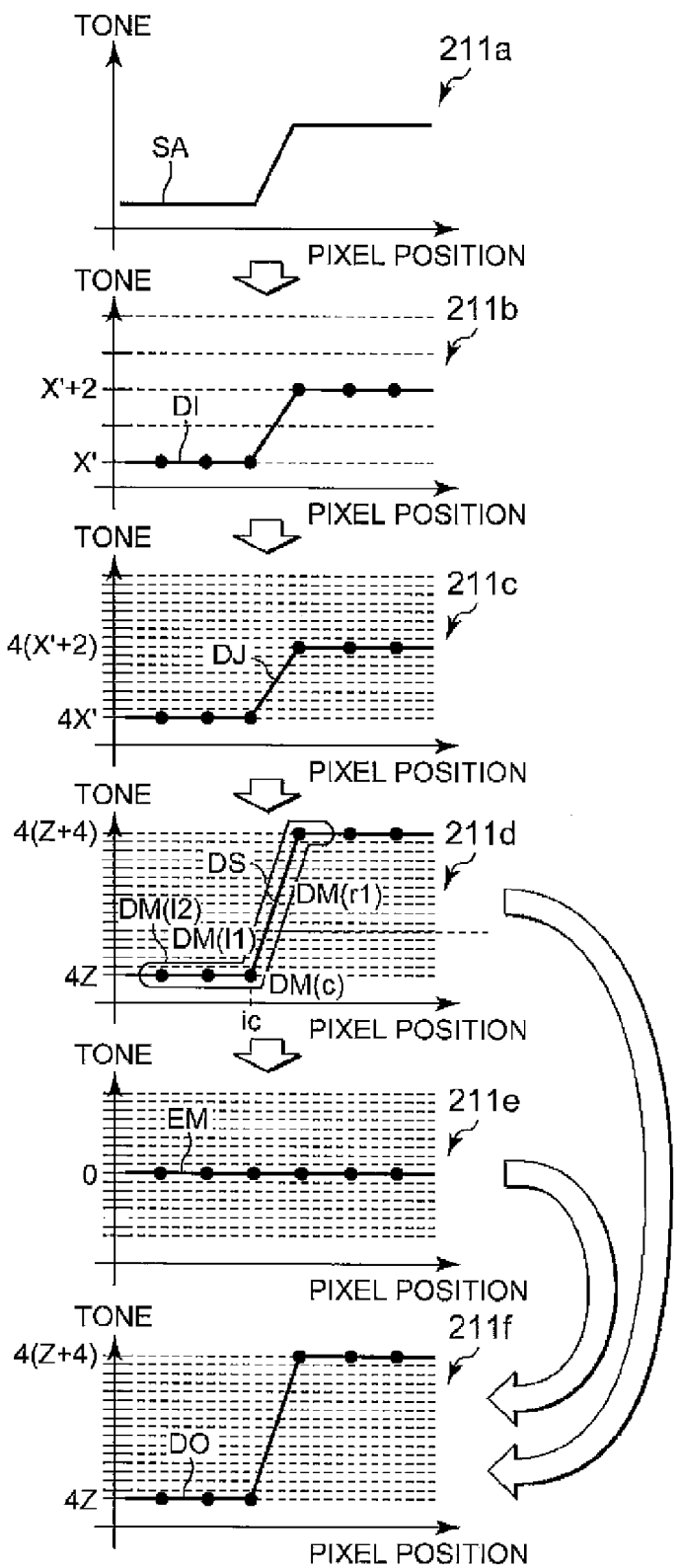
FIG. 19 are graphs for explaining operations when an analog image signal with a steep tone change, that jumps by transformation, is inputted into an image display device according to Embodiment 1.

FIG. 19 are graphs for explaining operations when an analog image signal with a steep tone change, that jumps by transformation, is inputted into the image display device according to Embodiment 1. In each of graphs 211a through 211f shown in FIG. 19, the horizontal axis represents pixel positions i, and the vertical axis represents tones.

The graph 211a shows tone of an analog image signal SA (an analog image signal with a steep tone change, that jumps by transformation); the graph 211b shows tones of n-bit image data DI, and the graph 2113c shows tones of n+2 bit image data DJ. The graph 211d shows tones of n+α bit image data DS and image data DM; the graph 211e shows tones of weighted average values EM; and the graph 211f shows n+α bit image data DO.

In the image display device 101, an analog image signal SA shown by the graph 211a is inputted from the input terminal 1 into the reception unit 2. The reception unit 2 converts the analog image signal SA to n-bit digital image data DI (n bits) (two tones (X' and X'+2)) shown in the graph 211b to output into the original-data bit-extending unit 5. The tone X' and the tone X'+2 are tones different from the tone X and the tone X+2, and they produce large a tone jump when transformed in tone.

The original-data bit-extending unit 5 transforms tones X' of the image data DI shown in the graph 211*b* to tones 4X' and transforms tones X'+2 to tones 4(X'+2) to output such image data DJ as shown in the graph 211*c* into the tone transformation unit 28.

The tone transformation unit 28 performs tone transformation of the tones 4X' to tones 4Z, and performs tone transformation of the tones 4(X'+2) to tones 4(Z+4), then outputting image data DS shown in the graph 211*d* into the one-dimensional fourth-order ϵ-filter unit 61.

Figures 20, 21:
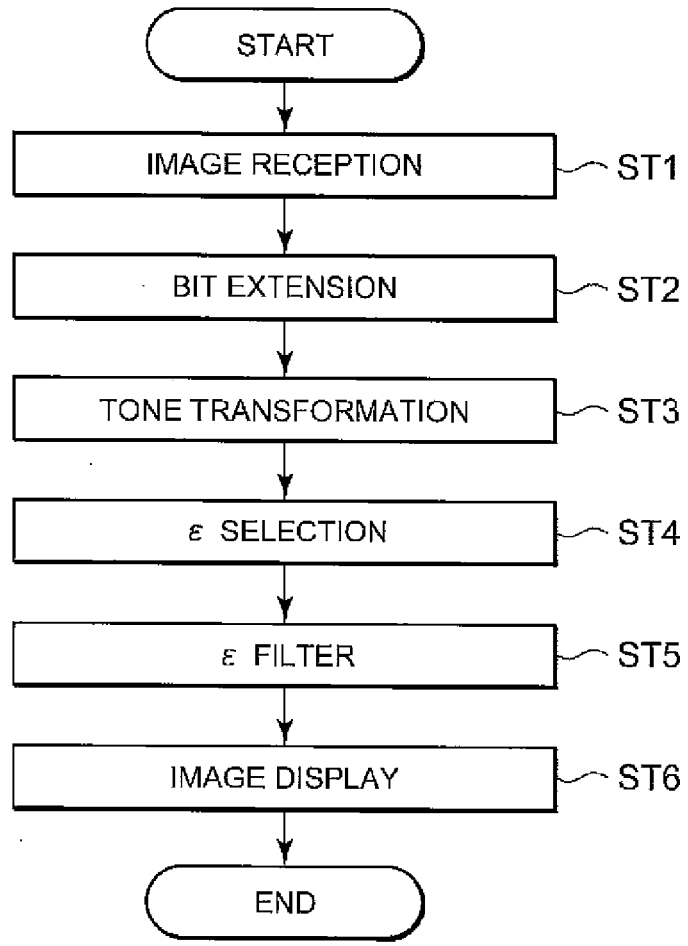
FIG. 20 is a table of data that the image display device according to Embodiment 1 produces when an analog image signal with a steep tone change, that jumps by transformation, is inputted.
FIG. 21 is a flow chart showing a procedure of an image display device according to Embodiment 1.

FIG. 20 is a table of data that the image display device according to Embodiment 1 produces when an analog image signal with a steep tone change, that jumps by transformation, is inputted. When taking as a given pixel P(c) the pixel at a pixel position ic shown in the graph 211*d*, FIG. 20 shows a correspondence relationship among image data DM(k), difference data ED(k) produced based on the image data DM(k), determination data EE(k), f{ED(k)}, a weighted average value EM, and threshold level data TH(k).

The data storage unit 7 outputs DM(l2)=4Z, DM(l1)=4Z, DM(c)=4Z, and DM(r1)=4Z+16 into the first difference calculation unit 8-1 through the fourth difference calculation unit 8-4, respectively.

The first difference calculation unit 8-1 outputs ED(l2)=DM(l2)−DM(c)=4Z−4Z=0; the second difference calculation unit 8-2 outputs ED(l1)=DM(l1)−DM(c)=4Z−4Z=0; the third difference calculation unit 8-3 outputs ED(c)=DM(c)−DM(c)=4Z−4Z=0; and the fourth difference calculation unit 8-4 outputs ED(r1)=DM(r1)−DM(c)=(4Z+16)−4Z=16. Therefore, "0" is inputted into each of the first ϵ-determination unit 9-1 through the third ϵ-determination unit 9-3, and "16" is inputted into the fourth ϵ-determination unit 9-4.

The ϵ-selection unit 29 has been set to output "8" for all threshold level data TH(l2) through TH(r1) when the image data DS is close to 4Z. Therefore, the threshold level data TH(l2)=8, the threshold level data TH(l1)=8, the threshold level data TH(c)=8, and the threshold level data TH(r1)=8 are inputted into the first ϵ-determination unit 9-1 through the fourth ϵ-determination unit 9-4, when the image data DS=4Z and the image data DS=4Z+16. The difference data ED(l2) through ED(r1) are smaller than or equal to the threshold level data TH(l2) through TH(r1), respectively, so that the determination difference data EE(l2) through EE(r1) are all set as "1"; and the difference data ED(r1) is larger than the threshold level data TH(r1), so that the determination data EE(r1) is set as "0".

In the determination-added weighted average unit 10 when the determination data EE(k) is "1", the difference data ED(k) is multiplied by a coefficient $a_k$ and then added, but when the determination data EE(k) is "0", the difference data is not added. When coefficients $a_k$ (=$a_{l2}$, $a_{l1}$, $a_c$, $a_{r1}$) are all 0.25, the output (weighted average value EM) of the determination-added weighted average unit 10 is given by a formula (8) below, for the example shown in FIG. 20.

$$EM = a_{l2} \times ED(l2) + a_{l1} \times ED(l1) + a_c \times ED(c) \quad (8)$$
$$= (0.25 \times 0) + (0.25 \times 0) + (0.25 \times 0)$$
$$= 0$$

In the image display device 101, the processes described above operate the image data DS supplied from the original-data bit-extending unit 5, taking sequentially each pixel as a given pixel, and then a calculation given by the formula (8) is performed.

The graph 211*e* shows tones of the weighted average values EM corresponding to the image data DM shown in the graph 211*d* (a weighted average EM with a pixel at pixel position i being taken as a given pixel) The determination-added weighted average unit 10 outputs the weighted average EM into the data addition unit 11. The data addition unit 11 adds the image data DS shown by the graph 211*d* with the weighted average value EM shown by the graph 211*e* to output the image data DO shown by the graph 211*f*.

As shown in the graph 211*f*, the image data DO changes steeply similarly to the input (analog image signal SA) or the image data DI. As described above, the epsilon filter can preserve the sharpness in areas where tone changes large and steeply. As described before, in this embodiment, the epsilon filter is provided with the ϵ-selection unit 29; therefore, even when an analog image signal with a steep tone change, that jumps by transformation, is inputted, the magnitude of edges to be preserved can be changed according to input tones.

FIG. 21 is a flow chart that shows processing steps of the image display device according to this embodiment described above. Firstly, when an analog image signal SA is inputted into the input terminal 1, the reception unit 2 receives the analog image signal SA to output n-bit image data DI (step ST1).

The image data DI outputted from the reception unit 2 is inputted into the original-data bit-extending unit 5 of the multiple-tone processing unit 3. The original-data bit-extending unit 5 extends the image data DI by a bits to output n+α bit image data DJ (step ST2).

The image data DJ outputted from the original-data bit-extending unit 5 is inputted into the tone transformation unit 28. The tone transformation unit 28 performs tone transformation of the image data DJ to output n+α bit image data DS (step ST3).

The n+α bit image data DS is inputted into the ϵ-selection unit 29. The ϵ-selection unit 29 selects threshold level data TH(1) through TH(m)-ϵ selection-according to the image data DS to output them (step ST4). Into the one-dimensional m-th order ϵ-filter unit 60, inputted are the n+α bit image data DS and the threshold level data TH(1) through TH(m). The one-dimensional m-th order ϵ-filter unit 60 increases the number of tones in areas where tone changes gradually, to output image data DO (step ST5). The image data DO is inputted into the display unit 4. The display unit 4 displays an image based on the image data DO (step ST6).

Figure 22:
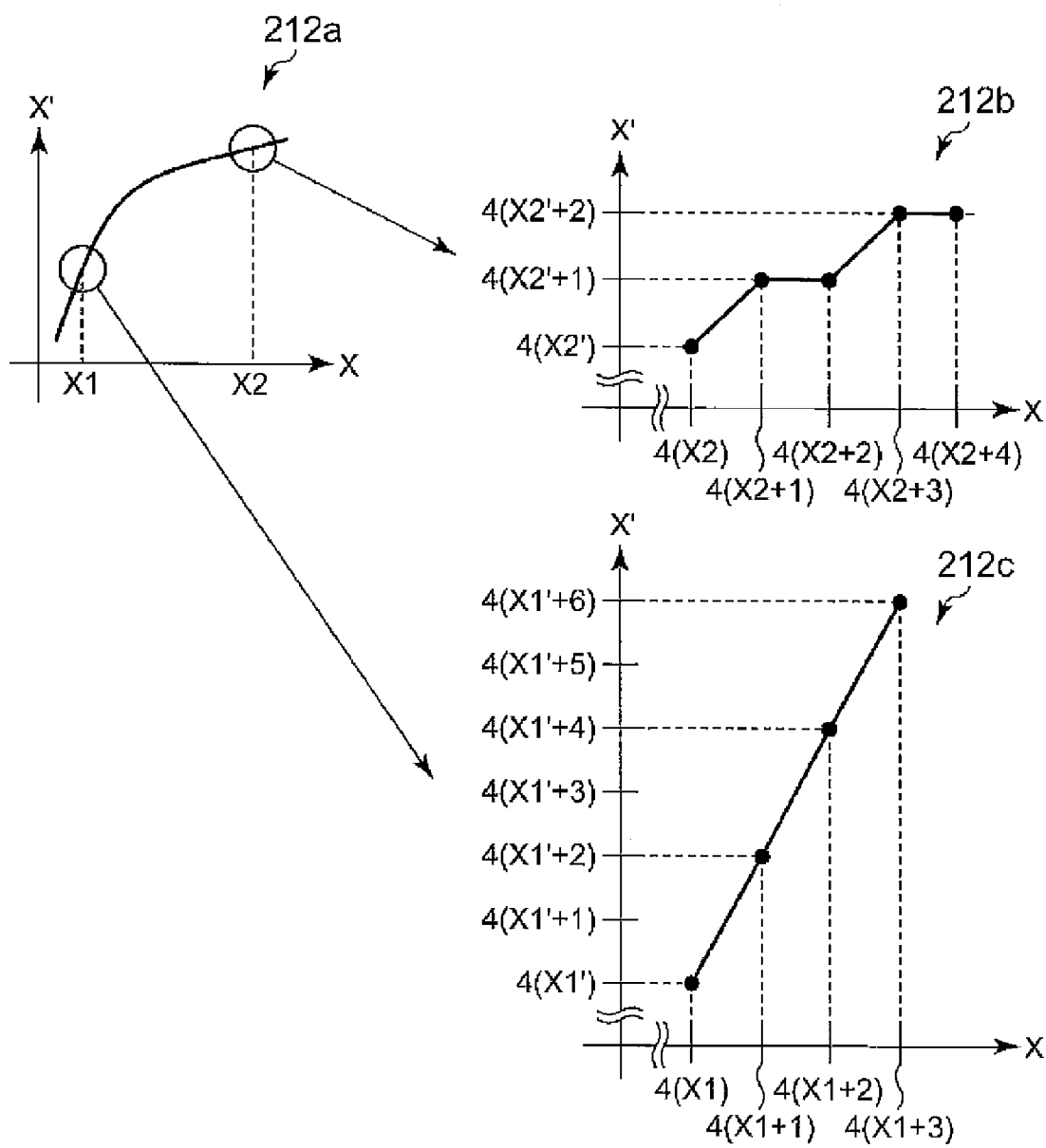
FIG. 22 are graphs for explaining a gamma transformation process performed by a tone transformation unit.

Effects of the embodiment will be explained with reference to FIG. 22 through FIG. 24. FIG. 22 are graphs for explaining a gamma transformation process performed by the tone transformation unit. A graph 212*a* is a view that illustrates the relationship between tones X before tone transformation and tones X' after tone transformation. A graph 212*b* is a view that illustrates the relationship between tones X before gamma transformation and tones X' after gamma transformation in an area (tone X2) where the tone changes gradually; and a graph 212*c* is a view that illustrates the relationship between tones X before gamma transformation and tones X' after gamma transformation in an area (tone X1) where the tone changes steeply.

As shown by the graph 212*b* in FIG. 22, with respect to a tone X2 changing gradually, the tone transformation unit 28 performs gamma transformation of tones 4(X2) through 4(X2+4), to tones 4(X2') through 4(X2'+2).

On the other hand, as shown by the graph 212*c* in FIG. 22, with respect to a tone X1 changing steeply, the tone transformation unit 28 performs gamma transformation of tones 4(X1) through 4(X1+1), to tones 4(X1') through 4(X1'+2).

The tone transformation unit 28 performs such gamma transformation as shown in FIG. 22. In this case, when a signal (image data DJ) shown by a graph 213a in FIG. 23 is inputted into the tone transformation unit 28, the tone transformation unit 28 outputs image data DS shown by a graph 213b in FIG. 23. When a signal (image data DJ) shown by a graph 214a in FIG. 24 is inputted into the tone transformation unit 28, the tone transformation unit 28 outputs image data DS shown by a graph 214b in FIG. 24.

Figure 23:
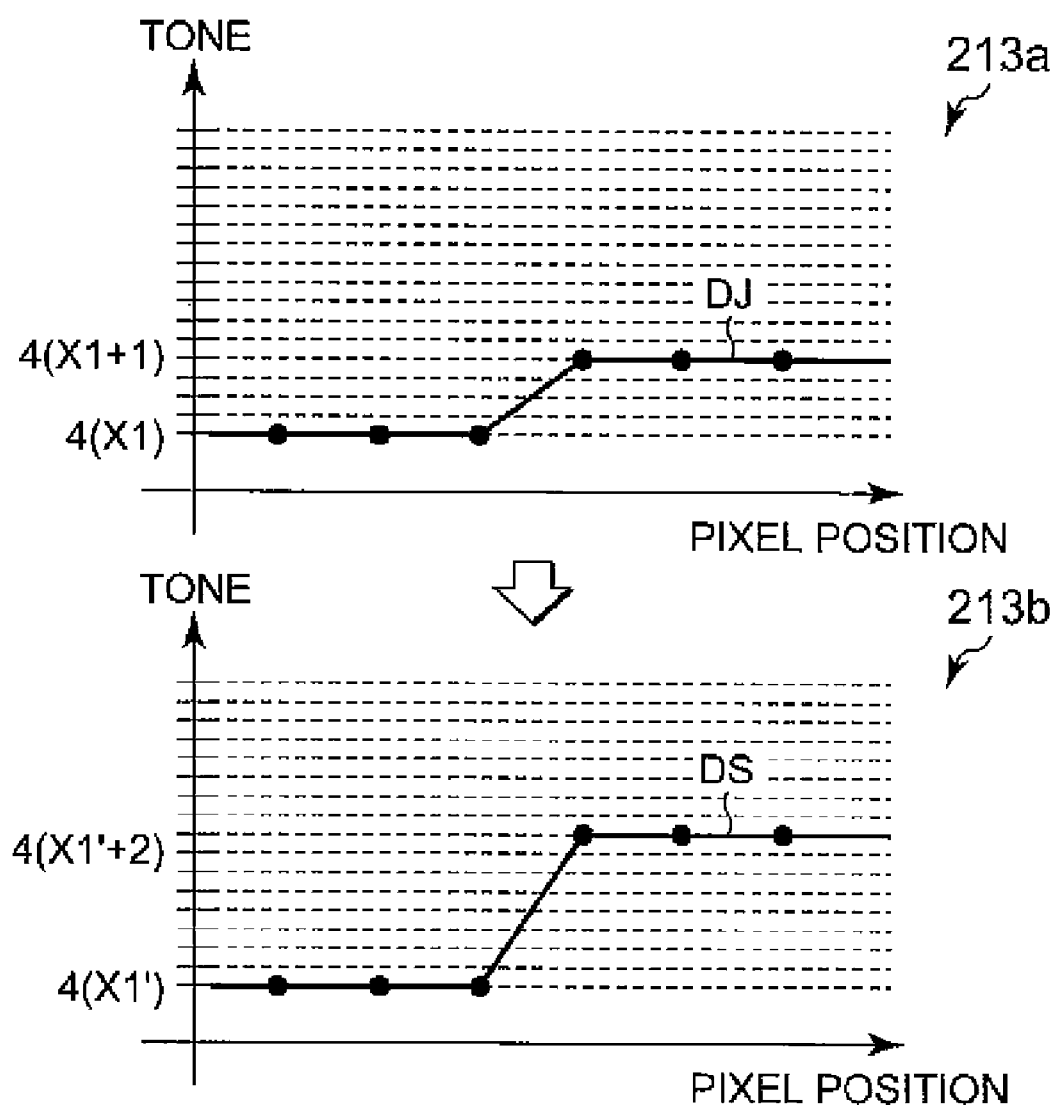
FIG. 23 are graphs for explaining a gamma transformation process when tone changes gradually.
Figure 24:
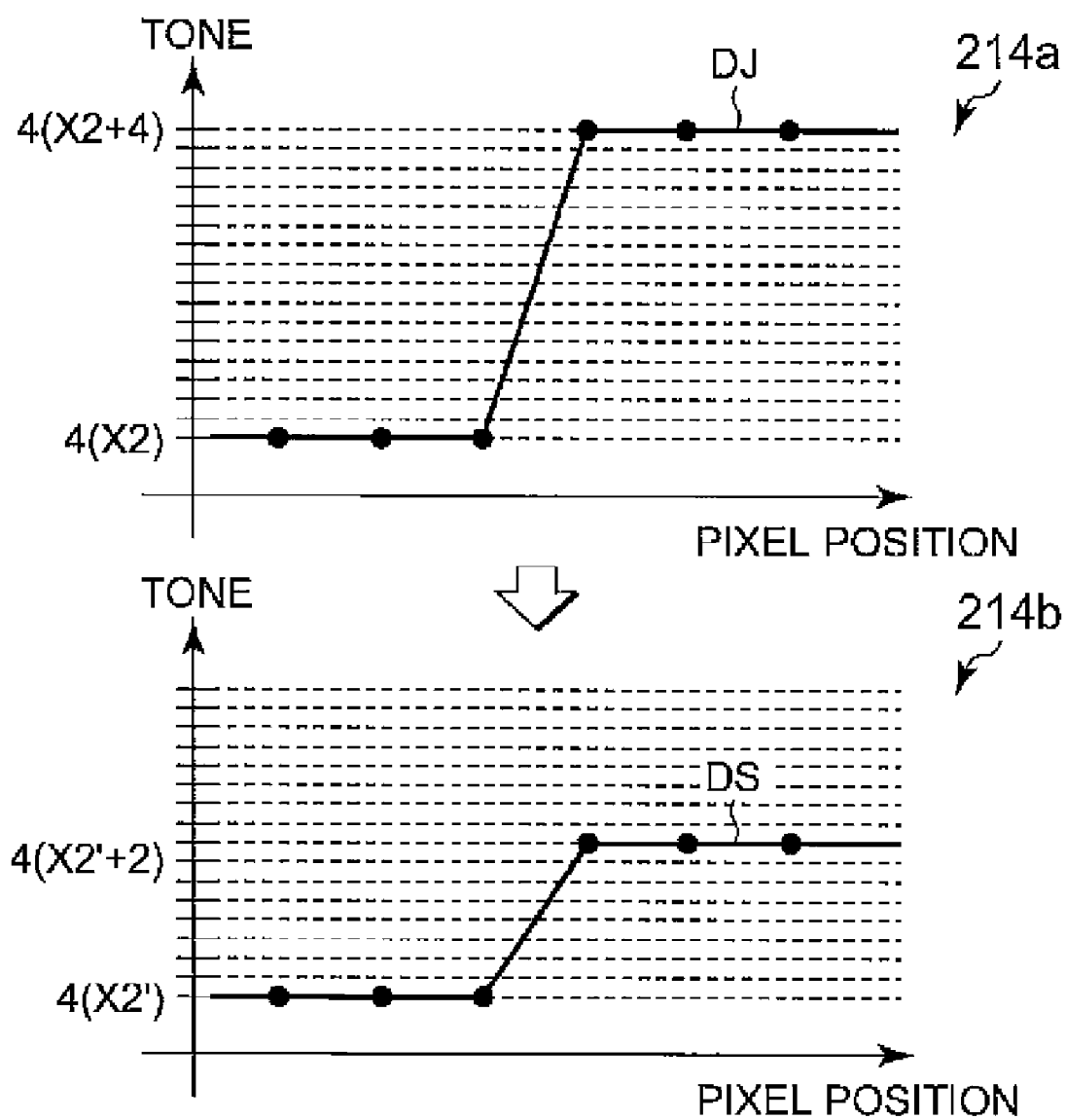
FIG. 24 are graphs for explaining a gamma transformation process when tone changes steeply.

The graph 213b in FIG. 23 and the graph 214b in FIG. 24 show tone jumps that have the same tone difference; however, the graph 213a in FIG. 23 shows a gradual tone change before tone transformation, and the graph 214a in FIG. 24 shows a steep tone change before tone transformation. Thus, it is desired that a tone jump caused from the gradual tone change (in a case of FIG. 23) be interpolated. On the other hand, it is desired that a steep tone change (in a case of FIG. 24) be preserved. In the embodiment, the ϵ-selection unit 29 has been set so that the unit outputs a threshold value of 8 for its input tone values close to 4(X1') and outputs a threshold value of 4 for its input tone values close to 4(X2'); therefore, the unit can perform the desired operations (to interpolate its tone jump for a gradual tone change and preserve its tone change for a steep tone change). Explanations have been made under an assumption that the tone transformation unit 28 performs gamma transformation, to which operations the embodiment is not limited. Other tone transformation such as contrast correction may be used.

In the embodiment, even when a tone transformation function such as gamma transformation changes tone values whose bit counts are increased by bit extension, the filter described above is capable of processing tone variations as small-magnitude noises, increasing an effective number of tones while preserving steep changes in an image, such as contours.

When a threshold value of the ϵ-selection unit 29 is set, as described above, to a value to which the tone transformation function modifies a tone increment by bit extension, it is possible to increase an effective number of tones. Then, when a larger threshold value is set, it is possible to smooth tone differences larger than a tone increment by bit extension, which brings a noise elimination effect.

When α=0-eliminating (not using) bit-extension function, the device functions as a smoothing filter preserving different edges according to tones of an input image, which brings a noise elimination effect. For example, if setting large threshold values for small tones in the threshold-value control unit, an area with small tones can be smoothed more than other areas. That is, the device can be used as a filter that controls noise-filtering degree according to input tones.

Figure 25:
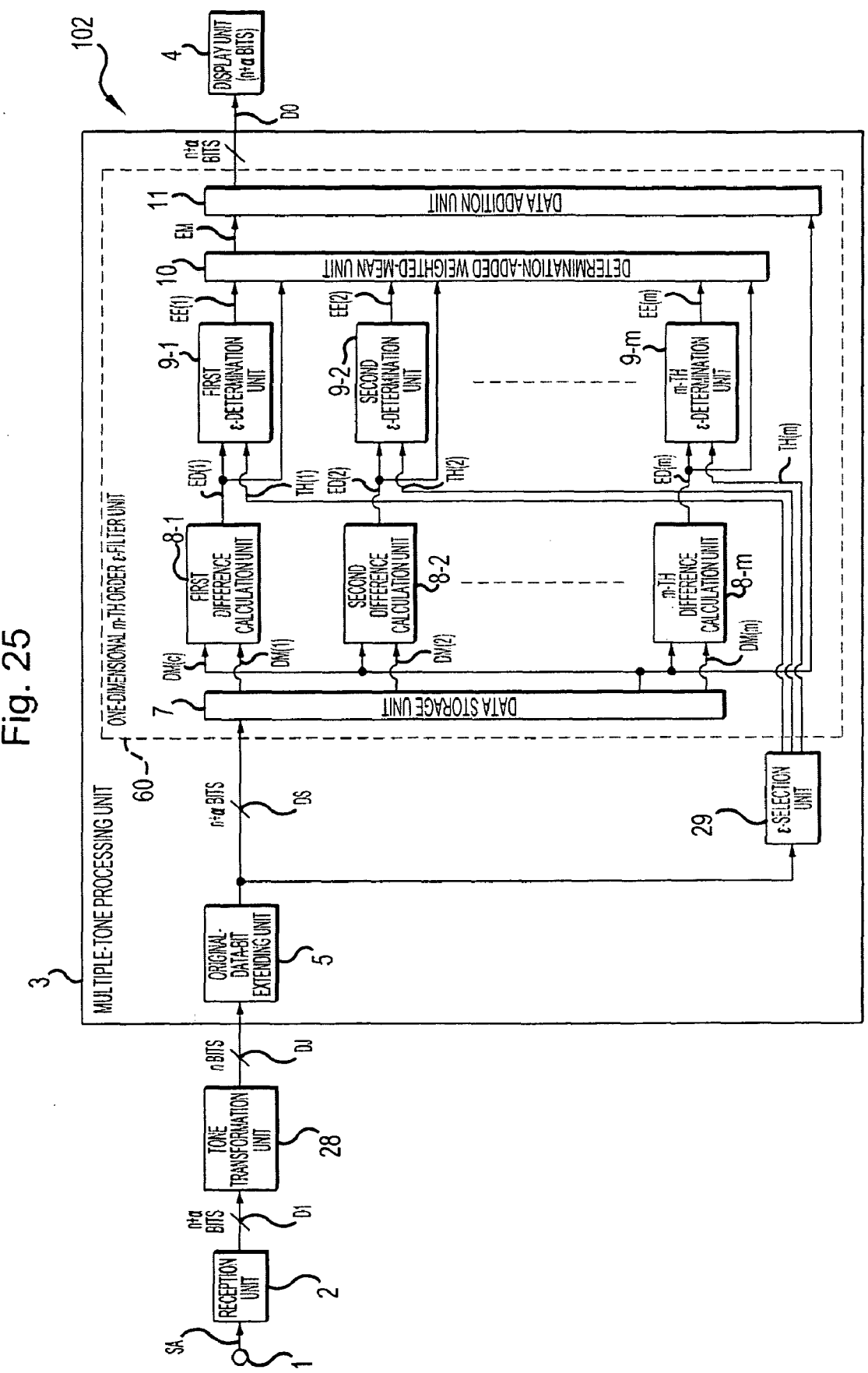
FIG. 25 is a view illustrating another configuration (1) of an image display device according to Embodiment 1.

FIG. 25 is a view illustrating another configuration (1) of the image display device according to Embodiment 1. The same numerals are assigned to components in FIG. 25 that have the same functions as those of the components in the image display device 101 shown in FIG. 1 to omit the same explanations.

In the image display device 102, the tone transformation unit 28 is provided upstream of the original-data bit-extending unit 5. When an analog image signal SA is inputted into the input terminal 1, the reception unit 2 receives the analog image signal SA to input n-bit image data DI into the tone transformation unit 28.

The tone transformation unit 28 performs tone transformation of the image data DI to input n-bit image data DJ into the original-data bit-extending unit 5. The original-data bit-extending unit 5 extends the image data DI by a bits to output n+α bit image data DS. And then, image data DS outputted from the original-data bit-extending unit 5 is inputted into the tone transformation unit 28 and the one-dimensional m-th order ϵ-filter unit 60.

In the image display device 102, if the threshold values in the ϵ-selection unit 29 are set according to the characteristic of its tone transformation, it becomes possible that the number of tones in an area where tone changes gradually is increased without degrading sharpness (steep change of a signal).

Figure 26:
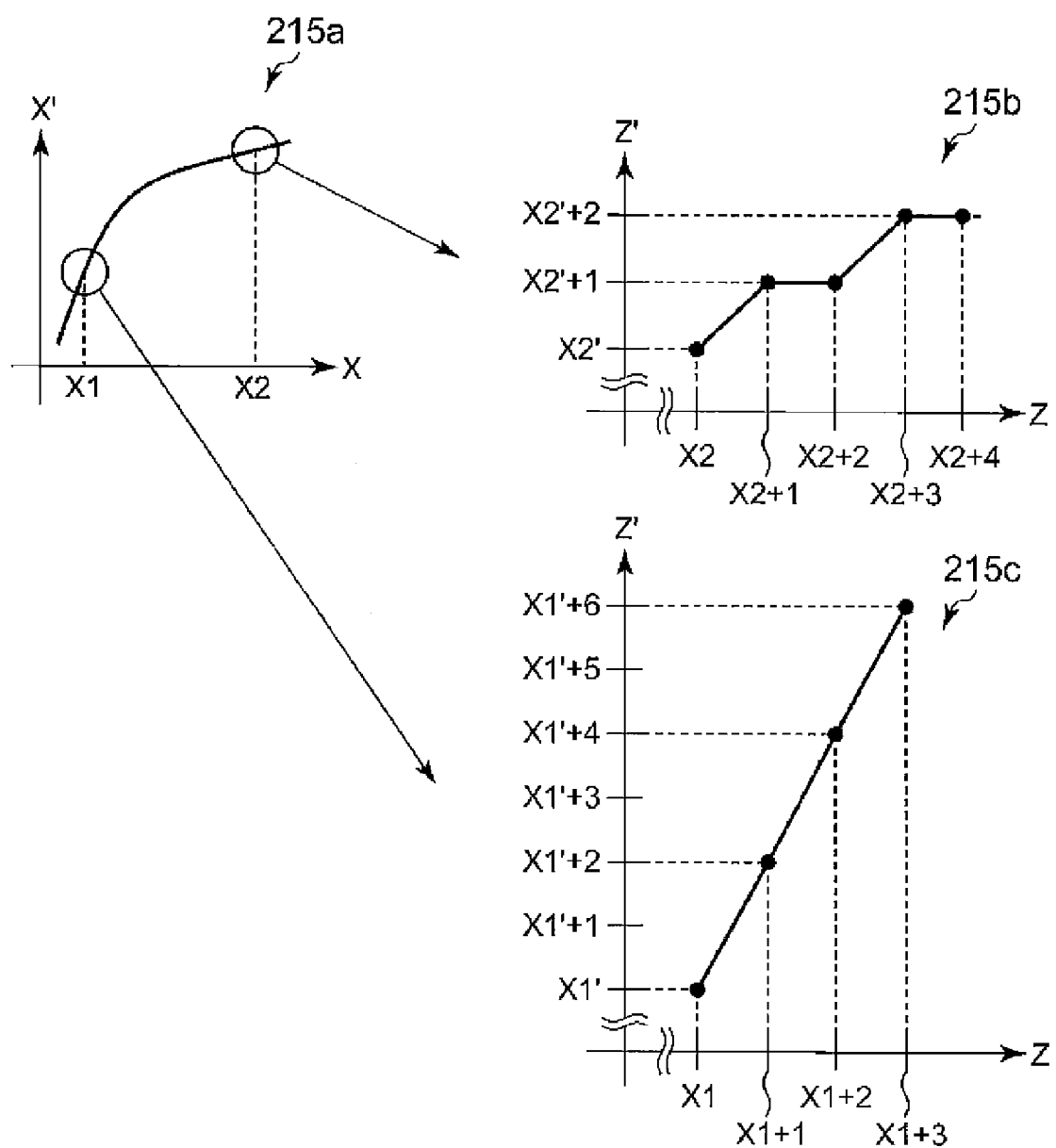
FIG. 26 are graphs for explaining a gamma transformation process performed by a tone transformation unit shown in FIG. 25.

Operations and effects of the image display device 102 will be explained with reference to FIG. 26 through FIG. 28. FIG. 26 are graphs for explaining a gamma transformation process performed by the tone transformation unit. A graph 215a is a graph that illustrates the relationship between tones X before tone transformation and tones X' thereafter. A graph 215b is a view that illustrates the relationship between tones X before gamma transformation and tones X' thereafter in an area (tone X2) where the tone changes gradually; and a graph 215c is a view that illustrates the relationship between tones X before gamma transformation and tones X' thereafter in an area (tone X1) where the tone changes steeply.

As shown by the graph 215b in FIG. 26, with respect to the tone X2 changing gradually, the tone transformation unit 28 performs gamma transformation of tones (X2) through (X2+4), to tones (X2') through (X2'+2).

On the other hand, as shown by the graph 215c in FIG. 26, with respect to a tone X1 changing steeply, the tone transformation unit 28 performs gamma transformation of tones (X1) through (X1+3), to tones (X1') through (X1'+6).

The tone transformation unit 28 performs such gamma transformation as shown in FIG. 26. In this case, when a signal (image data DI) shown by a graph 216a in FIG. 27 is inputted into the tone transformation unit 28, the tone transformation unit 28 outputs image data DJ shown by a graph 216b in FIG. 27. The original-data bit-extending unit 5 transforms the image data DJ to image data DS shown by a graph 216c.

Figure 28:
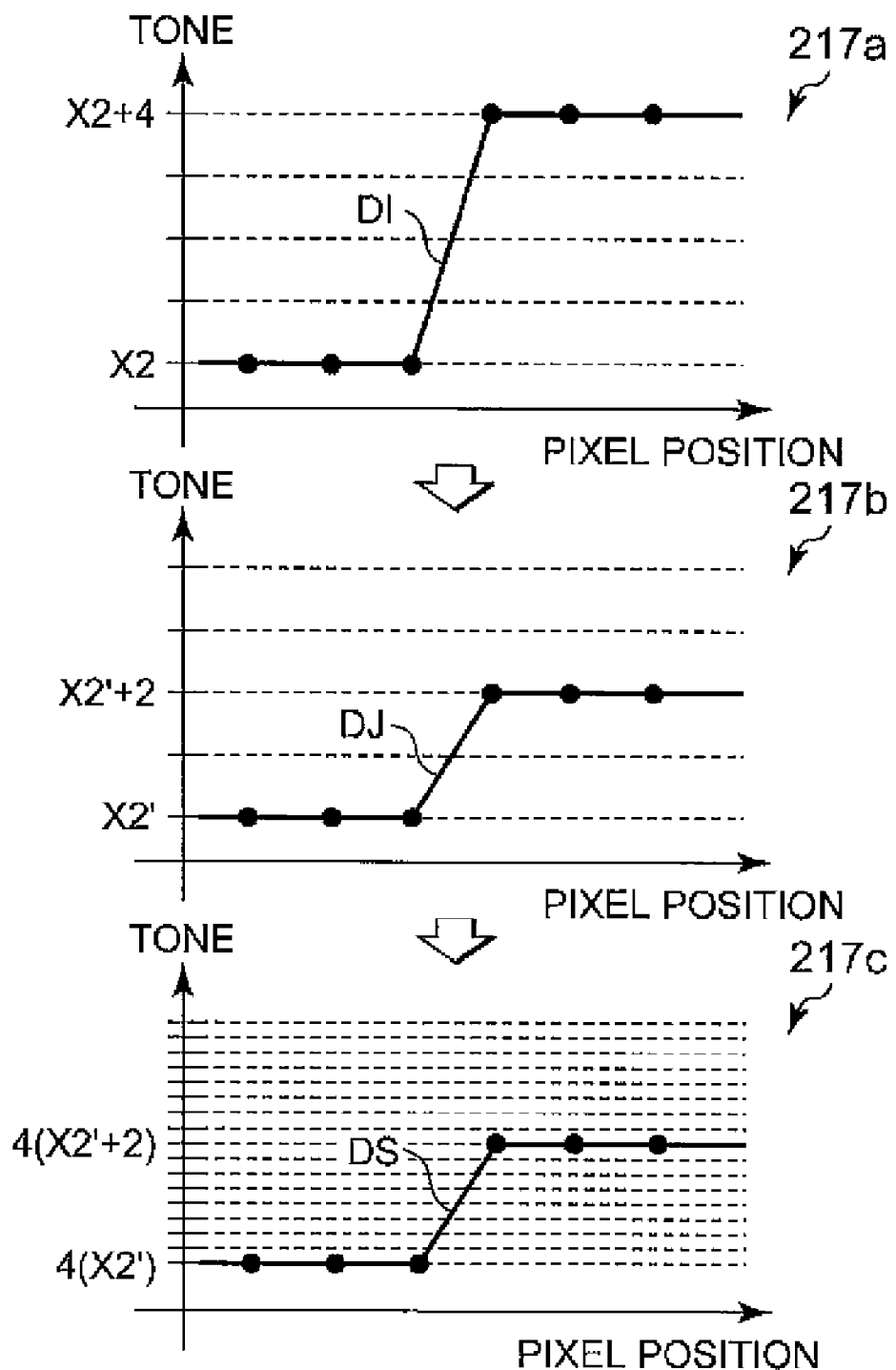
FIG. 28 are graphs for explaining the gamma transformation process performed by the tone transformation unit shown in FIG. 25 when tone changes steeply.

When a signal (image data DI) shown by a graph 217a in FIG. 28 is inputted into the tone transformation unit 28, the tone transformation unit 28 outputs image data DJ shown by a graph 217h in FIG. 28. The original-data bit-extending unit 5 transforms the image data DJ to image data DS shown by a graph 217c.

Figure 27:
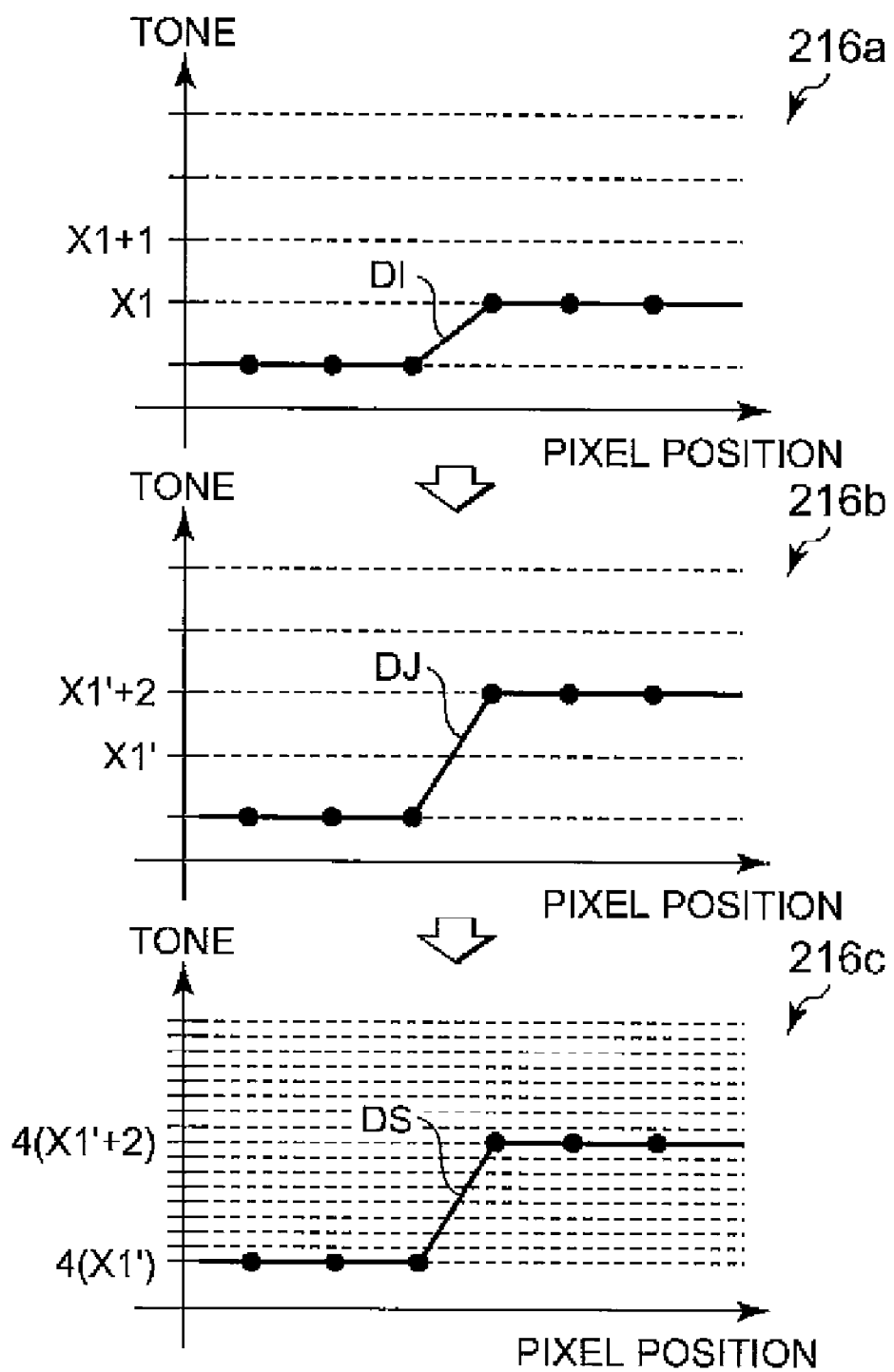
FIG. 27 are graphs for explaining the gamma transformation process performed by the tone transformation unit shown in FIG. 25 when tone changes gradually.

The graph 216b in FIG. 27 and the graph 217b in FIG. 28 show tone jumps that have the same tone difference; however, the graph 216a in FIG. 27 shows a gradual tone change before tone transformation, and the graph 217a in FIG. 28 shows a steep tone change before tone transformation. Thus, it is desired that the tone jump caused from the gradual tone change (in a case in FIG. 27) be interpolated. On the other hand, it is desired that a steep tone change (in a case of FIG. 28) be preserved.

The desired operation can be realized, if in the image display device 102 the ϵ-selection unit 29 is set to output a threshold value of 8 with its input tone being close to a tone X1' and output a threshold value of 4 with its input tone being close to a tone X2'.

This enables the image display device 102, even when a signal changed by a tone transformation function such as gamma transformation is inputted into the multiple-tone processing unit 3, to process the signal as a small-magnitude noise and increase an effective number of tones while preserving steep changes in an image, such as contours.

Figure 29:
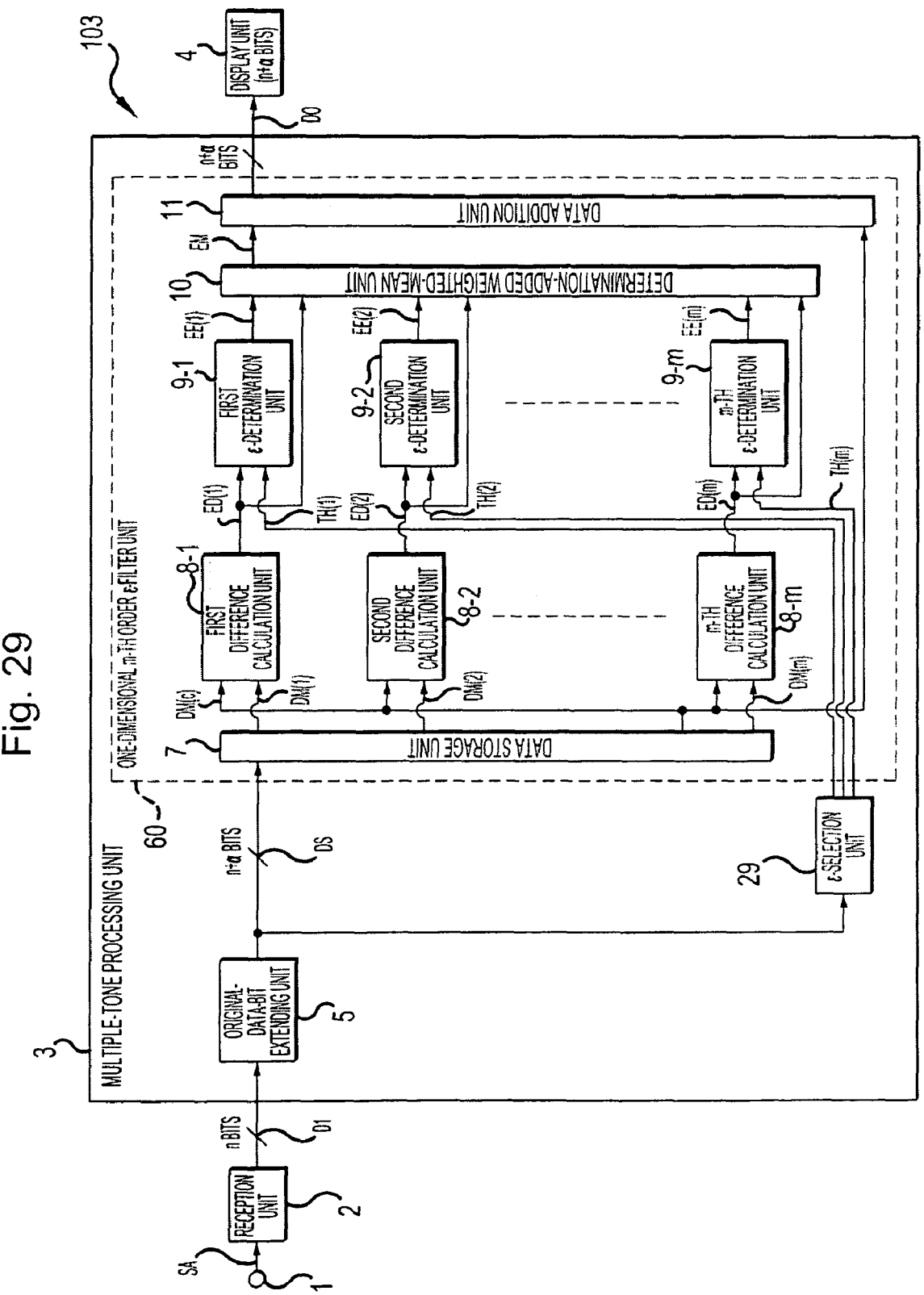
FIG. 29 is a view illustrating another configuration (2) of an image display device according to Embodiment 1.

FIG. 29 is a view illustrating another configuration (2) of the image display device according to Embodiment 1. The same numerals are assigned to components in FIG. 29 that have the same functions as those of the components in the image display device 101 shown in FIG. 1 to omit the same explanations.

In an image display device 103, a tone transformation unit 28 (not shown in FIG. 29) is provided upstream of the reception unit 2. Thus, in the image display device 103, data has been transformed in tone in advance, to be inputted into the reception unit 2. When an analog image signal SA having been transformed in tone is inputted into the input terminal 1, the reception unit 2 receives the analog image signal SA to input n-bit image data DI into the original-data bit-extending unit 5.

The original-data bit-extending unit 5 extends the image data DI by a bits to output n+α bit image data DS. And then, the image data DS outputted from the original-data bit-extending unit 5 is inputted into ϵ-selection unit 29 and the one-dimensional m-th order α-filter unit 60.

Even in the image display device 103, if its threshold values are set according to a characteristic of its tone transformation in a way similar to those of the image display device 100 shown in FIG. 1 and the image display device 102 shown in FIG. 25, it is possible to increase the number of tones in an area where tone changes gradually without degrading sharpness of the image.

Figure 30:
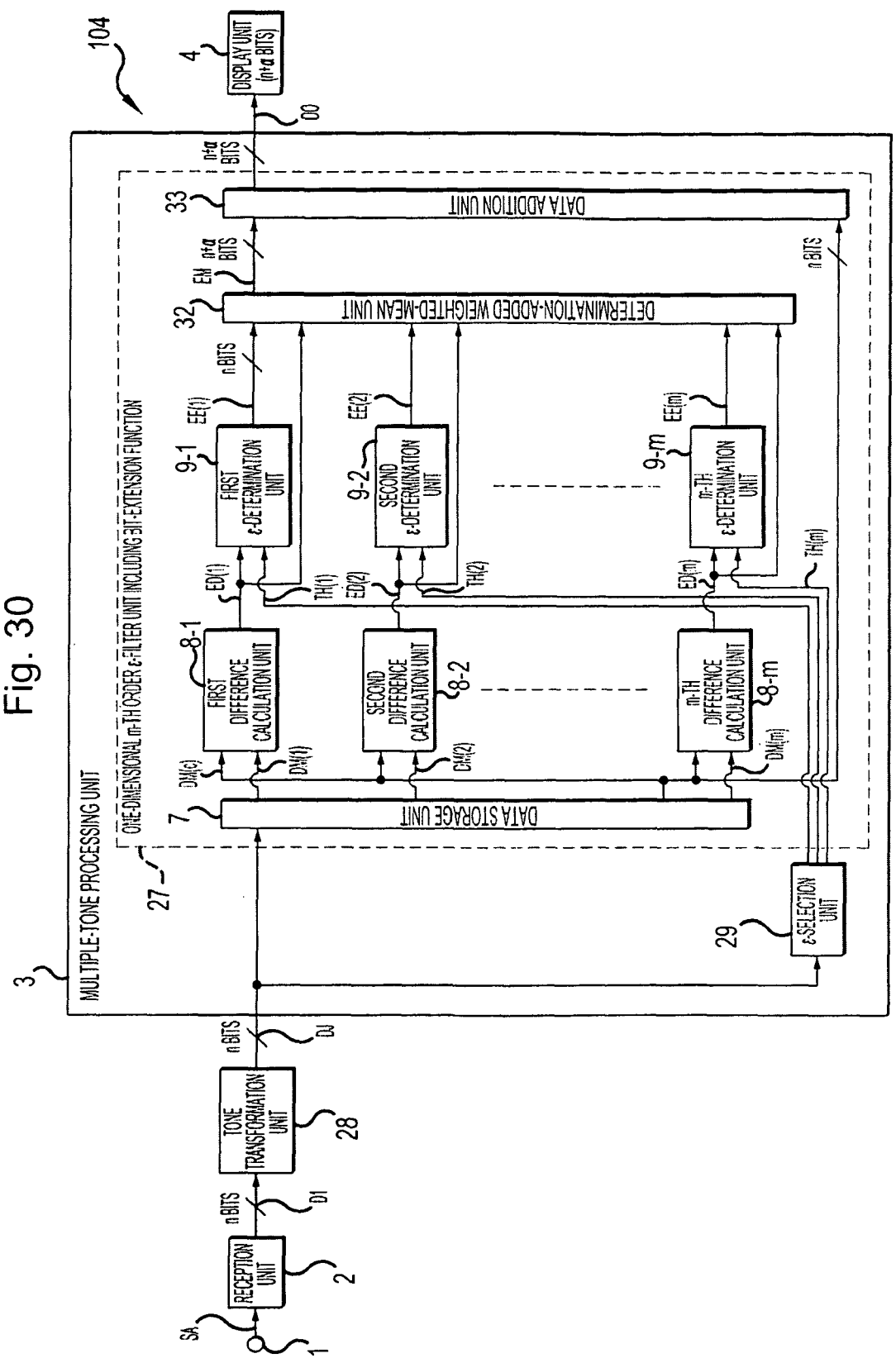
FIG. 30 is a view illustrating another configuration (3) of an image display device according to Embodiment 1.

FIG. 30 is a view illustrating another configuration (3) of the image display device according to Embodiment 1. The same numerals are assigned to components in FIG. 30 that have the same functions as those of the components in the image display device 102 shown in FIG. 25 to omit the same explanations.

In an image display device 104, the original-data bit-extending unit 5 is not provided in comparison with the image display device 102 shown in FIG. 25; however, in the multiple-tone processing unit 3, a one-dimensional m-th order ϵ-filter unit 27 including bit extension function is provided in place of the one-dimensional m-th order ϵ-filter unit 60. And then, in place of the determination-added weighted average unit 10 and the data addition unit 11, a determination-added weighted average unit 32 and a data addition unit 33 is provided in the one dimensional m-th order ϵ-filter unit 27 including bit extension function.

The one-dimensional m-th order ϵ-filter unit 27 including bit extension function is a means that operates as the one-dimensional m-th order ϵ-filter unit 60 and further performs bit extension function while performing its epsilon filter function. The determination-added weighted average unit 32 performs, based on determination data EE and difference data ED, a weighted average calculation and bit extension to output a weighted average value EM extended by a bits. The image display device 104 can perform bit extension, by producing average data EM using the fractional portion of a numeral value, which results from a calculation of a determination added weighted average, similar to those shown in FIG. 4. The data addition unit 33 extends input image data DM(c) to n+α bits and adds it to output as image data DO to the display unit 4.

As described above, the image display device 104 does not perform bit extension upstream of the epsilon filter, but performs it while performing the epsilon filter. Configuring the device in a way described above can bring the same effects obtained in the image display device 102 shown in FIG. 25.

Figure 31:
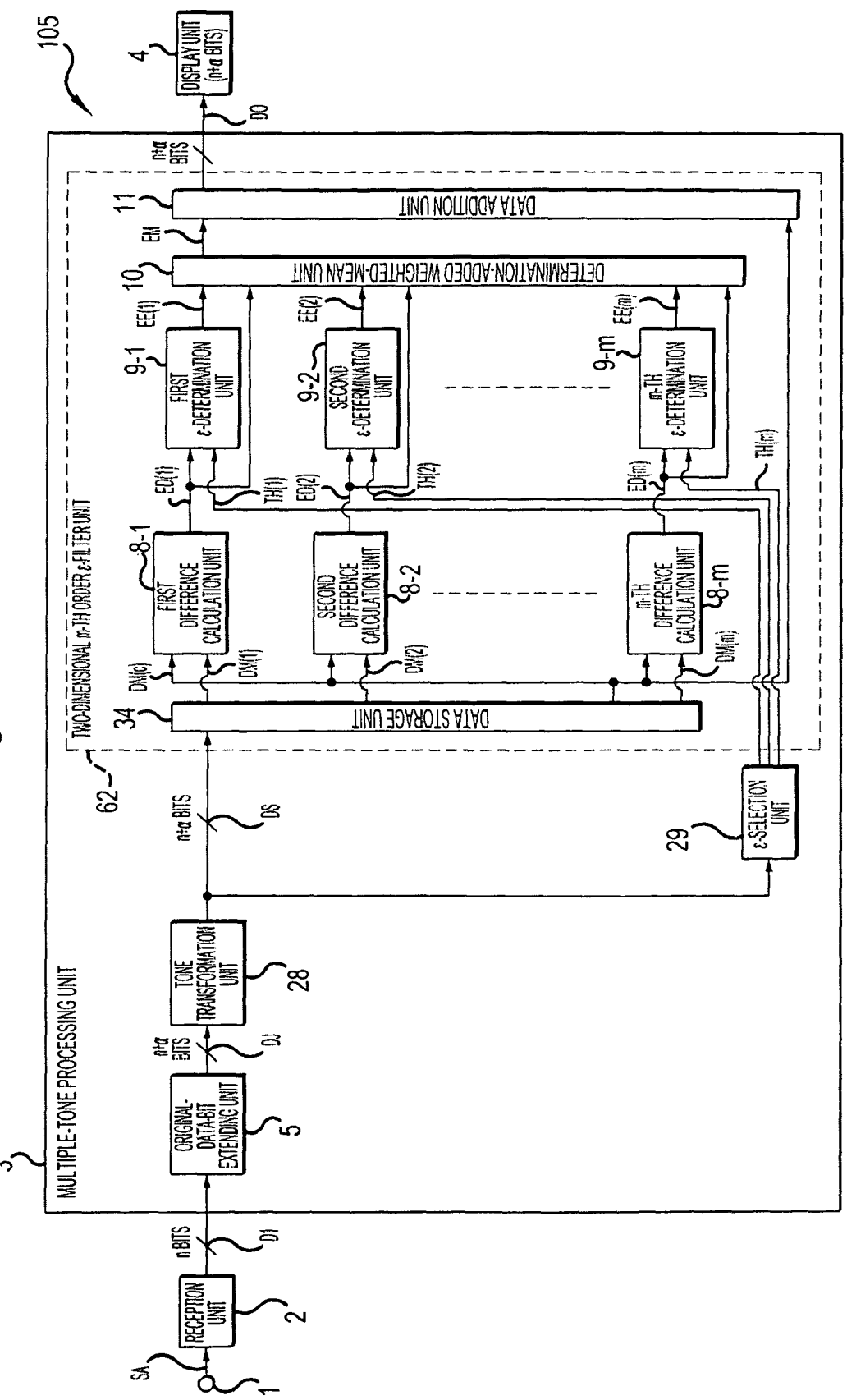
FIG. 31 is a view illustrating another configuration (4) of an image display device according to Embodiment 1.
Figure 32:
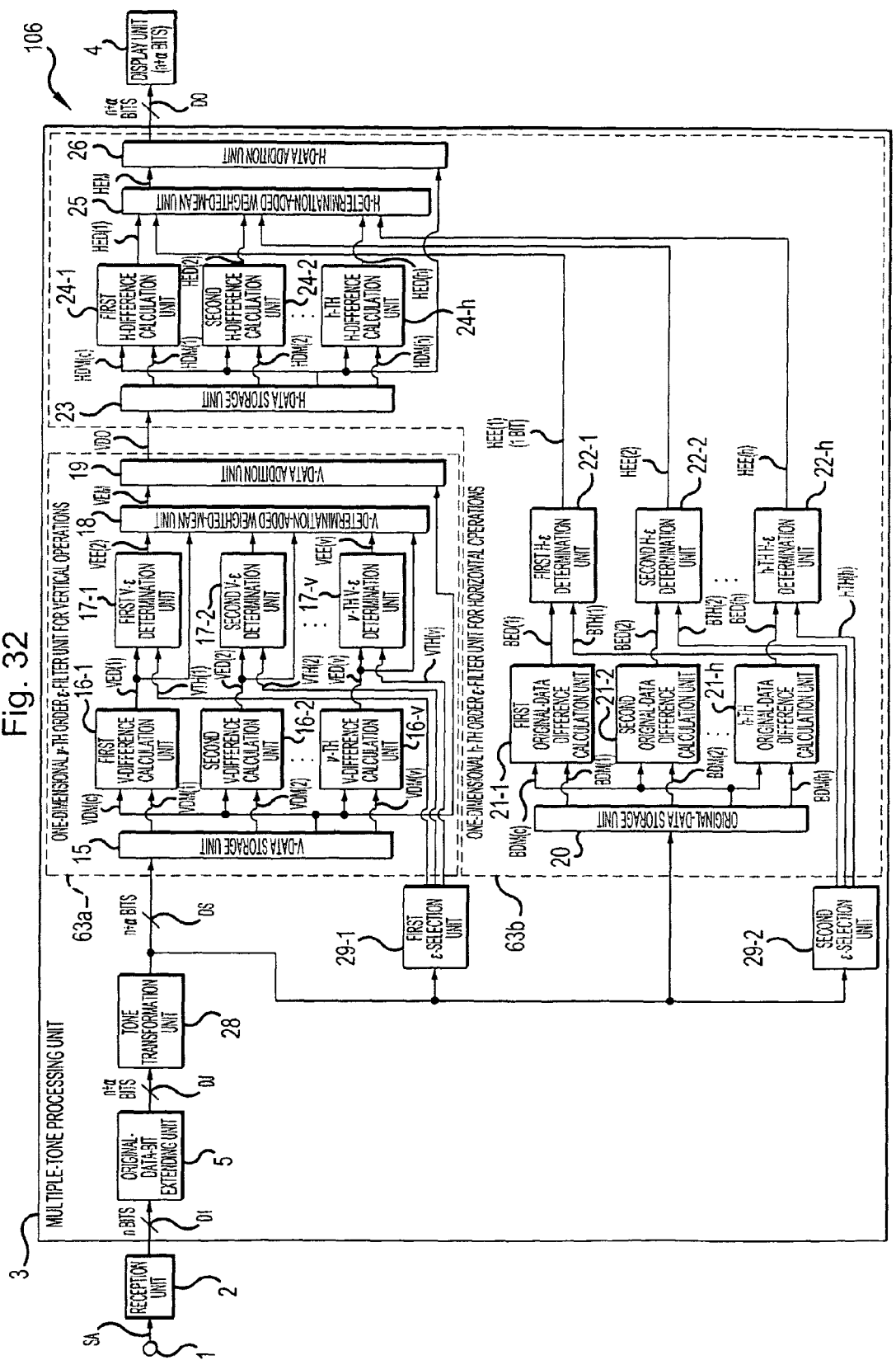
FIG. 32 is a view illustrating another configuration (5) of an image display device according to Embodiment 1.

In the image display device 100 shown in FIG. 1, the epsilon filter has been explained as a one-dimensional epsilon filter; however, the embodiment is not limited to using the one-dimensional epsilon filter. FIG. 31 and FIG. 32 are views each illustrating a configuration of an image display device including as an epsilon filter a two-dimensional epsilon filter that processes horizontally and vertically. The same numerals are assigned to components in FIG. 31 and FIG. 32 that have the same functions as those of the components in the image display device 100 shown in FIG. 1, to omit the same explanations.

In the image display device 105 shown in FIG. 31, a two-dimensional m-th order ϵ-filter unit 62 is provided as the epsilon filter in place of the one-dimensional m-th order ϵ-filter unit 60. The two-dimensional m-th order ϵ-filter unit 62 is connected, similarly to the one-dimensional m-th order ϵ-filter unit 60, to the tone transformation unit 28, the ϵ-selection unit 29, and the display unit 4.

The two-dimensional m-th order ϵ-filter unit 62 processes (epsilon filtering process) data on a two-dimensional area of a horizontal pixel count (h)×a vertical pixel count (v). That is, the two-dimensional m-th order ϵ-filter unit 62 is used as an edge-preserving smoothing filter that smoothes, while preserving steep tone changes, pixel data arranged two-dimensionally (vertically and horizontally) with a given pixel being at the center of the data, to operate small-magnitude components as noises.

The two-dimensional m-th order ϵ-filter unit 62 shown in FIG. 31 includes a data storage unit 34, a first difference calculation unit 8-1 through an m-th difference calculation unit 8-$m$, a first ϵ-determination unit 9-1 through an m-th ϵ-determination unit 9-$m$, a determination-added weighted average unit 10, and a data addition unit 11, to increase an effective number of tones for image data DS.

The data storage unit 34 stores image data DS from the tone transformation unit 28 and outputs image data DM(1) through DM(m), into the first difference calculation unit 8-1 through the m-th difference calculation unit 8-$m$, respectively. Furthermore, the data storage unit 34 outputs image data DM(c) into the first difference calculation unit 8-1 through the m-th difference calculation unit 8-$m$ and the data addition unit 11.

The image data DM(1) through DM(m) in the embodiment are image data at pixels which position from a given pixel c predetermined pixel counts (coordinate values) apart in up-and-down and right-and-left directions.

The image data DM(1) through DM(m) in up-and-down and right-and-left directions are inputted from the data storage unit 34 into the first difference calculation unit 8-1 through the m-th difference calculation unit 8-$m$, respectively. The image data DM(c) is inputted from the data storage unit 34 into the data addition unit 11.

The first difference calculation unit 8-1 through the m-th difference calculation unit 8-$m$ calculate as difference data ED(1) through ED(m) the differences between the image data DM(1) through DM(m) in up-and-down and right-and-left directions and the image data DM(c), respectively. The first difference calculation unit 8-1 through the m-th difference calculation unit 8-$m$ each output the difference data ED(1) through ED(m) in up-and-down and right-and-left directions, into the first ϵ-determination unit 9-1 through the m-th ϵ-determination unit 9-$m$.

The ϵ-selection unit 29 inputs, on the basis of the image data DS(1) through DS(m) from the tone transformation unit 28, threshold level data TH(1) through TH(m) in up-and-down and right-and-left directions into the first ϵ-determination unit 9-1 through the m-th ϵ-determination unit 9-$m$.

The first ϵ-determination unit 9-1 through the m-th ϵ-determination unit 9-$m$ determine whether or not the difference data ED(1) through ED(m) are greater than the threshold level data TH(1) through TH(m), respectively. The first ϵ-determination unit 9-1 through the m-th ϵ-determination unit 9-$m$ output their determination results as determination data EE(1) through EE(m) into the determination-added weighted average unit 10.

The determination-added weighted average unit 10 performs, based on the determination data EE(1) through EE(m), a weighted average process of the difference data ED(1) through ED(m), and outputs into the data addition unit 11 the weighted average value obtained as the result of the process as a weighted average value EM (average data).

The data addition unit 11 adds the image data DS to the weighted average value EM(1) through EM(m).

Image data in which an effective number of tones has been increased by the two-dimensional m-th order ϵ-filter unit 62 is outputted from the data addition unit 11 to the display unit 4 to be displayed as image data DO.

An image display device 106 shown in FIG. 32 includes, as an epsilon filter, a one-dimensional v-th order ϵ-filter unit 63a for vertical operations and a one-dimensional h-th order ϵ-filter unit 63b for horizontal operations. In the image display device 106, the tone transformation unit 28 is connected to the one-dimensional v-th order ϵ-filter unit 63a for vertical operations, a one-dimensional h-th order ϵ-filter unit 63b for horizontal operations, a first ϵ-selection unit 29-1, and a second ϵ-selection unit 29-2. The one-dimensional v-th order ϵ-filter unit 63a for vertical operations is also connected to the one-dimensional h-th order ϵ-filter unit 63b for horizontal operations, and the one-dimensional h-th order ϵ-filter unit 63b for horizontal operations is connected to the display unit 4.

The one-dimensional v-th order ϵ-filter unit 63a for vertical operations includes a V-data storage unit 15 (vertical data storage unit), a first V-difference calculation unit 16-1 (vertical difference calculation unit) through a v-th V-difference calculation unit 16-v, a first Vϵ determination unit 17-1 (vertical-ϵ-determination unit) through a v-th Vϵ determination unit 17-v, a V-determination-added weighted average unit 18 (vertical determination-added weighted average unit), and a V-data addition unit 19 (vertical data addition unit).

The one-dimensional v-th order ϵ-filter unit 63a for vertical operations, operates original data of n+α bit length in vertical directions of the picture. The one-dimensional v-th order ϵ-filter unit 63a for vertical operations is used as an edge-preserving smoothing filter that smoothes, while preserving steep tone changes, pixel data arranged vertically with reference to a given pixel to operate small-magnitude components as noises. The one-dimensional v-th order ϵ-filter unit 63a for vertical operations converts the image data DS to image data (image data VDO, described later) having a larger effective tone number with respect to vertical tone changes, to output into the one-dimensional h-th order ϵ-filter unit 63b for horizontal operations.

The difference between the one-dimensional v-th order ϵ-filter unit 63a for vertical operations and the one-dimensional m-th order ϵ-filter unit 60 is as follows; the one-dimensional m-th order ϵ-filter unit 60 increases an effective number of tones with respect to horizontal image data DS, but the one-dimensional v-th order ϵ-filter unit 63a for vertical operations increases an effective number of tones with respect to up-and-down-direction image data DS.

Therefore, units, which the one-dimensional v-th order ϵ-filter unit 63a for vertical operations includes, of a V-data storage unit 15, a first V-difference calculation unit 16-1 through a v-th V-difference calculation unit 16-v, a first Vϵ determination unit 17-1 through a v-th Vϵ determination unit 17-v, a V-determination-added weighted average unit 18, and a V-data addition unit 19 each correspond to units, which the one-dimensional m-th order ϵ-filter unit 60 includes, of the data storage unit 7, the first difference calculation unit 8-1 through the m-th difference calculation unit 8-m, the first a determination unit 9-1 through the m-th ϵ determination unit 9-m, the determination-added weighted average unit 10, and the data addition unit 11.

That is, the components of the one-dimensional v-th order ϵ-filter unit 63a for vertical operations and those of the one-dimensional m-th order ϵ-filter unit 60 perform almost the same processes, respectively, except their objects to be processed, the vertical image data DS or the horizontal image data DS. A first ϵ-selection unit 29-1 corresponds to the ϵ-selection unit 29 and performs operations almost similar to those of the ϵ-selection unit 29.

The one-dimensional v-th order ϵ-filter unit 63a for vertical operations produces image data VDM, difference data VED, determination data VEE, threshold level data VTH, a weighted average value VEM, and image data VDO which each correspond to the image data DM, the difference data ED, the determination data EE, the threshold level data TH, the weighted average value EM, and the image data DO which the one-dimensional m-th order ϵ-filter unit 60 produces.

Each of the units provided in the one-dimensional v-th order ϵ-filter unit 63a for vertical operations, will be explained in detail. The V-data storage unit 15 stores image data DS from the tone transformation unit 28 and outputs image data VDM(1) through VDM(v), into the first V-difference calculation unit 16-1 through the v-th V-difference calculation unit 16-v, respectively. Furthermore, the V-data storage unit 15 outputs image data VDM(c) into the first V-difference calculation unit 16-1 through the v-th V-difference calculation unit 16-v and the V-data addition unit 19.

The image data VDM(c) is image data when a given pixel is determined as a pixel c. The image data VDM(1) through VDM(v) are those of pixels that are each apart from the given pixel c, upward or downward, by predetermined pixel counts. For example, in a case of m=5, assuming that image data VDM(3) is the image data VDM(c), image data VDM(1) is that of a pixel that positions two pixels before (upward) from the given pixel c, image data VDM(2) is that of a pixel that positions one pixel before (upward) from the given pixel c, image data VDM(4) is that of a pixel that positions a pixel after (downward) from the given pixel c, and image data VDM(5) is that of a pixel that positions 2 pixels after (downward) from the given pixel c.

The first V-difference calculation unit 16-1 through the v-th V-difference calculation unit 16-v calculate as difference data VED(1) through VED(v), the differences between the image data VDM(1) through VDM(v) and the image data VDM(c), respectively. The first V-difference calculation unit 16-1 through the h-th V-difference calculation unit 16-v each output the difference data VED(1) through VED(v) into the first Vϵ-determination unit 17-1 through the v-th Vϵ-determination unit 17-v.

The first Vϵ-determination unit 17-1 through the v-th Vϵ-determination unit 17-v determine whether or not the difference data VED(1) through VED(v) from the first V-difference calculation unit 16-1 through the v-th V-difference calculation unit 16-v are larger than the threshold level data VTH(1) through VTH(v) from the first ϵ-selection unit 29-1, and output into the V-determination-added weighted average unit 18 the determined results as determination data VEE(1) through VEE(v).

The V-determination-added weighted average unit 18 performs, based on the determination data VEE(1) through VEE (v), a weighted average process of the difference data VED(1) through VED(v), and outputs into the V-data addition unit 19 the weighted average values obtained as the result of the process, as weighted average values VEM(1) through VEM (v). The V-data addition unit 19 adds the image data VDM(c) to the weighted average value VEM(1) through VEM(v).

The image data, in which an effective number of tones has been increased by the one-dimensional v-th order $\epsilon$-filter unit 63a for vertical operations, are outputted as image data VDO (1) through VDO(v) from the V-data addition unit 19 into the one-dimensional h-th order $\epsilon$-filter unit 63b for horizontal operations.

The one-dimensional h-th order $\epsilon$-filter unit 63b for horizontal operations includes an original data storage unit 20, a first original data difference calculation unit 21-1 through an h-th original data difference calculation unit 21-h, a first H$\epsilon$-determination unit 22-1 (horizontal $\epsilon$-determination unit) through an h-th H$\epsilon$-determination unit 22-h, an H-data storage unit 23 (horizontal-data storage unit), a first H-difference calculation unit 24-1 (horizontal-difference calculation unit) through an h-th H-difference calculation unit 24-h, an H-determination-added weighted average unit 25 (horizontal determination-added weighted average unit), and an H-data addition unit 26 (horizontal data addition unit).

The original data storage unit 20 is connected to the first original-data difference calculation unit 21-1 through the h-th original-data difference calculation unit 21-h, and the first original-data difference calculation unit 21-1 through the h-th original-data difference calculation unit 21-h are connected to the first H$\epsilon$ determination unit 22-1 through the h-th H$\epsilon$ determination unit 22-h. The first H$\epsilon$ determination unit 22-1 through the h-th H$\epsilon$ determination unit 22-h are connected to a second $\epsilon$-selection unit 29-2.

The H-data storage unit 23 is connected to the first H-difference calculation unit 24-1 through the h-th H-difference calculation unit 24-h. The H-determination-added weighted average unit 25 is connected to the first H-difference calculation unit 24-1 through the b-th H-difference calculation unit 24-h, the first H$\epsilon$ determination unit 22-1 through the h-th H$\epsilon$ determination unit 22-h, and the H-data addition unit 26.

The one-dimensional h-th order $\epsilon$-filter unit 63b for horizontal operations, operates in picture's horizontal directions data which is n+$\alpha$ bit long and is outputted from the one-dimensional v-th order $\epsilon$-filter unit 63a for vertical operation. The one-dimensional h-th order $\epsilon$-filter unit 63b for horizontal operations is used as an edge-preserving smoothing filter that smoothes, while preserving steep tone changes, pixel data arranged horizontally with reference to a given pixel to operate small-magnitude components as noises. The one-dimensional h-th order $\epsilon$-filter unit 63h for horizontal operations has a function to increase, based on horizontal tone changes in the image data DS, an effective number of tones in the image data VDO.

The difference between the one-dimensional h-th order $\epsilon$-filter unit 63b for horizontal operations and the one-dimensional m-th order $\epsilon$-filter unit 60 is as follows; that is, the one-dimensional m-th order $\epsilon$-filter unit 60 uses the horizontal determination data EE and the horizontal difference data ED to calculate a weighted average value EM, but the one-dimensional b-th order $\epsilon$-filter unit 63b for horizontal operations uses the horizontal determination data HEE and the horizontal difference data HED to calculate a weighted average value EM.

Therefore, the units of the original data storage unit 20, the first original data difference calculation unit 21-1 through the h-th original data difference calculation unit 21-h, and the first H$\epsilon$ determination unit 22-1 through the h-th H$\epsilon$ determination unit 22-h, which are included in the one-dimensional h-th order $\epsilon$-filter unit 63b for horizontal operations, each correspond to the units of the data storage unit 7, the first difference calculation unit 8-1 through the m-th difference calculation unit 8-m, and the first $\epsilon$-determination unit 9-1 through the m-th $\epsilon$-determination unit 9-m, which are included in the one-dimensional m-th order $\epsilon$-filter unit 60, and perform almost the same processes. The units of the H-data storage unit 23, the first H-difference calculation unit 24-1 through the h-th H-difference calculation unit 24-h, the H-determination-added weighted average unit 25, and the H-data addition unit 26, which are included in the one-dimensional h-th order $\epsilon$-filter unit 63b for horizontal operations, each correspond to the units of the data storage unit 7, the first difference calculation unit 8-1 through the m-th difference calculation unit 8-m, the determination-added weighted average unit 10, and the data addition unit 11, which are included in the one-dimensional m-th order $\epsilon$-filter unit 60, and perform almost the same processes. The second $\epsilon$-selection unit 29-2 corresponds to the $\epsilon$-selection unit 29 and performs operations almost similar to those of the selection unit 29.

The one-dimensional h-th order $\epsilon$-filter unit 63b for horizontal operations produces image data HDM, the difference data HED, the determination data HEE, threshold level data HTH, a weighted average value HEM which each correspond to the image data DM, the difference data ED, the determination data EE, the threshold level data TH, and the weighted average value EM which the one-dimensional m-th order $\epsilon$-filter unit 60 produces. The one-dimensional h-th order $\epsilon$-filter unit 63b for horizontal operations also produces image data BDM and difference data BED which each correspond to the image data DM and the difference data ED which the one-dimensional m-th order $\epsilon$-filter unit 60 produces.

Each of the units provided in the one-dimensional h-th order $\epsilon$-filter unit 63b for horizontal operations, will be explained in detail. The H-data storage unit 23 stores image data VDO from the V-data addition unit 19 and outputs image data HDM(1) through HDM(h), into the first H-difference calculation unit 24-1 through the h-th H-difference calculation unit 24-h, respectively. Furthermore, the H-data storage unit 23 outputs image data HDM(c) into the first H-difference calculation unit 24-1 through the h-th H-difference calculation unit 24-h and the H-data addition unit 26.

The image data HDM(c) is image data when a given pixel is determined as a pixel c. The image data HDM(1) through HDM(h) are those of pixels that are each apart from the given pixel c, upward or downward, by predetermined pixel counts.

The first H-difference calculation unit 24-1 through the h-th H-difference calculation unit 24-h calculate as difference data HED(1) through HED(h), the differences between the image data HDM(1) through HDM(h) and the image data HDM(c), respectively. The first H-difference calculation unit 24-1 through the h-th H-difference calculation unit 24-h output into the H-determination-added weighted average unit 25, the difference data HED(1) through HED(h).

The original data storage unit 20 stores image data DS from the tone transformation unit 28 and outputs image data BDM (1) through DDM(h), into the first original-data difference calculation unit 21-1 through the h-th original data difference calculation unit 21-h, respectively. The original data storage unit 20 also outputs image data BDM(c) into the first original data difference calculation unit 21-1 through the h-th original data difference calculation unit 21-h.

The image data BDM(c) is image data when a given pixel is determined as a pixel c. The image data BDM(1) through BDM(h) are image data of pixels that are each apart from the given pixel c, rightward or leftward, by predetermined pixel counts.

The first original-data difference calculation unit 21-1 through the h-th original-data calculation unit 21-h each calculate as difference data BED(1) through BED(h), the differences between the image data BDM(1) through BDM(h) and the image data BDM(c), respectively. The first original-data difference calculation unit 21-1 through the h-th original data difference calculation unit 21-h each outputs into the first Hs determination unit 22-1 through the h-th Hε determination unit 22-h, the difference data BED (1) through BED (h).

The first Hε determination unit 22-1 through the h-th Hε determination unit 22-h each determine whether or not the difference data BED(1) through BED(h) from the first original data difference calculation unit 21-1 through the h-th original data difference calculation unit 21-h is greater than the threshold level data HTH(1) through HTH(h) from the second ε-selection unit 29-2 to output its determination result as determination data HEE(1) through HEE(h) into the H-determination-added weighted average unit 25.

The H-determination-added weighted average unit 25 performs, based on the determination data HEE(L) through HEE (h), a weighted average process of the difference data HED(1) through HED(h), and outputs into the H-data addition unit 26 the weighted average values obtained as the result of the process, as weighted average values HEM(1) through HEM (h). The H-data addition unit 26 adds the image data HDM(c) to the weighted average value HEM(1) through HEM(h).

Image data, in which an effective number of tones has been increased by the one-dimensional h-th order ε-filter unit 63b for horizontal operations, is outputted from the H-data addition unit 26 into the display unit 4 as image data DO(1) through DO(h).

As described above, provided are ε-filter units that perform two-dimensional processes and threshold-value control units (a first ε-selection unit 29-1 and a second ε-selection unit 29-2) that change threshold values ε according to their input tones; therefore, magnitudes of edges to be preserved can be set according to vertical and horizontal tones.

Here, the one-dimensional h-th order ε-filter unit 63b for horizontal operations has calculated the weighted average value HEM, using the horizontal determination data HEE and the vertical difference data HED; however, the unit may calculate a weighted average value EM, using the vertical determination data and the horizontal difference data. The one-dimensional h-th order ε-filter unit 63b for horizontal operations may also calculate a weighted average value EM, using the vertical determination data EE and the vertical difference data ED.

In the embodiment, the ε-selection unit 29 is separated from the one-dimensional m-th order ε-filter unit 60, the one-dimensional fourth-order ε-filter unit 61, the two-dimensional m-th order ε-filter unit 62, the one-dimensional v-th order ε-filter unit 63a for vertical operations, and the one-dimensional h-th order ε-filter unit 63b for horizontal operations; however, the ε-selection unit 29 may be included in the one-dimensional m-th order ε-filter unit 60, the one-dimensional fourth-order ε-filter unit 61, the two-dimensional m-th order ε-filter unit 62, the one-dimensional v-th order ε-filter unit 63a for vertical operations, and the one-dimensional h-th order ε-filter unit 63b for horizontal operations.

As described above, Embodiment 1 smoothes tones increased due to bit-extension using an epsilon filter, which enables the number of tones in image data to be increased without lowering sharpness of the image that contains areas such as contours where tone changes large and steeply.

Therefore, this resolves a pseudo contour problem due to lack of image levels, and can prevent the image quality from being degraded.

Furthermore, because threshold level data TH corresponding to image data is selected from the table of stored threshold values and then used, it can easily be determined whether or not difference data EE is larger than the threshold level data TH.

Furthermore, image data DJ is transformed in tone to image data DS and then tone of the image data DS is smoothed, which enables the smoothing process to produce image data with high quality to be displayed.

Furthermore, threshold values of the epsilon filter are changed according to tones of the image data DS, which can produce less pseudo contours while preserving sharpness of the image. Furthermore, because threshold values are determined according to the image data DS on the basis of a table that shows a threshold value with respect to each of the image data DS (tones DS), threshold values of the epsilon filter can be easily determined.

Furthermore, since the original-data bit-extending unit 5 is placed upstream of the epsilon filter such as the one-dimensional m-th order ε-filter unit 60, the epsilon filter such as a one-dimensional m-th order ε-filter unit 60 does not need to perform a bit extension process of image data. Therefore, with a simple configuration, it becomes possible to smooth predetermined tones in the image data in which bit extension has been performed. Since threshold values of the epsilon filter can be determined based on the bit-extended image data, it becomes easy to select appropriate threshold values for the epsilon filter. This enables the device to produce less pseudo contours while preserving the sharpness of the image.

Since the image display device 104 is provided with a one-dimensional m-th order ε-filter unit 27 including bit extension function, it is possible to perform bit extension function after performing smoothing process of tones in the image data. Therefore, this also enables, similarly to the cases in which the original-data bit-extending unit 5 is placed upstream of the epsilon filter, the device to produce less pseudo contours while preserving the sharpness of the image.

Embodiment 2

Next, Embodiment 2 of the present invention will be explained, using FIG. 33 through FIG. 46. In Embodiment 2, threshold values ε are calculated according to inputted tones, to compare difference data ED with threshold level data TH using the calculated threshold values ε.

Figure 33:
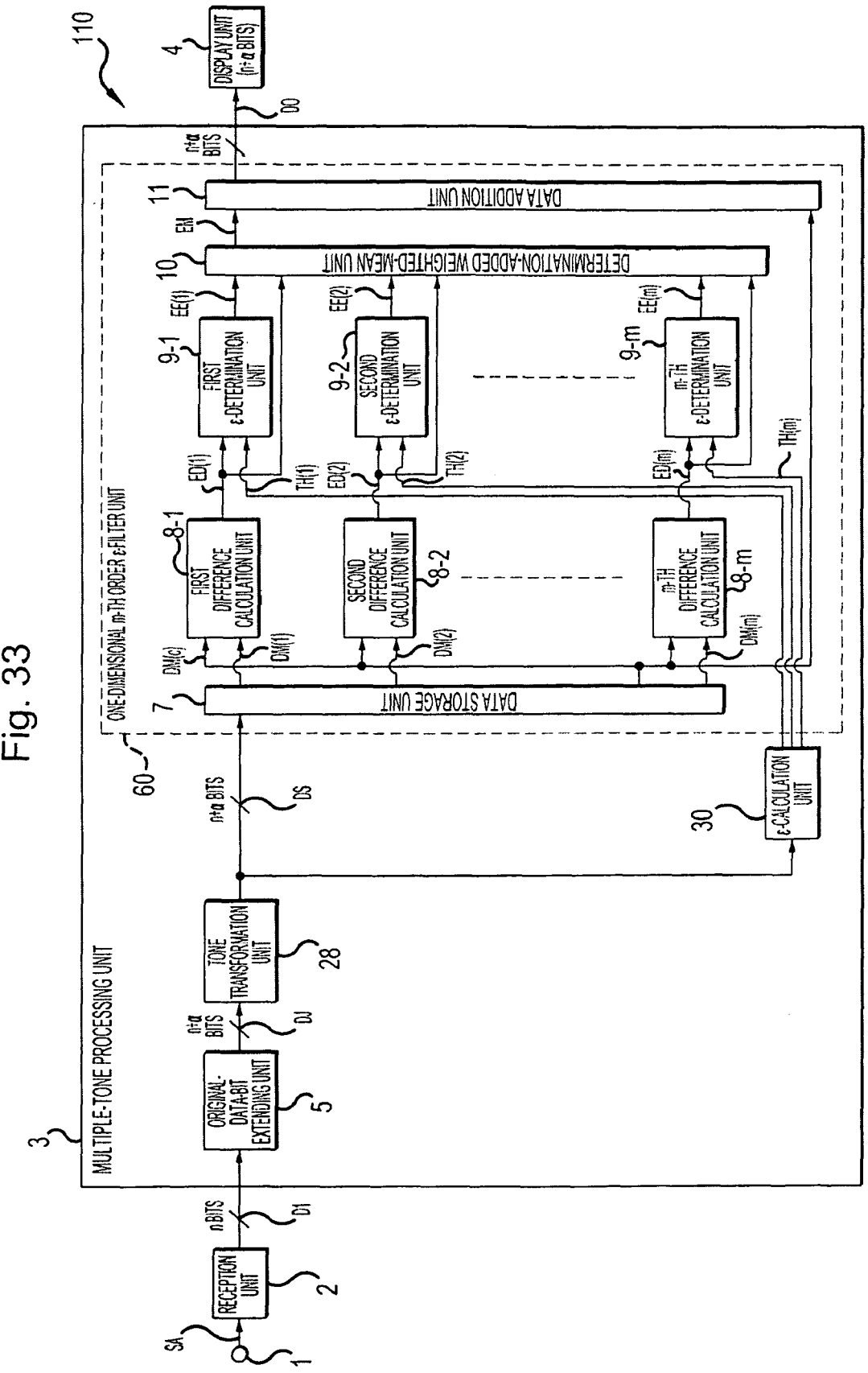
FIG. 33 is a view illustrating a configuration of an image display device of Embodiment 2 according to the present invention.

FIG. 33 is a view illustrating a configuration of an image display device of Embodiment 2 according to the present invention. The same numerals are assigned to components in FIG. 33 that have the same functions as those of the components in the image display device 100 shown in FIG. 1 to omit the same explanations.

An image display device 110 according to Embodiment 2 is provided with an input terminal 1, such a reception unit 2, a multiple-tone processing unit 3, and a display unit 4. Among the components, the reception device 2 and the multiple-tone processing unit 3 compose an image processing device.

In the embodiment, explanations will be made assuming that the reception unit 2 is, as an example, an A/D converter that converts analog image signals to digital image data. For reference sake, a tuner may be placed in the reception unit 2, a composite signal may be demodulated into luminance and chromaticity signals inside the reception unit 2, and then the signals may be transformed to digital image data. In addition, the reception unit 2 may function as a digital interface unit that receives digital data from an input terminal 1 and outputs n (natural number)-bit image data DI.

Into the input terminal 1, an analog image signal SA is inputted to be outputted to the reception unit 2. The reception unit 2 converts the analog image signal SA to n-bit image data DI to output into a multiple-tone processing unit 3.

The multiple-tone processing unit 3 includes an original-data-bit-extending unit 5, a tone transformation unit 28, an ϵ-calculation unit 30, and a one-dimensional m-th order ϵ-filter unit 60, so that the n-bit image data DI is transformed to n+α bits to output onto the display unit 4.

The original-data-bit-extending unit 5 outputs to a tone transformation unit 28 n+α bit image data DJ to which the n-bit image data DI is extended by α bits. The tone transformation unit 28 performs tone transformation, such as gamma transformation and contrast correction, of the image data DJ to output into the ϵ-calculation unit 30 and the one-dimensional m-th order ϵ-filter unit 60 image data having been transformed in tone, as image data DS (n+α bits).

Figure 34:
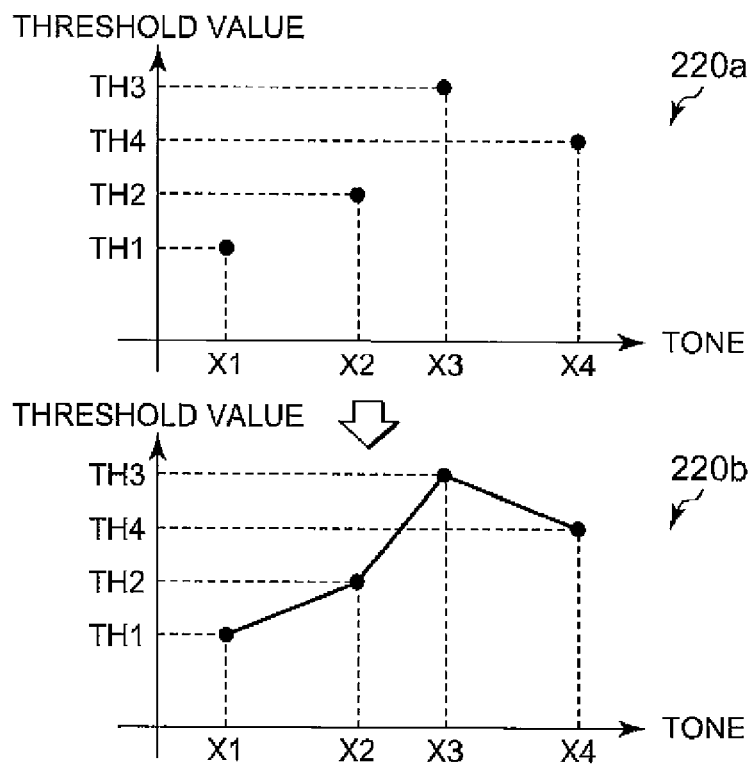
FIG. 34 are graphs (1) showing the relationship between tones and threshold values, that the image display device according to Embodiment 2 uses.
Figure 35:
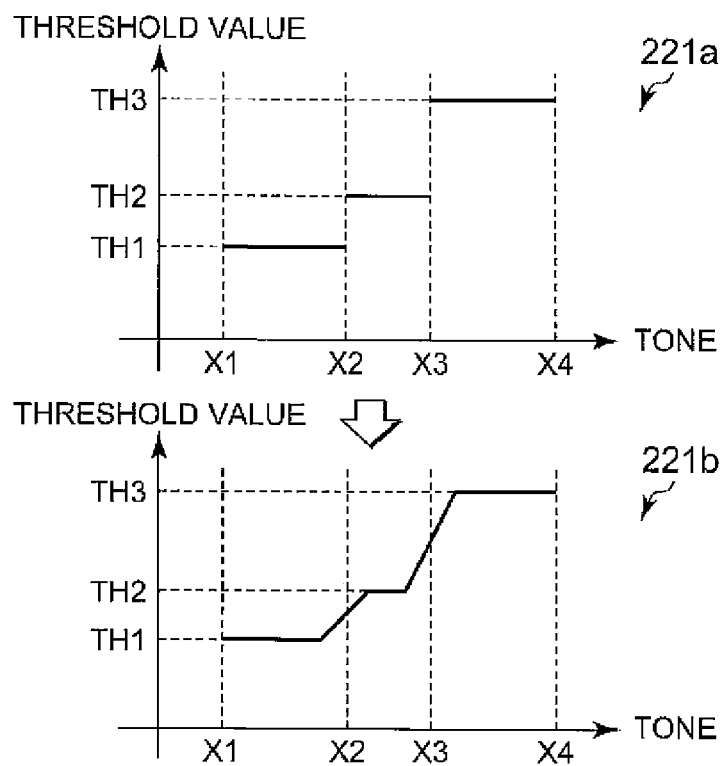
FIG. 35 are graphs (2) showing the relationship between tones and threshold values, that the image display device according to Embodiment 2 uses.

Next, an example for tone transformation by the ϵ-calculation unit 30 will be explained. The ϵ-calculation unit 30 in the embodiment has a table of threshold values each corresponding to tones, and the unit interpolates threshold values that the table gives on the bases of inputted image data DS (tones DS), to output them. FIG. 34 and FIG. 35 are views for illustrating the relationship between tones and threshold values. In FIG. 34 and FIG. 35, the tables containing threshold values each corresponding to tones are illustrated as graphs. For example, it is assumed that the ϵ-calculation unit 30 holds, as a table of threshold values each corresponding to tones, threshold level data TH1, TH2, TH3, and TH4 that correspond to tones X1, X2, X3, and X4 shown in a graph 220*a* in FIG. 34.

Using this table, the ϵ-calculation unit 30 calculates, by a linear interpolation, threshold values that correspond to remaining tones (tones except tones X1 through X4). By this calculations, the ϵ-calculation unit 30 defines from the graph 220*a* a tone-to-threshold-value relationship shown in a graph 220*b*. Resultantly, this is equivalent to the ϵ-calculation unit 30 having such a graph (table) as the graph 220*b*.

For example, it is assumed that the ϵ-calculation unit 30 holds, as a table of threshold values each corresponding to tones, the threshold level data TH1, TH2, and TH3 that correspond to tones X1 through X2, X2 through X3, and X3 through X4 shown in the graph 221*a* in FIG. 35.

Using this table, the ϵ-calculation unit 30 linearly interpolates tone gaps and their neighboring tones to produce tones. By this calculations, the ϵ-calculation unit 30 defines from the graph 221*a* a tone-to-threshold-value relationship shown in a graph 221*b*. Resultantly, this is equivalent to the ϵ-calculation unit 30 having such a graph (table) as the graph 221*b*.

When threshold values are interpolated, as described above, it is not necessary, unlike the ϵ-selection unit 29 of Embodiment 1, to store threshold values for all tones. Here, as examples of operations of the ϵ-calculation unit 30, there described are the processes shown in FIG. 34 and FIG. 35 (process to produce the graph 220*b* from the graph 220*a*, and process to produce the graph 221*b* from the graph 221*a*); however, operations applicable to this embodiment are not limited to the operations described above. The ϵ-calculation unit 30 may use either of the graphs to interpolate threshold values.

A one-dimensional m-th order ϵ-filter unit 60 is used as an edge-preserving smoothing filter (epsilon filter) that smoothes, while preserving steep tone changes, pixel data arranged in one-dimensional direction with reference to a given pixel to operate small-magnitude components as noises. The one-dimensional m-th order ϵ-filter unit 60 performs process to eliminate tone jumps and increase an effective number of tones, by smoothing tones extended by an original-data bit-extending unit 5.

The one-dimensional m-th order ϵ-filter unit 60 includes a data storage unit 7, a first difference calculation unit 8-1 through an m-th difference calculation unit 8-*m*, a first ϵ-determination unit 9-1 through an m-th ϵ-determination unit 9-*m*, a determination-added weighted average unit 10, and a data addition unit 11.

Image data, in which an effective number of tones has been increased by the one-dimensional m-th order ϵ-filter unit 60, is outputted from a data addition unit 11 into the display unit 4 as image data DO. The display unit 4 is a displaying means such as a liquid crystal monitor to display n+α bit image data DO. The image data DO in which an effective number of tones has been increased by the one-dimensional m-th order ϵ-filter unit 60 is outputted into the display unit 4. The display unit 4 displays the n+α bit image data DO.

In this embodiment, the ϵ-filter performs an epsilon filter process, operating tones increased by bit extension as small-magnitude noises. That is to say, when extending from n bits to n+α bits, a threshold value ϵ of the epsilon filter is determined as $2^{\alpha}$ ($2^{\wedge}\alpha$). This enables the epsilon filter to increase an effective number of tones, preserving steep changes in an image such as contours. However, when a tone transformation such as the gamma transformation is performed between the bit extension process and the epsilon filter process, the magnitudes of the tones added by bit extension are changed. Thus, the threshold value ϵ is changed according to tones. More specifically, the magnitude of edge preserved by the epsilon filter is changed depending on inputted tone.

In this embodiment, the image display device 110 includes an ϵ-calculation unit 30 (threshold-value control unit) for changing a threshold value ϵ according to the input tone, and a one-dimensional m-th order ϵ-filter unit 60 that uses the threshold value controlled by the ϵ-calculation unit 30. The ϵ-calculation unit 30 corresponding to a threshold-value control unit has been set to calculate threshold values according to tones.

Figure 36:
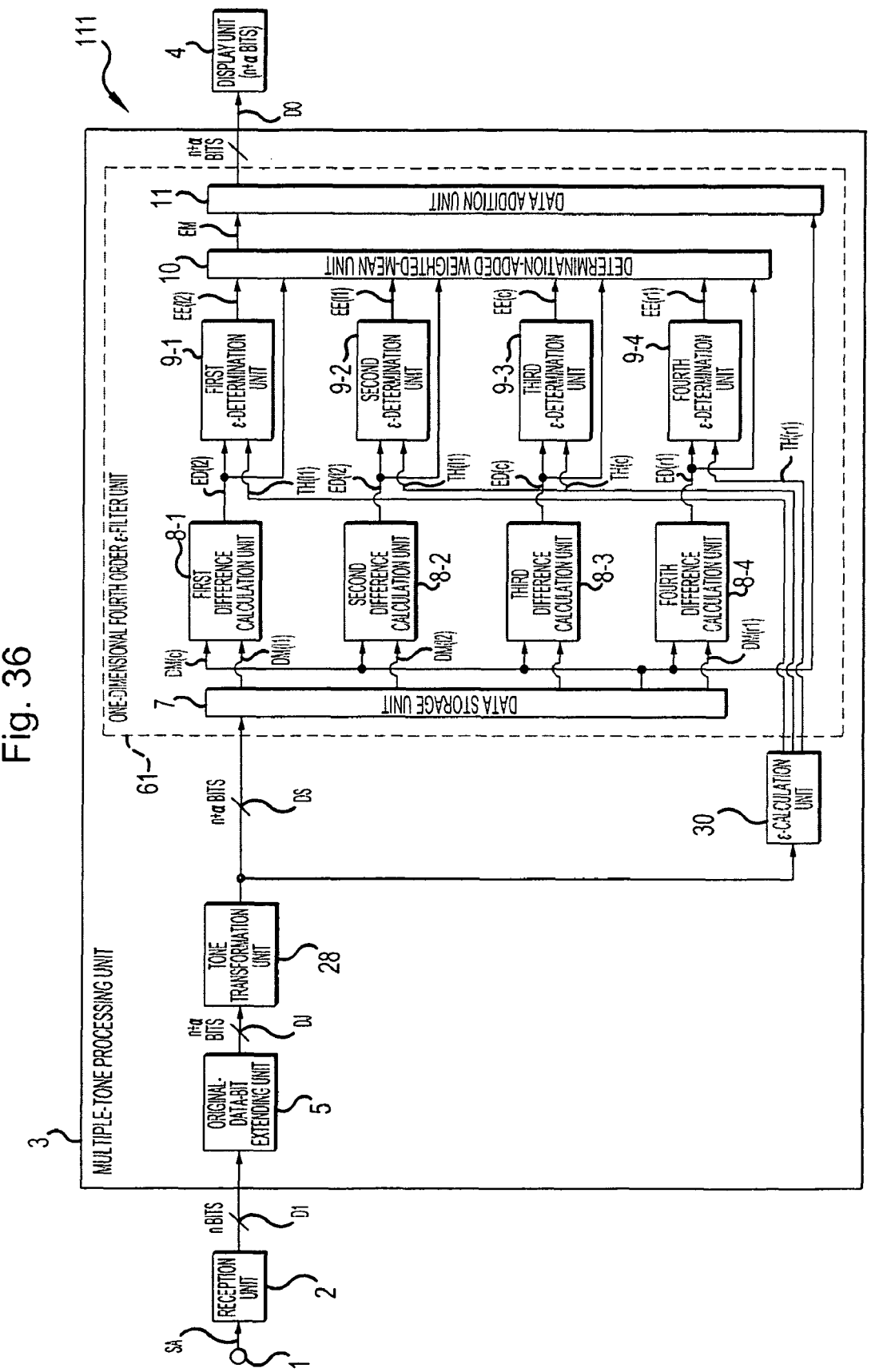
FIG. 36 is a view illustrating a configuration of an image display device of Embodiment 2 when m=4.

Hereinafter, as one example of a multiple-tone process, will be explained a case of α=2, where n-bit image data is processed to n+2 bit data by a multiple-tone process. FIG. 36 is a view illustrating a configuration of an image display device of Embodiment 2 when m=4. In addition, the same numerals are assigned to components in FIG. 36 that have the same functions as those of the components in the image display device 110 shown in FIG. 33 to omit the same explanations. An image display device 111 includes, in place of the one-dimensional m-th order ϵ-filter unit 60, a one-dimensional fourth-order ϵ-filter unit 61.

Figure 37:
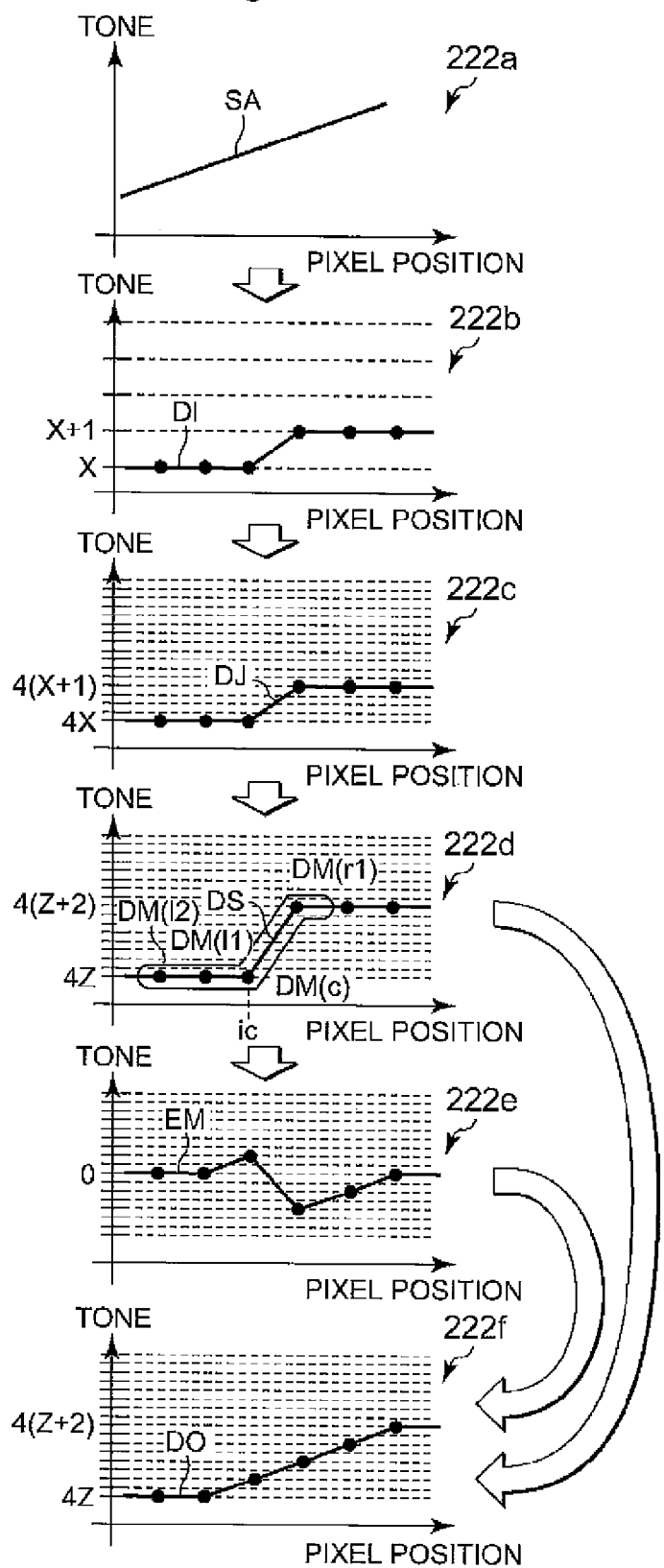
FIG. 37 are graphs for explaining operations when an analog image signal with a gradual tone change, that jumps by transformation, is inputted into an image display device according to Embodiment 2.

Firstly, explanations will be made about operations of the image display device 111 when an analog image signal with a gradual tone change, that jumps by transformation, is inputted into the image display device 111. FIG. 37 are graphs for explaining operations when an analog image signal with a gradual tone change, that jumps by transformation, is inputted into the image display device according to Embodiment 2; In each of graphs 222*a* through 222*f* shown in FIG. 37, the horizontal axis represents pixel positions i, and the vertical axis represents tones.

The graph 222*a* shows tones of an analog image signal SA; the graph 222*b* shows n-bit tones of image data DI; and the graph 222*c* shows n+α bit image data DJ. The graph 222*d* shows tones of n+α bit image data DS and image data DM; the graph 222*e* shows tones of weighted average values EM; and the graph 222*f* shows tone of n+α bit image data DO.

In the image display device 111, the analog image signal SA shown by the graph 222*a* is inputted from the input terminal 1 into the reception unit 2. The reception unit 2 converts the analog image signal SA to n-bit digital image data DI (n bits) (two tones (X and X+1)) shown in the graph 222b to output into the original-data bit-extending unit 5.

The original-data bit-extending unit 5 transforms tones X of image data DI shown by the graph 222b to tones 4X and transforms tones X+1 to tones 4(X+1) to output such image data DJ as shown in the graph 229c into the tone transformation unit 28.

FIG. 38 is a table of data that the image display device according to Embodiment 2 produces when an analog image signal with a gradual tone change, that jumps by transformation, is inputted. When taking as a given pixel P(c) the pixel at a pixel position ic shown in FIG. 222d, FIG. 38 shows a correspondence relationship among image data DM(k), difference data ED(k) produced based on the image data DM(k), determination data EE(k), f{ED(k)}, a weighted average value EM, and threshold value data TH(k).

The data storage unit 7 outputs DM(l2)=4Z, DM(l1)=4Z, DM(c)=4Z, and DM(r1)=4Z+8 into the first difference calculation unit 8-1 through the fourth difference calculation unit 8-4, respectively.

The first difference calculation unit 8-1 outputs ED(l2)=DM(l2)−DM(c)=4Z−4Z=0; the second difference calculation unit 8-2 outputs ED(l1)=DM(l1)−DM(c)=4Z−4Z=0; the third difference calculation unit 8-3 outputs ED(c)=DM(c)−DM(c)=4Z−4Z=0; and the fourth difference calculation unit 8-4 outputs ED(r1)=DM(r1)−DM(c)=(4Z+8)−4Z=8. Therefore, "0" is inputted into each of the first $\epsilon$-determination unit 9-1 through the third $\epsilon$-determination unit 9-3, and "S" is inputted into the fourth $\epsilon$-determination unit 9-4.

the $\epsilon$-selection unit 30 has been set to output "8" for all threshold level data TH(l2) through TH(r1) when the image data DS is close to 4Z. At this time, in the image display device 111 of this embodiment, the $\epsilon$-calculation unit 30 has interpolated, on the basis of the table of threshold values each corresponding to tones, threshold values corresponding to the image data DS.

The threshold level data TH(l2)=4, the threshold level data TH(l1)=4, the threshold level data TH(c)=4, and the threshold level data TH(r1)=4 are inputted into the first $\epsilon$-determination unit 9-1 through the fourth $\epsilon$-determination unit 9-4, when the image data DS=4Z and the image data DS=4Z+B. The difference data ED(l2) through ED(r1) are smaller than or equal to the threshold level data TH(l2) through TH(r1), respectively, so that the determination difference data EE(l2) through EE(r1) are all set as "1".

In the determination-added weighted average unit 10, when the determination data EE(k) is "1", the difference data ED(k) is multiplied by a coefficient $a_k$ and then added, but when the determination data EE(k) is "0", the difference data is not added. When coefficients $a_k$ (=$a_{l2}$, $a_{l1}$, $a_c$, $a_{r1}$) are all 0.25, the output (weighted average value EM) of the determination-added weighted average unit 10 is given by a formula (9) below, for the example shown in FIG. 38.

$$EM = a_{l2} \times ED(l2) + a_{l1} \times ED(l1) + a_c \times ED(c) + a_{r1} \times ED(r1) \quad (9)$$
$$= (0.25 \times 0) + (0.25 \times 0) + (0.25 \times 0) + (0.25 \times 8)$$
$$= 2$$

In the image display device 111, the image data DS supplied from the original-data bit-extending unit 5 is operated by the processes described above with each pixel sequentially taken as a given pixel, and then a calculation given by the formula (9) (calculation for a weighted average) is performed.

The graph 222e shows tones of the weighted average values EM corresponding to the image data DM shown in the graph 222d (a weighted average EM with a pixel at pixel position i being taken as a given pixel). The determination-added weighted average unit 10 outputs the weighted average EM into the data addition unit 11. The data addition unit 11 adds the image data DS shown by the graph 222d with the weighted average value EM shown by the graph 222e to output the image data DO shown by the graph 222f. As described above, the image display device 111 can increase the effective number of tones for an area where tone changes gradually, even when tone jump develops through tone transformation.

Figure 39:
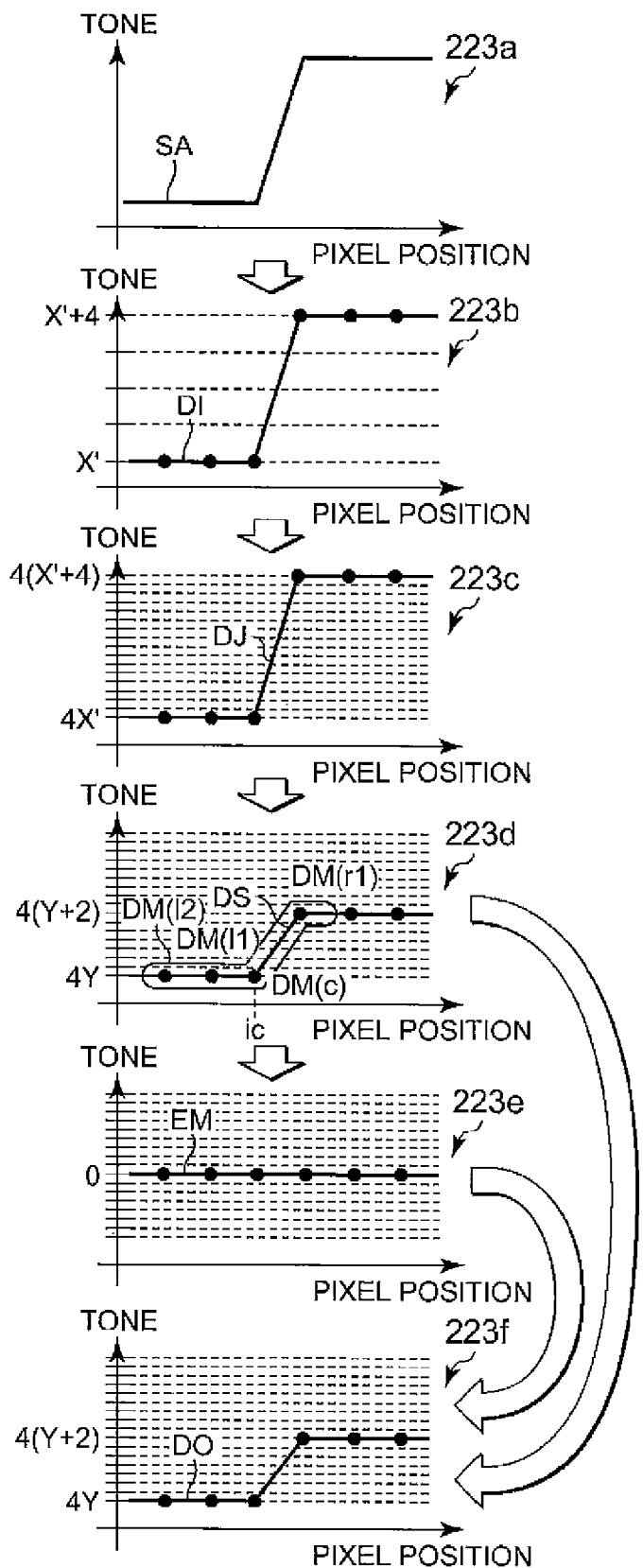
FIG. 39 are graphs for explaining operations when an analog image signal with a steep tone change, that jumps by transformation, is inputted into an image display device according to Embodiment 2.

Next, explanations will be made about operations of the image display device 111 when an analog image signal with a steep tone change, that jumps by transformation, is inputted into the image display device 111. FIG. 39 are graphs for explaining operations when an analog image signal with a steep tone change, that jumps by transformation, is inputted into the image display device according to Embodiment 2. In each of graphs 223a through 223f shown in FIG. 37, the horizontal axis represents pixel positions i, and the vertical axis represents tones.

The graph 223a shows tones of an analog image signal SA; the graph 223b shows n-bit tones of image data DI; and the graph 232c shows n+α bit image data DJ. The graph 223d shows tones of n+α bit image data DS and image data DM; the graph 223e shows tones of weighted average values EM; and the graph 223f shows tones of n+α bit image data DO.

In the image display device 111, an analog image signal SA shown by the graph 223a is inputted from the input terminal 1 into the reception unit 2. The reception unit 2 converts the analog image signal SA to n-bit digital image data DI (n bits) (two tones (X' and X'+4)) shown in the graph 223b to output into the original-data bit-extending unit 5.

The original-data bit-extending unit 5 transforms tones X' of the image data DI shown by the graph 223b to tones 4X' and transforms tones X'+4 to tones 4(X'+4) to output such image data DJ as shown in the graph 223c into the tone transformation unit 28. By performing various kinds of tone transformation, the tone transformation unit 28 transforms the tones 4X' to tones 4Y and transforms the tones 4(X'+2) to tones 4(Y+2), to output image data DS shown in the graph 223d into the one-dimensional fourth-order $\epsilon$-filter unit 61.

FIG. 40 is a table of data that the image display device according to Embodiment 2 produces when an analog image signal with a steep tone change, that jumps by transformation, is inputted; When taking as a given pixel P(c) the pixel at a pixel position ic shown in the graph 223d, FIG. 40 shows a correspondence relationship among image data DM(k), difference data ED(k) produced based on the image data DM(k), determination data EE(k), f{ED(k)}, a weighted average value EM, and threshold level data TH(k).

The data storage unit 7 outputs DM(l2)=4Y, DM(l1)=4Y, DM(c)=4Y, and DM(r1)=4Y+8 into the first difference calculation unit 8-1 through the fourth difference calculation unit 8-4, respectively.

The first difference calculation unit 8-1 outputs ED(l2)=DM(l2)−DM(c)=4Y−4Y=0; the second difference calculation unit 8-2 outputs ED(l1)=DM(l1)−DM(c)=4Y−4Y=0; the third difference calculation unit 8-3 outputs ED(c)=DM(c)−DM(c)=4Y−4Y=0; and the fourth difference calculation unit 8-4 outputs ED(r1)=DM(r1)−DM(c)=(4Y+8)−4Y=8. Therefore, "0" is inputted into each of the first $\epsilon$-determination unit 9-1 through the third ε-determination unit 9-3, and "8" is inputted into the fourth ε-determination unit 9-4.

The ε-selection unit 30 has been set to output "4" for all threshold level data TH(l2) through TH(r1) when the image data DS is close to 4Y. At this time, in the image display device 111 of this embodiment, the ε-calculation unit 30 has interpolated, on the basis of the table of threshold values each corresponding to tones, threshold values corresponding to the image data DS.

The threshold level data TH(l2)=4, the threshold level data TH(l1)=4, the threshold level data TH(c)=4, and the threshold level data TH(r1)=4 are inputted into the first ε-determination unit 9-1 through the fourth ε-determination unit 9-4, when the image data DS=4Y and the image data DS=4Y+8. Therefore, "0" is inputted into each of the first ε-determination unit 9-1 through the third ε-determination unit 9-3, and "8" is inputted into the fourth ε-determination unit 9-4. The difference data ED(l2) through ED(c) are smaller than or equal to the threshold level data TH(l2) through TH(c), respectively, so that the determination difference data EE(l2) through EE(c) are all set as "1"; and the difference data ED(r1) is larger than the threshold level data TH(r1), so that the determination data EE(r1) is set as "0".

In the determination-added weighted average unit 10, when the determination data EE(k) is "1", the difference data ED(k) is multiplied by a coefficient $a_k$ and then added, but when the determination data EE(k) is "1", the difference data is not added. When coefficients $a_k$ (=$a_{l2}$, $a_{l1}$, $a_x$, $a_{r1}$) are all 0.25, the output (weighted average value EM) of the determination-added weighted average unit 10 is given by a formula (10) below, for the example shown in FIG. 40.

$$\begin{aligned} EM &= a_{12} \times ED(12) + a_{11} \times ED(11) + a_c \times ED(c) \\ &= (0.25 \times 0) + (0.25 \times 0) + (0.25 \times 0) \\ &= 0 \end{aligned} \quad (10)$$

In the image display device 111 the image data DS supplied from the original-data bit-extending unit 5 is operated by the processes described above with each pixel sequentially taken as a given pixel, and then a calculation given by the formula (10) is performed.

The graph 223e shows tones of the weighted average values EM corresponding to the image data DM shown in the graph 223d (a weighted average EM with a pixel at pixel position i being taken as a given pixel). The determination-added weighted average unit 10 outputs the weighted average EM into the data addition unit 11. The data addition unit 11 adds the image data DS shown by the graph 223d with the weighted average value EM shown by the graph 223e to output the image data DO shown by the graph 223f.

As shown in the graph 223f, the image data DO changes steeply similarly to the input signal (analog image signal SA) or the mage data DI. The epsilon filter can preserve the sharpness in areas where tone changes large and steeply.

In this embodiment, when such image data as shown by the graph 222c in FIG. 37 is inputted into the tone transformation unit 28, such image data as shown by the graph 222d in FIG. 37 is outputted. When such image data as shown by the graph 223c in FIG. 39 is inputted into the tone transformation unit 28, such image data as shown by the graph 223d in FIG. 39 is outputted.

The graph 222d in FIG. 37 and the graph 223d in FIG. 39 show tone jumps that have the same tone difference; however, the graph 222c in FIG. 37 shows a gradual tone change before tone transformation, and the graph 223c in FIG. 39 shows a steep tone change before tone transformation. Thus, it is desired that the tone jump caused from the gradual tone change (in a case in FIG. 37) be interpolated. On the other hand, it is desired that a steep tone change (in a case of FIG. 39) be preserved. In the embodiment, if the ε-selection unit 30 is set so that the unit outputs a threshold value of 8 for its input tone values close to 4X and outputs a threshold value of 4 for its input tone values close to 4X', the unit can perform the desired operations (to interpolate its tone jump for a gradual tone change and preserve its tone change for a steep tone change).

In the embodiment, even when a tone transformation function such as gamma transformation changes tone values whose bit counts are increased by bit extension, the filter described above is capable of processing tone variations as small-magnitude noises, increasing an effective number of tones while preserving steep changes in an image, such as contours.

Figure 41:
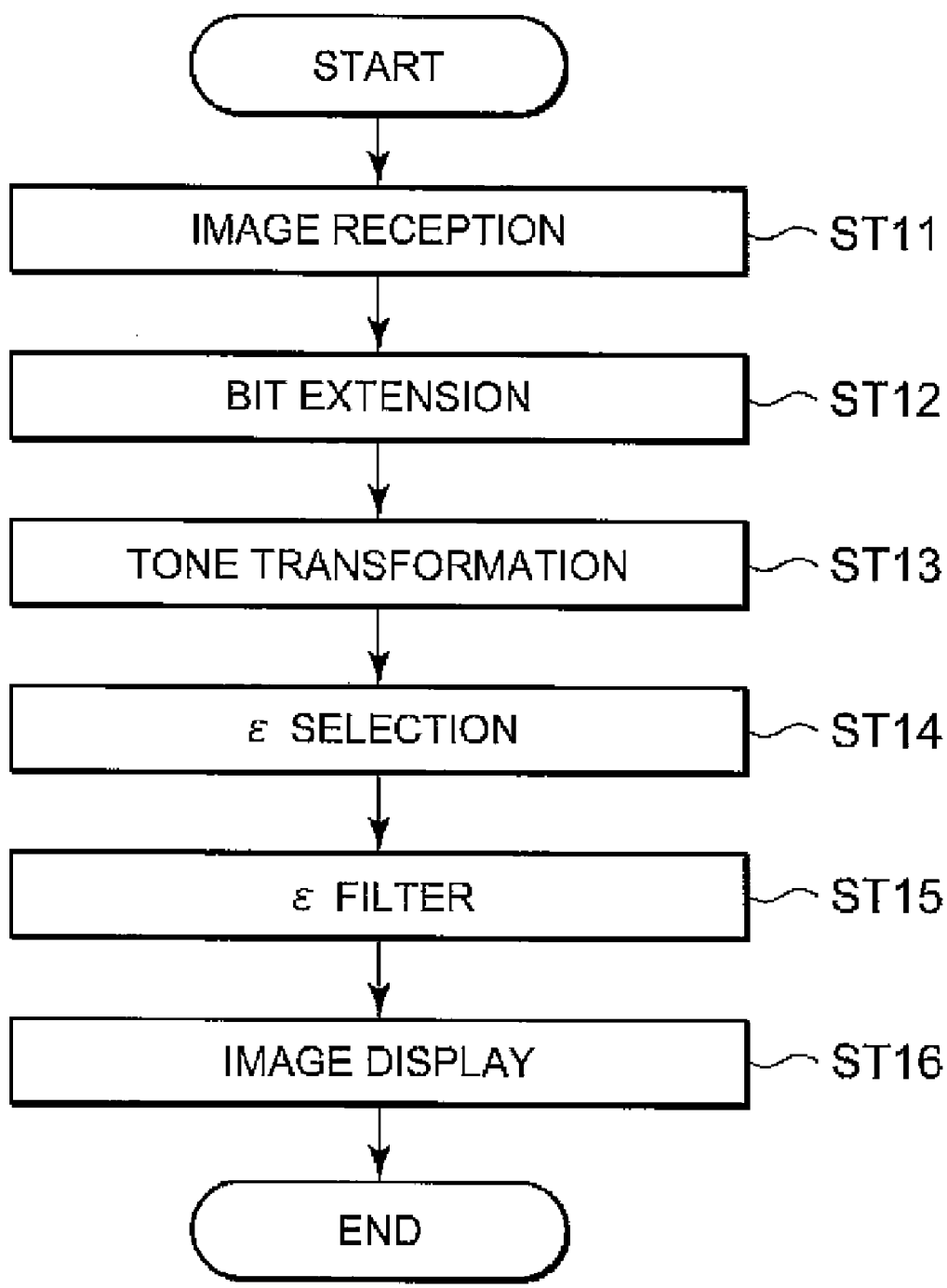
FIG. 41 is a flow chart showing a procedure of an image display device according to Embodiment 2.

FIG. 41 is a flow chart that shows processing steps of the image display device according to this embodiment described above. Firstly, when an analog image signal SA is inputted into the input terminal 1, the reception unit 2 receives the analog image signal SA to output n-bit image data DI (step ST11).

The image data DI outputted from the reception unit 2 is inputted into the original-data bit-extending unit 5 of the multiple-tone processing unit 3. The original-data bit-extending unit 5 extends the image data DI by a bits to output n+α bit image data DJ (step ST12).

The image data DJ outputted from the original-data bit-extending unit 5 is inputted into the tone transformation unit 28. The tone transformation unit 28 performs tone transformation of the image data DJ to output n+α bit image data DS (step ST13).

The n+α bit image data DS is inputted into the ε-selection unit 30. The ε-calculation unit 30 performs interpolation calculation (ε calculation) for calculating threshold values to output threshold level data TH(1) through TH(m) (step ST14).

Into the one-dimensional m-th order ε-filter unit 60, inputted are the n+α bit image data DS and the threshold level data TH(1) through TH(m). The one-dimensional m-th order ε-filter unit 60 increases the number of tones in areas where tone changes gradually, to output image data DO (step ST15). The image data DO is inputted into the display unit 4. The display unit 4 displays an image based on the image data DO (step ST16).

Figure 42:
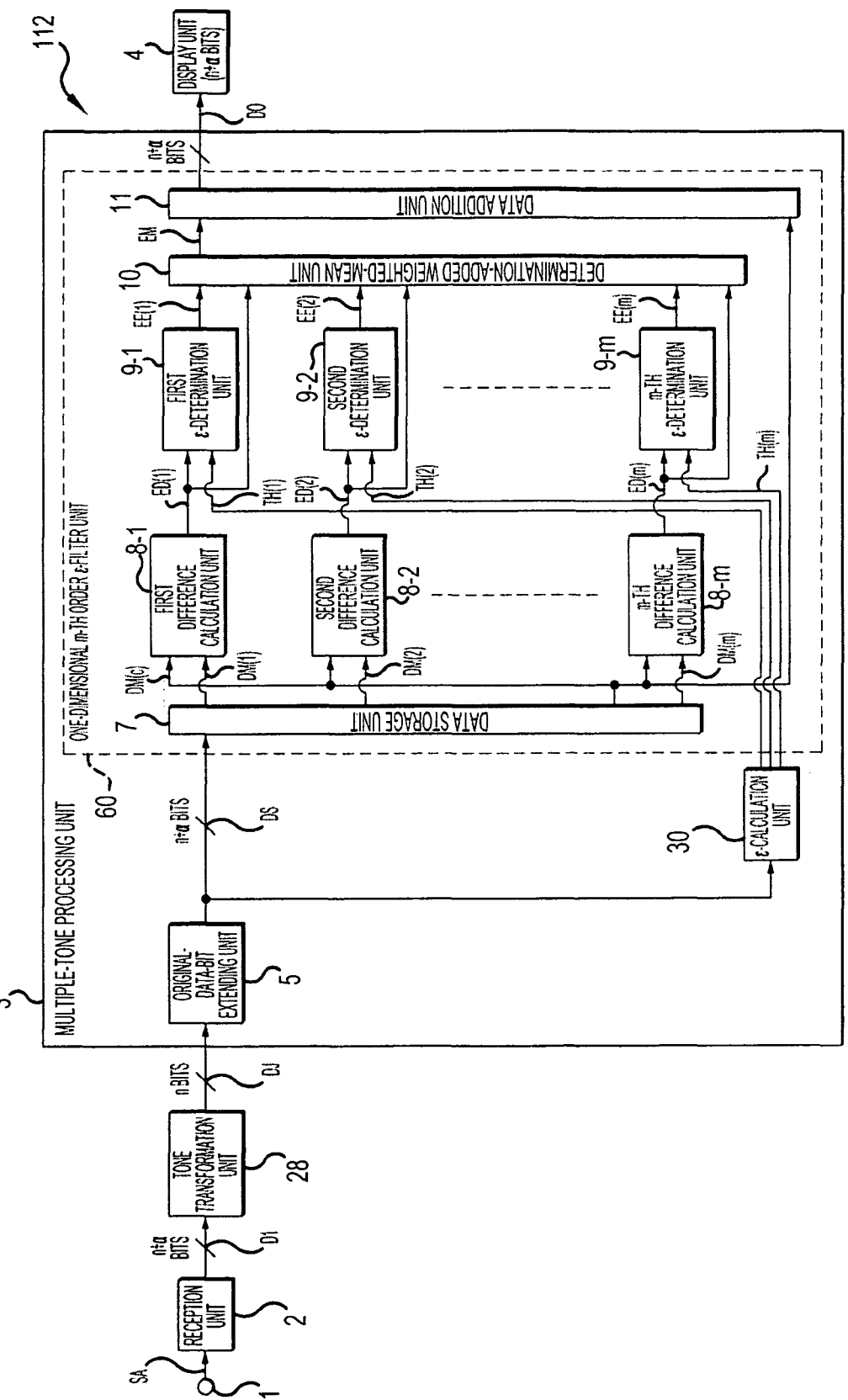
FIG. 42 is a view illustrating another configuration (1) of an image display device according to Embodiment 2.

FIG. 42 is a view illustrating another configuration (1) of the image display device according to Embodiment 2. The same numerals are assigned to components in FIG. 42 that have the same functions as those of the components in the image display device 110 shown in FIG. 33 to omit the same explanations.

In an image display device 112, the tone transformation unit 28 is provided upstream of the original-data bit-extending unit 5. When an analog image signal SA is inputted into the input terminal 1, the reception unit 2 receives the analog image signal SA to input n-bit image data DI into the tone transformation unit 28.

The tone transformation unit 28 performs tone transformation of the image data DI to input n-bit image data DJ into the original-data bit-extending unit 5. The original-data bit-extending unit 5 extends the image data DJ by a bits to output n+α bit image data DS. And then, image data DJ outputted from the original-data bit-extending unit 5 is inputted into the tone transformation unit 28 and the one-dimensional m-th order ε-filter unit 60.

In the image display device 112, if threshold values in the ε-calculation unit 30 are set according to the characteristic of its tone transformation, it becomes possible that the number of tones in an area where tone changes gradually is increased without degrading sharpness (steep change of a signal).

Figure 43:
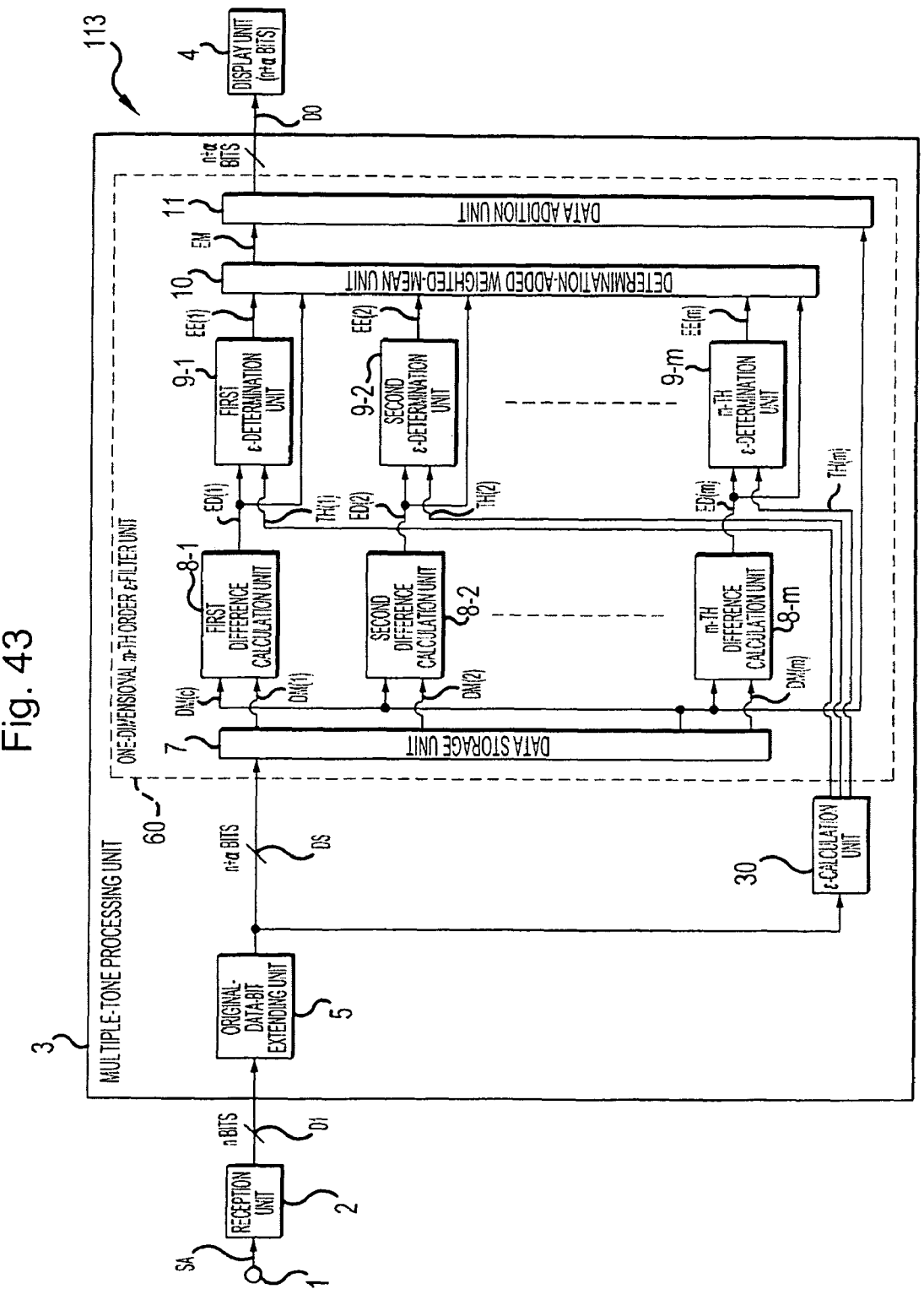
FIG. 43 is a view illustrating another configuration (2) of an image display device according to Embodiment 2.

FIG. 43 is a view illustrating another configuration (2) of the image display device according to Embodiment 2. The same numerals are assigned to components in FIG. 43 that have the same functions as those of the components in the image display device 110 shown in FIG. 33 to omit the same explanations.

In an image display device 113, a tone transformation unit 28 (not shown in FIG. 43) is provided upstream of the reception unit 2. Thus, in the image display device 113, data has been transformed in tone in advance, to be inputted into the reception unit 2. When an analog image signal SA having been transformed in tone is inputted into the input terminal 1, the reception unit 2 receives the analog image signal SA to input n-bit image data DI into the original-data bit-extending unit 5.

The original-data bit-extending unit 5 extends the image data DI by a bits to output n+α bit image data DS. And then, the image data DS outputted from the original-data bit-extending unit 5 is inputted into the ε-calculation unit 30 and the one-dimensional m-th order ε-filter unit 60.

Even in the image display device 113, if its threshold values are set according to a characteristic of its tone transformation in a way similar to those of the image display device 110 shown in FIG. 33 and the image display device 112 shown in FIG. 42, it is possible to increase the number of tones in an area where tone changes gradually without degrading sharpness of the image.

Figure 44:
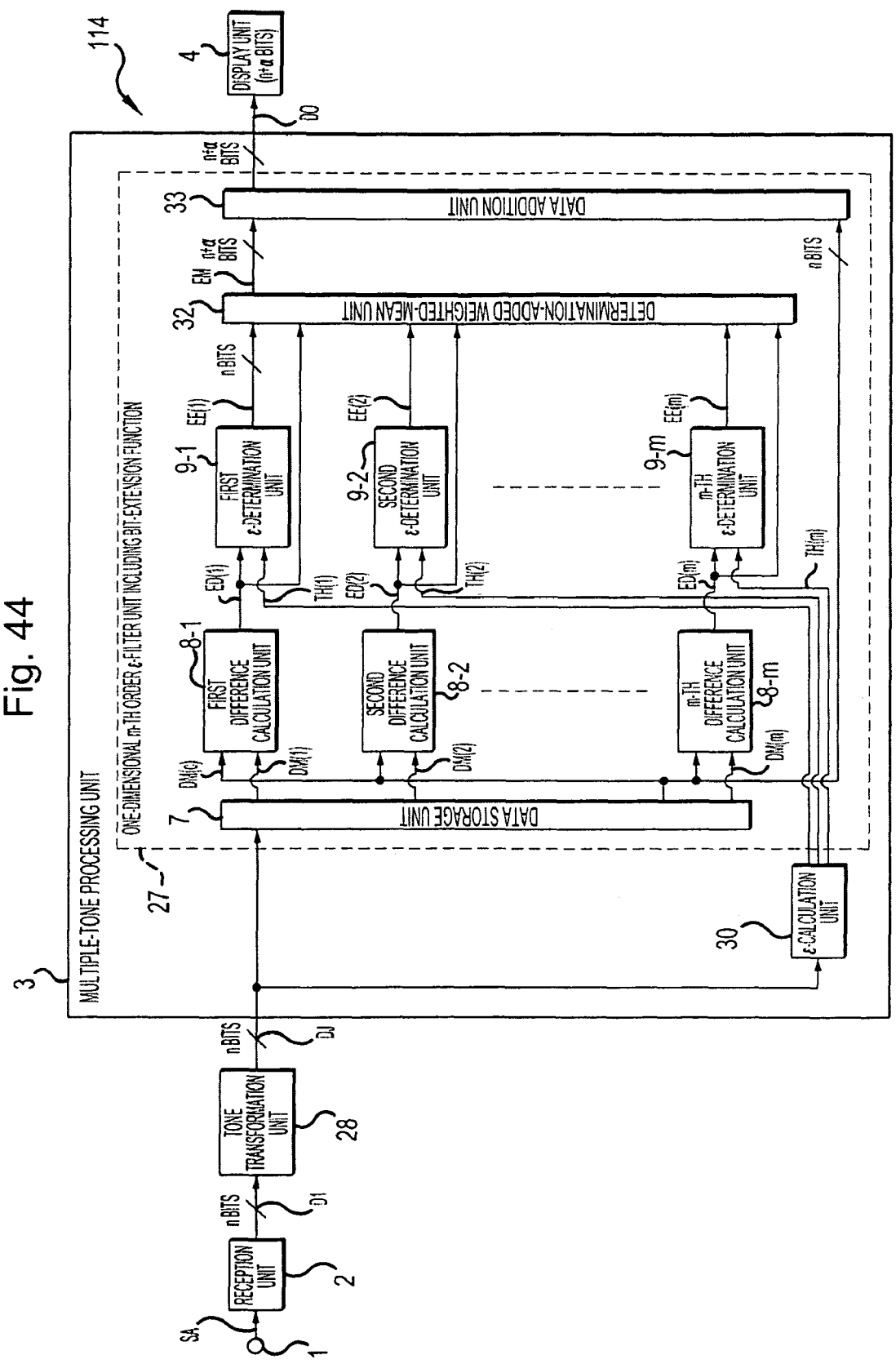
FIG. 44 is a view illustrating another configuration (3) of an image display device according to Embodiment 2.

FIG. 44 is a view illustrating another configuration (3) of the image display device according to Embodiment 2. The same numerals are assigned to components in FIG. 44 that have the same functions as those of the components in the image display device 104 shown in FIG. 30 and the image display device 110 shown in FIG. 33 to omit the same explanations.

Comparing with the image display device 112 shown in FIG. 42, an image display device 114 is not provided with the original-data bit-extending unit 5 but is provided with a determination-added weighted average unit 32 and a data addition unit 33 in place of the determination-added weighted average unit 10 and the data addition unit 11.

The determination-added weighted average unit 32 performs, based on determination data EE and difference data ED, a weighted average calculation and bit extension to output a weighted average value EM extended by a bits. The image display device 114 can perform bit extension, by producing average data EM using the fractional portion of a numeral value, which results from a calculation of a determination added weighted average, similar to those shown in FIG. 4. In the data addition unit 33, image data DM(c) inputted thereto is extended to n+α bits and then added.

As described above, the image display device 114 does not perform bit extension upstream of the epsilon filter, but performs it while performing the epsilon filter. Configuring the device in a way described above can bring the same effects obtained in the image display device 112 shown in FIG. 42.

Figure 45:
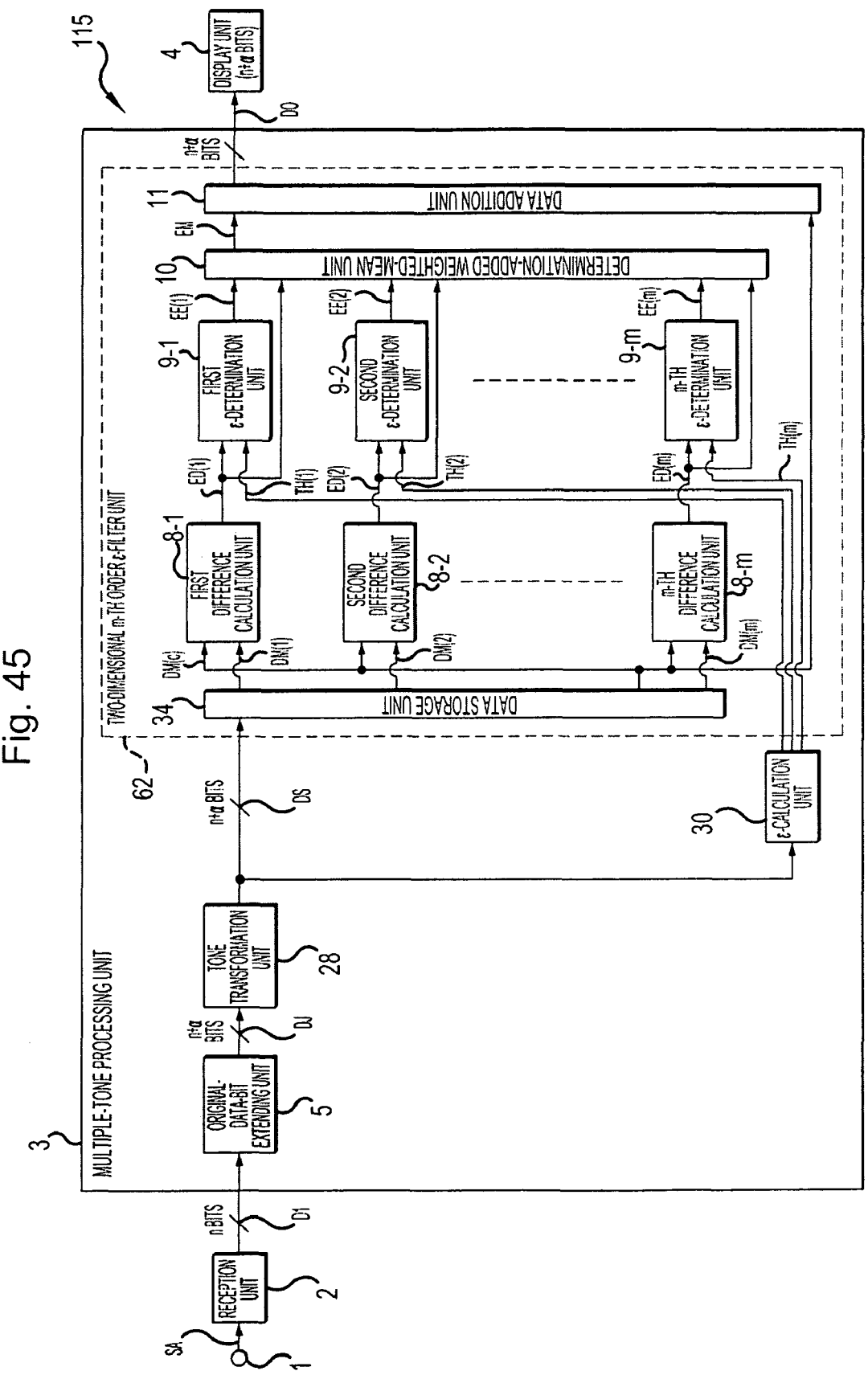
FIG. 45 is a view illustrating another configuration (4) of an image display device according to Embodiment 2.
Figure 46:
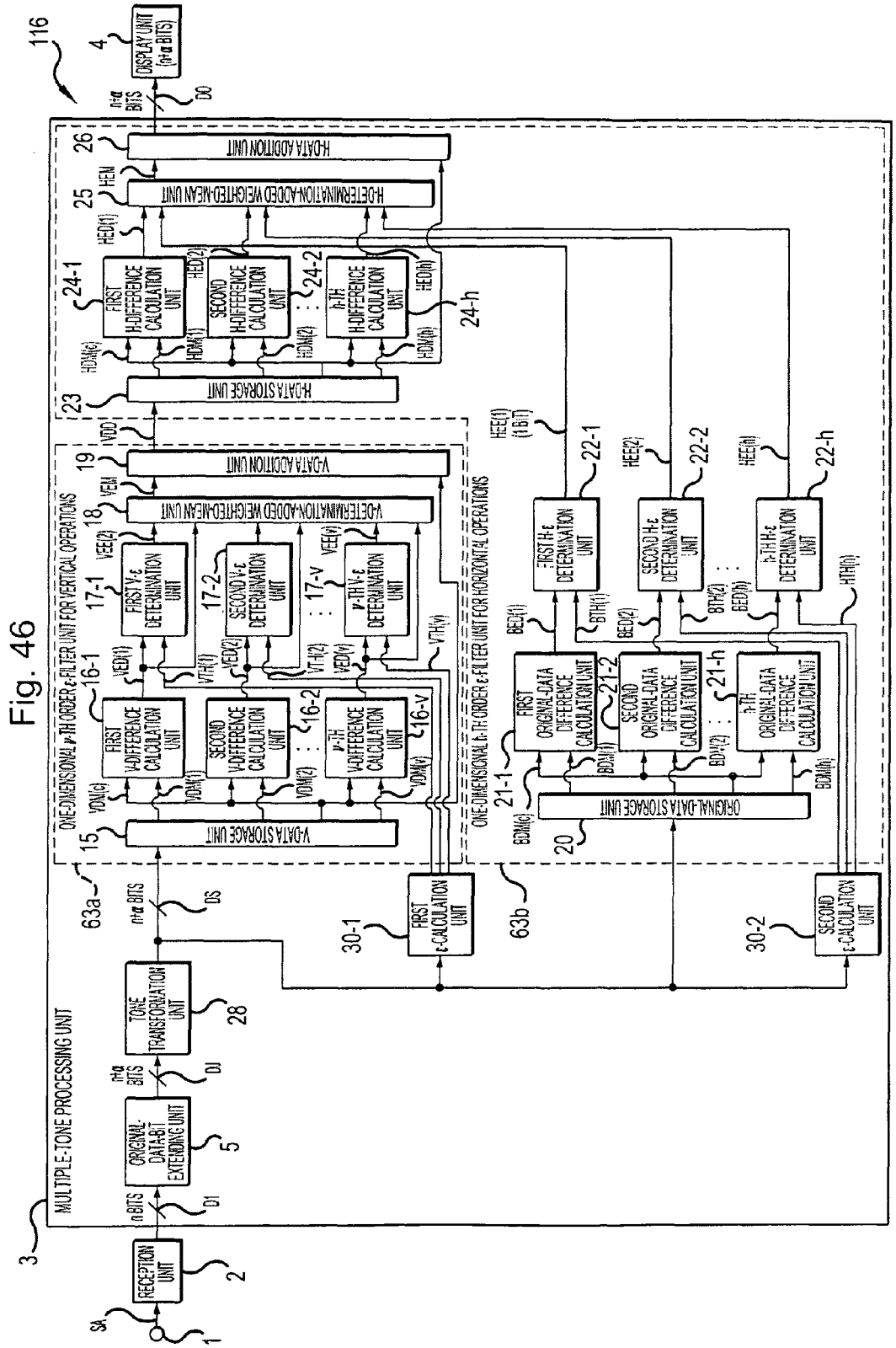
FIG. 46 is a view illustrating another configuration (5) of an image display device according to Embodiment 2.

In the image display device 110 shown in FIG. 33, the epsilon filter has been explained as a one-dimensional epsilon filter; however, the embodiment is not limited to using the one-dimensional epsilon filter. FIG. 45 and FIG. 46 are views each illustrating a configuration of an image display device including as an epsilon filter a two-dimensional epsilon filter that processes horizontally and vertically. The same numerals are assigned to components in FIG. 45 and FIG. 46 that have the same functions as those of the components in the image display devices 105 and 106 shown in FIG. 31 and FIG. 32 and the image display device 110 shown in FIG. 33 to omit the same explanations.

An image display device 115 shown in FIG. 45 is provided with the two-dimensional m-th order ε-filter unit 62 as an epsilon filter. The two-dimensional m-th order ε-filter unit 62 is connected, similarly to the one-dimensional m-th order ε-filter unit 60, to the tone transformation unit 28, the ε-calculation unit 30, and the display unit 4.

The two-dimensional m-th order ε-filter unit 62 processes (epsilon filtering process) data on a two-dimensional area of a horizontal pixel count (h)×a vertical pixel count (v). That is, the two-dimensional m-th order ε-filter unit 62 is used as an edge-preserving smoothing filter that smoothes, while preserving steep tone changes, pixel data arranged two-dimensionally (vertically and horizontally) with a given pixel being at the center of the data, to operate small-magnitude components as noises.

The two-dimensional m-th order ε-filter unit 62 shown in FIG. 45 includes a data storage unit 34, a first difference calculation unit 8-1 through an m-th difference calculation unit 8-$m$, a first ε-determination unit 9-1 through an m-th ε-determination unit 9-$m$, a determination-added weighted average unit 10, and a data addition unit 11, to increase an effective number of tones for image data DS.

An image display device 116 shown in FIG. 46 includes, as an epsilon filter, a one-dimensional v-th order ε-filter unit 63$a$ for vertical operations and a one-dimensional h-th order ε-filter unit 63$b$ for horizontal operations. The one-dimensional v-th order ε-filter unit 63$a$ for vertical operations is connected to the tone transformation unit 28, a first ε-calculation unit 30-1, and the one-dimensional h-th order ε-filter unit 63$b$ for horizontal operations. The one-dimensional h-th order ε-filter unit 63$b$ for horizontal operations is connected to the tone transformation unit 28, a second ε-calculation unit 30-2, and the display unit 4.

Compared with the image display device 106, the image display device 116 has differences: in place of the first ε-selection unit 29-1, a first ε-calculation unit 30-1 is provided; and in place of the second ε-selection unit 29-2, a second ε-calculation unit 30-2 is provided. The one-dimensional v-th order ε-filter unit 63$a$ for vertical operations includes a V-data storage unit 15 (vertical data storage unit), a first V-difference calculation unit 16-1 (vertical difference calculation unit) through a v-th V-difference calculation unit 16-$v$, a first Vε determination unit 17-1 (vertical-ε-determination unit) through a v-th Vε determination unit 17-$v$, a V-determination-added weighted average unit 18 (vertical determination-added weighted average unit), and a V-data addition unit 19 (vertical data addition unit).

The one-dimensional h-th order ε-filter unit 63$b$ for horizontal operations includes an original data storage unit 20, a first original data difference calculation unit 21-1 through an h-th original data difference calculation unit 21-$h$, a first Hε-determination unit 22-1 (horizontal ε-determination unit) through an h-th Hε-determination unit 22-$h$, an H-data storage unit 23 (horizontal-data storage unit), a first H-difference calculation unit 24-1 (horizontal-difference calculation unit) through an h-th H-difference calculation unit 24-$h$, an H-determination-added weighted average unit 25 (horizontal determination-added weighted average unit), and an H-data addition unit 26 (horizontal data addition unit).

The one-dimensional v-th order ε-filter unit 63a for vertical operations, operates original data of n+α bit length in vertical directions of the picture. The one-dimensional v-th order ε-filter unit 63a for vertical operations is used as an edge-preserving smoothing filter that smoothes, while preserving steep tone changes, pixel data arranged vertically with reference to a given pixel to operate small-magnitude components as noises. The one-dimensional v-th order ε-filter unit 63a for vertical operations has a function to increase, based on vertical tone changes in the image data DS, an effective number of tones in the image data VDO.

The one-dimensional h-th order ε-filter unit 63b for horizontal operations, operates in picture's horizontal directions data which is n+α bit long and is outputted from the one-dimensional v-th order ε-filter unit 63a for vertical operation. The one-dimensional h-th order ε-filter unit 63b for horizontal operations is used as an edge-preserving smoothing filter that smoothes, while preserving steep tone changes, pixel data arranged horizontally with reference to a given pixel to operate small-magnitude components as noises. The one-dimensional h-th order ε-filter unit 63b for horizontal operations has a function to increase, based on horizontal tone changes in the image data DS, an effective number of tones in the image data VDO.

As described above, provided are ε-filter units that perform two-dimensional processes and threshold-value control units (a first ε-calculation unit 30-1 and a second ε-calculation unit 30-2) that change threshold values ε according to their input tones; therefore, magnitudes of edges to be preserved can be set according to vertical and horizontal tones.

In Embodiment 1 and Embodiment 2, explanations have been made in detail about a case where α=2 and n-bit image data is extended to n+2 bit data; however, the present invention is not limited to the case where α=2. The epsilon filter's order m has been given as four in the explanations, however the present invention is similarly not limited to m=4.

In Embodiment 1 and Embodiment 2, the difference data ED(c), ED(c,c), and VED(c) which are the differences between the image data of a given pixel are inevitably "0"; therefore, the ε-determination results (determination data EE(c), EE(c,c), VEE(c), and BED(c)) about the differences are inevitably "1". Therefore, it is allowed that: eliminated are the difference calculation unit for calculating the difference of given pixel's image data and the ε-determination unit (such as the third ε-determination unit 9-3 shown in FIG. 5) for determining whether or not its output (the difference data ED(c), ED(c,c), VED(c), and BED(c)) is larger than its threshold value ε; and "0" is added (or ignored) as the difference data ED(c), ED(c,c), VED(c), and HED(c) in the determination-added weighted average unit 10, the V determination-added weighted average unit 18, and the H-determination-added weighted average unit 25.

In addition, the difference calculation unit 24-3 shown in FIG. 32 also calculates the difference between the same data HDM(c), inevitably giving its difference as "0"; therefore, it is allowed that the third H-difference calculation unit 24-3 is eliminated and "0" is added (or ignored) as the HDM(c) in the H-determination-added weighted average unit 25.

In the embodiments, the ε-calculation unit 30 is separated from the one-dimensional m-th order ε-filter unit 60, the one-dimensional fourth-order ε-filter unit 61, the two-dimensional m-th order ε-filter unit 62, the one-dimensional v-th order ε-filter unit 63a for vertical operations, and the one-dimensional h-th order ε-filter unit 63b for horizontal operations; however, the ε-calculation unit 30 may be included in the one-dimensional m-th order ε-filter unit 60, the one-dimensional fourth-order ε-filter unit 61, the two-dimensional m-th order ε-filter unit 62, the one-dimensional v-th order ε-filter unit 63a for vertical operations, and the one-dimensional h-th order ε-filter unit 63b for horizontal operations.

As described above, similarly to Embodiment 1, Embodiment 2 smoothes tones increased due to bit-extension using an epsilon filter, which enables the number of tones in image data to be increased without lowering sharpness of the image that contains areas—such as contours—where tone changes large and steeply. Therefore, this resolves a pseudo contour problem due to lack of image levels, and can prevent the image quality from being degraded.

Because threshold values in tone are interpolated from a table of threshold values to output threshold level data TH according to image data, determination of whether or not difference data ED is larger than threshold level data TH can be easily done even when the table does not include all threshold values corresponding to all tones.

Embodiment 3

So far, explanations have been made on the assumption that the smoothing filter is an epsilon filter, but it is not limited to use an epsilon filter as the smoothing filter. Any type of the smoothing filter is applicable as long as it is an edge-preserving smoothing filter that smoothes only small variations while preserving sharpness in areas where steep and large changes are contained; for example, other than an epsilon filter, a trimmed mean filter (double-window modified trimmed mean or DW-MTM filter) or a bilateral filter or the like may be used.

Note that, the trimmed mean filter (DW-MTM filter) is, for example, explained in pages 72 to 74 of "Nonlinear Digital Signal Processing," by Takao HINAMOTO (Editor), Mitsuji MUNEYASU and Akira TAGUCHI (Authors), Mar. 20, 1999, Asakura Publishing Co., Ltd., Tokyo.

One-dimensional processing by the trimmed mean filter is expressed in formulas (11) or (12). In the formulas, x(i) is a tone of inputted image data, y(i) is a tone of image data to be outputted, $a_k$ is a coefficient, k is a relative pixel position from a given pixel, and ε is a threshold value.

$$y(i) = \frac{\sum_{k=-m/2+1}^{m/2} a_k b_k x(i-k)}{\sum_{k=-m/2+1}^{m/2} a_k b_k} \quad (11)$$

$$b_k = \begin{cases} 1 : |x(i-k) - x_{med}| \le \varepsilon \\ 0 : |x(i-k) - x_{med}| > \varepsilon \end{cases}$$

Here, the parameter $x_{med}$ is a median value of the image data in a filtering window whose width is smaller than a width m of a filtering-window containing a processing point (given pixel) at its center; $b_k$ is one when the absolute value of $x(i-k) - x_{med}$ is less than or equal to a threshold value ε, and zero when the absolute value is greater than the threshold value ε.

$$y(i) = \frac{\sum_{k=-m/2+1}^{m/2} a_k b_k x(i-k)}{\sum_{k=-m/2+1}^{m/2} a_k b_k} \quad (12)$$

$$b_k = \begin{cases} 1 : |x(i-k) - x(i)| \le \varepsilon \\ 0 : |x(i-k) - x(i)| > \varepsilon \end{cases}$$

$b_k$ is one when the absolute value of $x(i-k) - x(i)$ is less than or equal to a threshold value ε, and zero when the absolute value is greater than the threshold value $\epsilon$. That is, the trimmed mean filter using the formula (6) calculates a weighted average value, dropping neighboring pixels whose tone values change large from the given pixel.

In an epsilon filter, the neighboring pixels whose tone values change large from the given pixel are replaced with the given pixel for calculating a weighted average value. As described above, the trimmed mean filter is a filter that, similarly to an epsilon filter, smoothes only small changes while preserving sharpness in areas where tone changes large and steeply. Thus, equivalent effects can be obtained when the trimmed mean filter is used in place of the epsilon filter.

Similarly, equivalent effects can be obtained when other edge-preserving smoothing filters are used in place of the epsilon filter.

In the embodiments, the image display device 100 includes a data bit-extending unit that extends the number of bits in image data so as to extend a tone of the image data, and a smoothing filter unit (edge-preserving smoothing filter including a threshold-value control unit) that determines magnitudes of edges to be preserved according to its tones in the image data and performs, based on the magnitudes of edges having been determined, a smoothing process of predetermined tones in the image data; therefore, magnitudes of edges preserved by the filter can be changed depending on input tones. When image data is transformed in tone, threshold values can be changed according to the tone transformation. Therefore, this enables the device to eliminate, while preserving steep edges, small-magnitude components regarded as noises, which can curb generation of pseudo contours in a digital image.

In the embodiments described above, explanations have mainly been made about devices using an edge-preserving smoothing filter adaptive to image data tones that is applied to image data whose number of bits is extended to extend its tone; however, applications of this technique are not limited to those described above; the edge-preserving smoothing filter adaptive to image data tones may be applied to data that is not extended in tone—for example, those are not extended in tone but transformed in tone.

Hereinbefore, the embodiments according to the present invention have been explained with reference to the drawings; however, specific configurations are not limited to the embodiments described above and other configurations not departing from the scope of the invention may be included in these embodiments.

What is claimed is:

1. An image processing device for interpolating a tone in image data, the image processing device comprising:
   an input unit that inputs the image data;
   a tone transformation unit that performs a tone transformation of the inputted image data;
   a threshold-value control unit that sets a threshold value corresponding to a tone;
   a smoothing filter unit that
   calculates a tone differences between a given pixel and a pixels near said given pixel in the image data that has undergone tone transformation, and
   performs a filtering process in such a way that,
      when the calculated tone difference is larger than the threshold value, then the given pixel is determined to be an edge portion and is not smoothed, and
      otherwise applies a smoothing process to the given pixel; and
   an output unit that outputs image data having been processed by the smoothing filter unit,
   wherein the threshold-value control unit sets the threshold value in such a way that a threshold value for a tone in an area where a tone difference in the image data after the tone transformation becomes larger than that in the image data before the tone transformation is at least as large as a threshold value for a tone in an area where the tone difference in the image data after the tone transformation becomes smaller than that in the image data before the tone transformation.

2. The image processing device as set forth in claim 1, further comprising a data-bit extending unit that extends the number of bits in the image data so as to extend a tone in the image data.

3. The image processing device as set forth in claim 2, wherein the data-bit extending unit is placed upstream of the smoothing filter unit.

4. The image processing device as set forth in claim 2, wherein the data-bit extending unit is included in the smoothing filter unit, which extends the number of bits in the image data in which the filtering process has been applied.

5. The image processing device as set forth in claim 1, wherein the threshold-value control unit obtains the threshold value based on information in which the tone and the threshold value are correlated with each other, and outputs the threshold value having been obtained into the smoothing filter unit.

6. The image processing device as set forth in claim 1, wherein the threshold-value control unit calculates, based on the characteristic of the tone transformation, the threshold value, and outputs the calculated threshold value into the smoothing filter unit.

7. The image processing device as set forth in claim 1, wherein the smoothing filter unit is an epsilon filter.

8. An image display device for interpolating a tone in image data, and for displaying an image whose tone has been interpolated, the image display device comprising:
   a reception unit that generates image data by receiving an image signal;
   a tone transformation unit that performs a tone transformation of the received image data;
   a threshold-value control unit that sets a threshold value corresponding to a tone;
   a smoothing filter unit that
   calculates a tone differences between a given pixel and pixels near said given pixel in the image data that has undergone tone transformation, and
   performs a filtering process in such a way that,
      when the calculated tone difference is larger than the threshold value, then the given pixel is determined to be an edge portion and is not smoothed, and
      otherwise applies a smoothing process to the given pixel; and
   a display unit that displays image data having been processed by the smoothing filter unit;
   wherein the threshold-value control unit sets the threshold value in such a way that a threshold value for a tone in an area where a tone difference in the image data after the tone transformation becomes larger than that in the image data before the tone transformation is at least as large as a threshold value for a tone in an area where the tone difference in the image data after the tone transformation becomes smaller than that in the image data before the tone transformation.

9. The image display device as set forth in claim 8, further comprising a data-bit extending unit that extends the number of bits in the image data so as to extend a tone in the image data.

10. An image processing method of interpolating a tone in image data, the method comprising the steps of:

performing a tone transformation on the image data based on a tone transformation characteristic that has no dimensions;

setting a threshold value based on the transformation characteristic for a particular tone having been performed by the transformation unit;

calculating a tone differences between a given pixel and a pixels near said given pixel in the image data that has undergone tone transformation, and performing a filtering process in such a way that, when the calculated tone difference is larger than the threshold value, then the given pixel is determined to be an edge portion and is not smoothed, and otherwise applying a smoothing process to the given pixel applying a smoothing process to a predetermined tone in the image data while preserving, depending on the threshold value, a predetermined edge in the image data; and outputting the filtered image data after said performing a filtering process;

wherein said setting a threshold value includes setting the threshold value in such a way that a threshold value for a tone in an area where a tone difference in the image data after the tone transformation becomes larger than that in the image data before the tone transformation is at least as large as a threshold value for a tone in an area where the tone difference in the image data after the tone transformation becomes smaller than that in the image data before the tone transformation.

11. The image processing method as set forth in claim 10, further comprising a step of extending the number of bits in the image data so as to extend a tone in the image data, wherein a tone in the image data is transformed into a plurality of tones so that the tone in the image data is interpolated.

12. The image processing method as set forth in claim 10, wherein the step of outputting the image data includes a displaying process through which outputted image data is displayed.

* * * * *